US011808921B2

(12) United States Patent
Kanzaki et al.

(10) Patent No.: US 11,808,921 B2
(45) Date of Patent: Nov. 7, 2023

(54) WIDE-ANGLE LENS INCLUDING SEVEN LENSES OF—+++-+ REFRACTIVE POWERS

(71) Applicant: NIDEC SANKYO CORPORATION, Nagano (JP)

(72) Inventors: Yosuke Kanzaki, Nagano (JP); Tadashi Komiyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 442 days.

(21) Appl. No.: 17/117,063

(22) Filed: Dec. 9, 2020

(65) Prior Publication Data

US 2021/0191088 A1    Jun. 24, 2021

(30) Foreign Application Priority Data

Dec. 13, 2019    (CN) .......................... 201911281254.4

(51) Int. Cl.
*G02B 13/00* (2006.01)
*G02B 13/06* (2006.01)
*G02B 9/64* (2006.01)

(52) U.S. Cl.
CPC ........... *G02B 13/0045* (2013.01); *G02B 9/64* (2013.01); *G02B 13/06* (2013.01)

(58) Field of Classification Search
CPC ....... G02B 13/0045; G02B 9/64; G02B 13/06
See application file for complete search history.

(56) References Cited

FOREIGN PATENT DOCUMENTS

JP    2018060153    4/2018

*Primary Examiner* — Wen Huang
(74) *Attorney, Agent, or Firm* — JCIPRNET

(57) ABSTRACT

Provided is a wide-angle lens, including a first lens, a second lens, a third lens, a fourth lens, a diaphragm, a fifth lens, a sixth lens, and a seventh lens, sequentially arranged from an object side. An object-to-image distance of the wide-angle lens is set to d, an entrance pupil diameter of the wide-angle lens is set to HEP, and d/HEP<29.000 is satisfied.

15 Claims, 45 Drawing Sheets

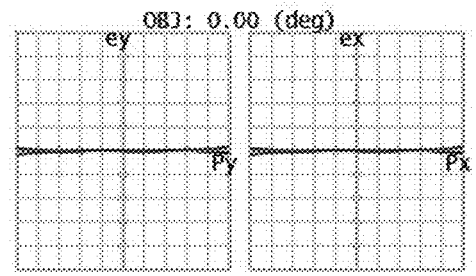 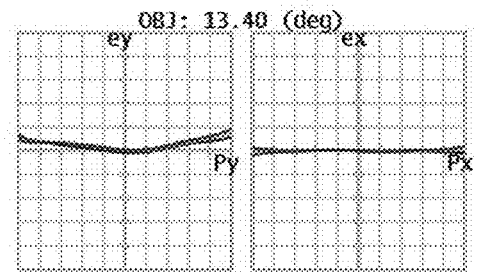
FIG. 16A  FIG. 16B
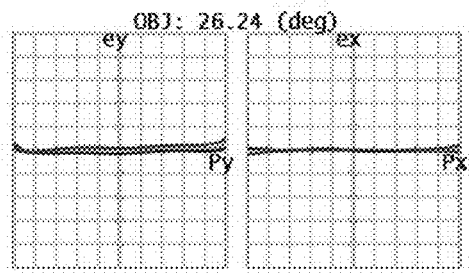 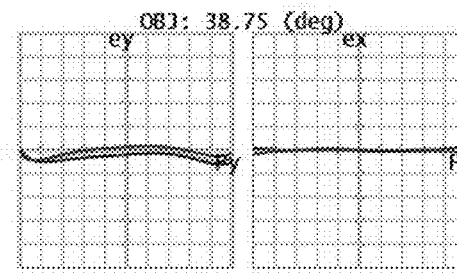
FIG. 16C  FIG. 16D
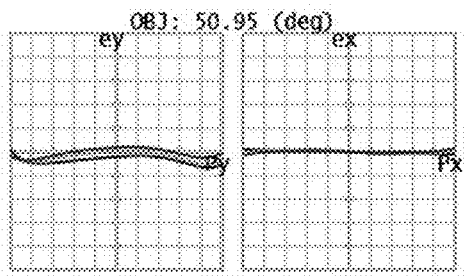 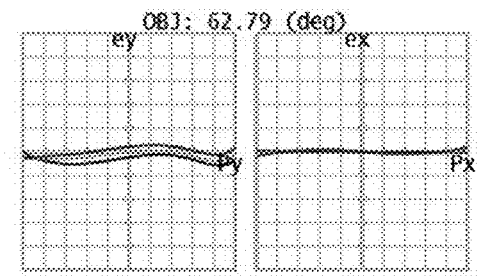
FIG. 16E  FIG. 16F
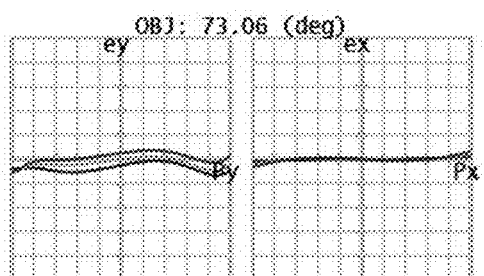 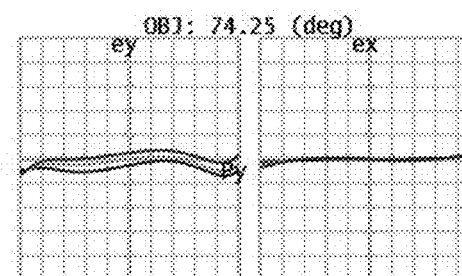
FIG. 16G  FIG. 16H

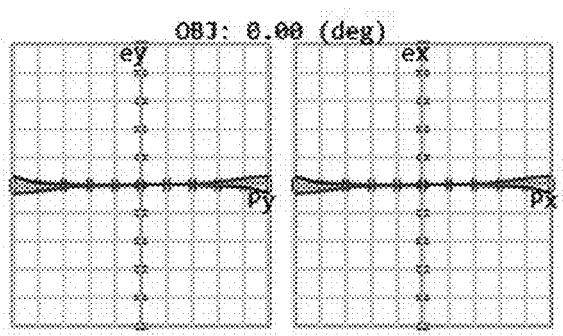
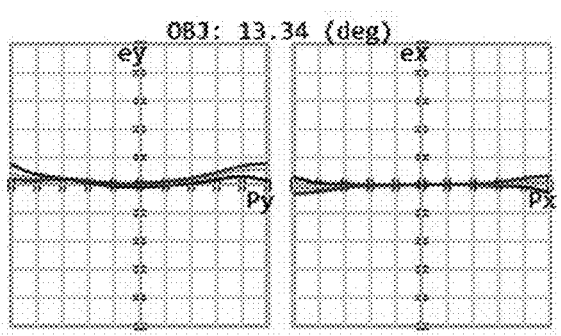
FIG. 20A  FIG. 20B
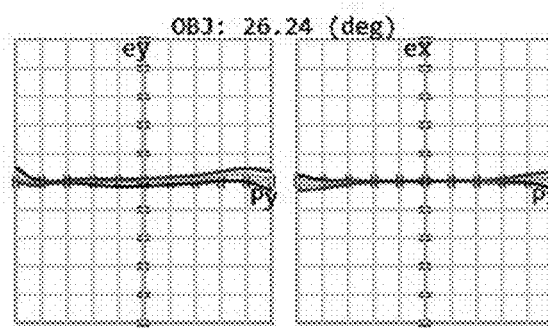
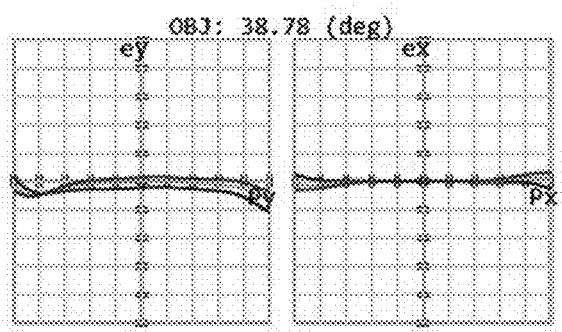
FIG. 20C  FIG. 20D
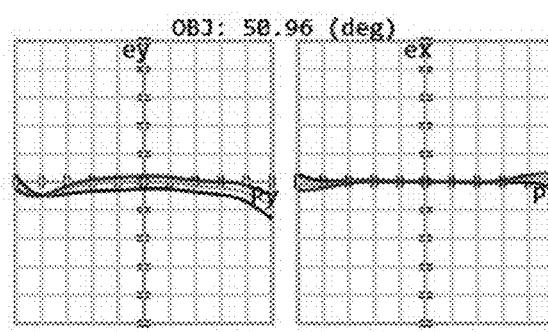
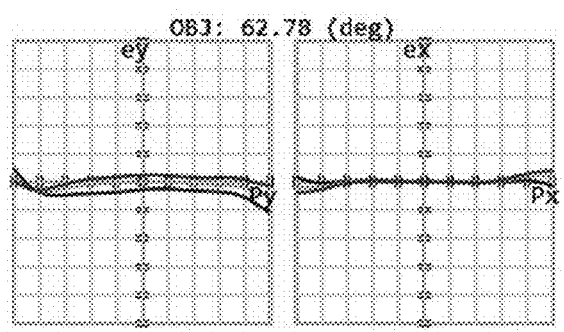
FIG. 20E  FIG. 20F
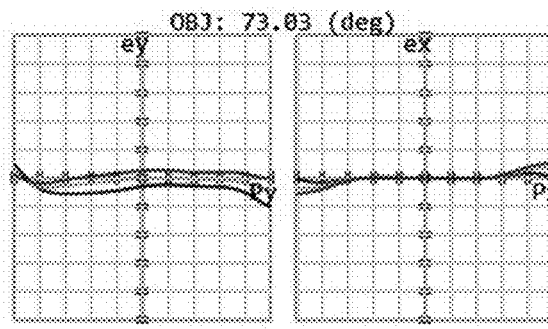
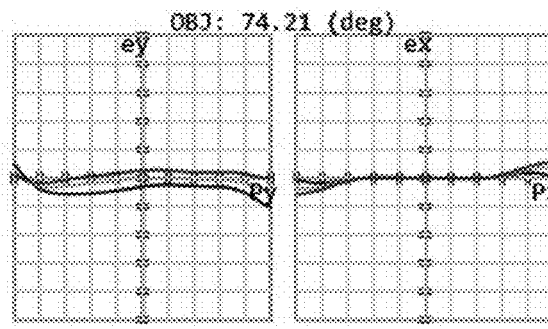
FIG. 20G  FIG. 20H

WIDE-ANGLE LENS INCLUDING SEVEN LENSES OF −+++−+ REFRACTIVE POWERS

CROSS REFERENCE TO RELATED APPLICATIONS

The present invention claims priority under 35 U.S.C. § 119 to Chinese Application No. 201911281254.4 filed on Dec. 13, 2019, the entire content of which is incorporated herein by reference.

FIELD OF THE INVENTION

The disclosure relates to a wide-angle lens.

BACKGROUND

As a wide-angle lens for an in-vehicle camera, there has conventionally been a wide-angle lens including, sequentially arranged from an object side, a first lens, a second lens, a third lens, a fourth lens, a diaphragm, a fifth lens, a sixth lens and a seventh lens.

In practice, sometimes the space for mounting the wide-angle lens in a vehicle may have a limited length in the optical axis direction of the wide-angle lens. Therefore, it has been desired to ensure the optical performance of the wide-angle lens while preventing the overall length of the wide-angle lens from becoming excessively large.

SUMMARY

An exemplary embodiment of the disclosure provides a wide-angle lens, including a first lens, a second lens, a third lens, a fourth lens, a diaphragm, a fifth lens, a sixth lens, and a seventh lens, sequentially arranged from an object side. An object-to-image distance of the wide-angle lens is set to d, an entrance pupil diameter of the wide-angle lens is set to HEP, and d/HEP<29.000 is satisfied.

The above and other elements, features, steps, characteristics and advantages of the present disclosure will become more apparent from the following detailed description of the preferred embodiments with reference to the attached drawings.

BRIEF DESCRIPTION OF THE DRAWINGS

FIG. 16A to FIG. 16L illustrate transverse aberration of the wide-angle lens according to Embodiment 4 of the disclosure.

FIG. 20A to FIG. 20L illustrate transverse aberration of the wide-angle lens according to Embodiment 5 of the disclosure.

DETAILED DESCRIPTION

Hereinafter, each embodiment of a wide-angle lens of the disclosure will be described with reference to the accompanying drawings. In the following description, in an extension direction of an optical axis L, an object side is denoted by L1, and an image side is denoted by L2.

Figure 1:
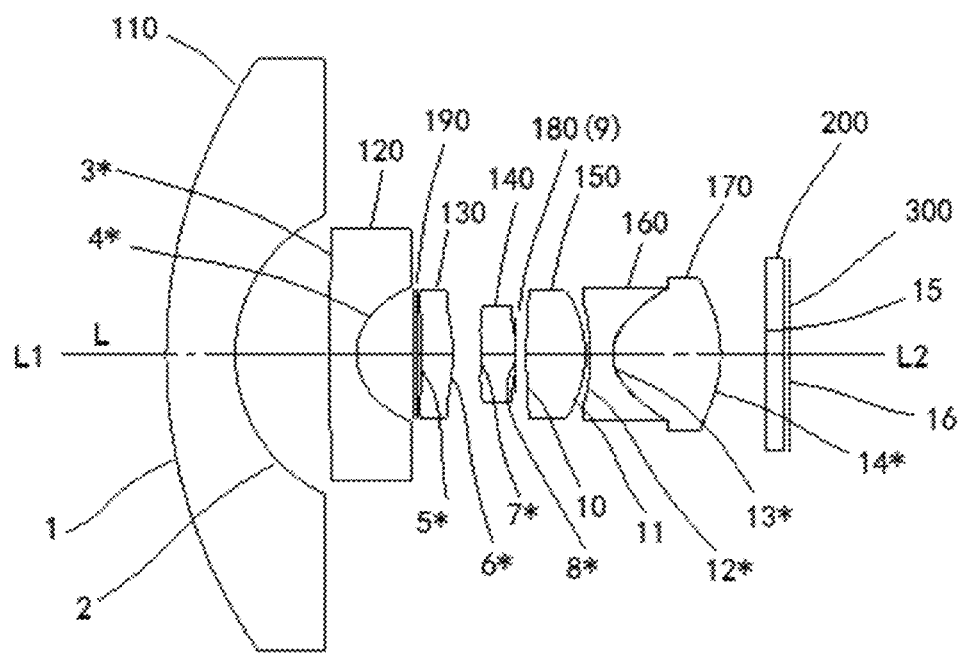
FIG. 1 illustrates a wide-angle lens according to Embodiment 1 of the disclosure.
Figure 2A:
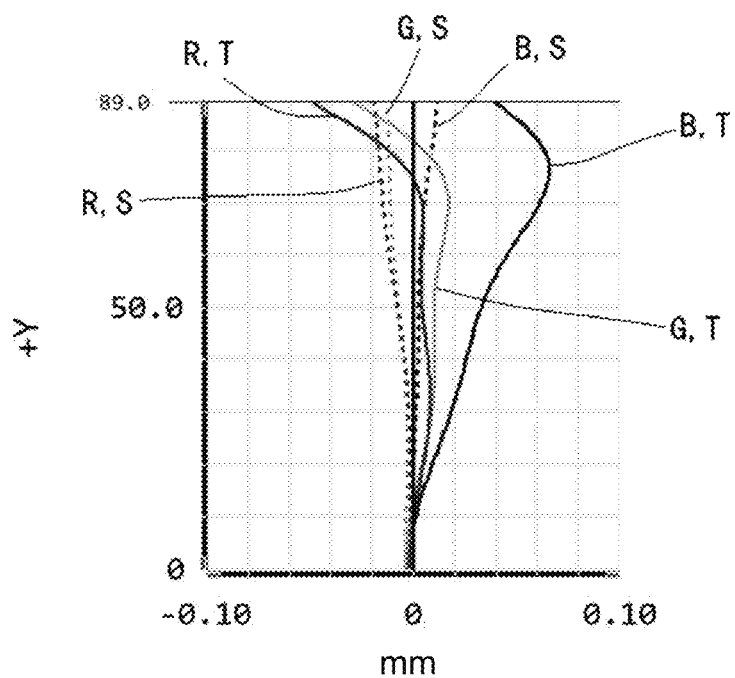
FIG. 2A illustrates curvature of field and distortion of the wide-angle lens according to Embodiment 1 of the disclosure.
Figure 2B:
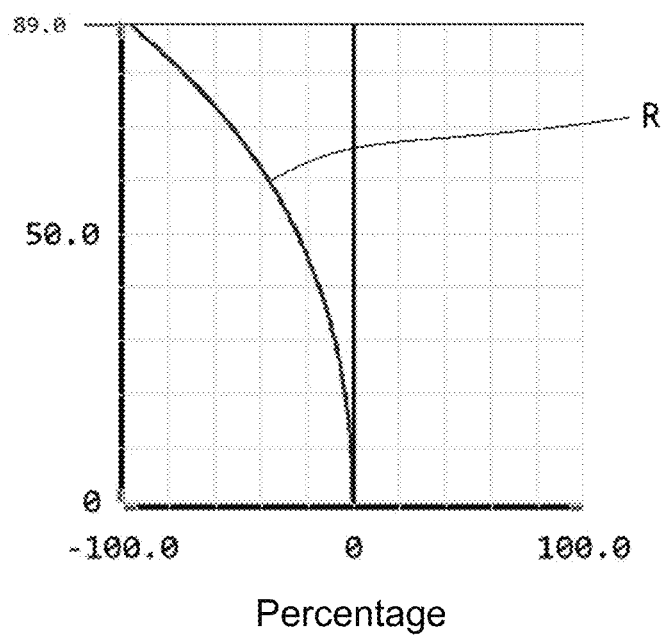
FIG. 2B illustrates curvature of field and distortion of the wide-angle lens according to Embodiment 1 of the disclosure.
Figure 3A:
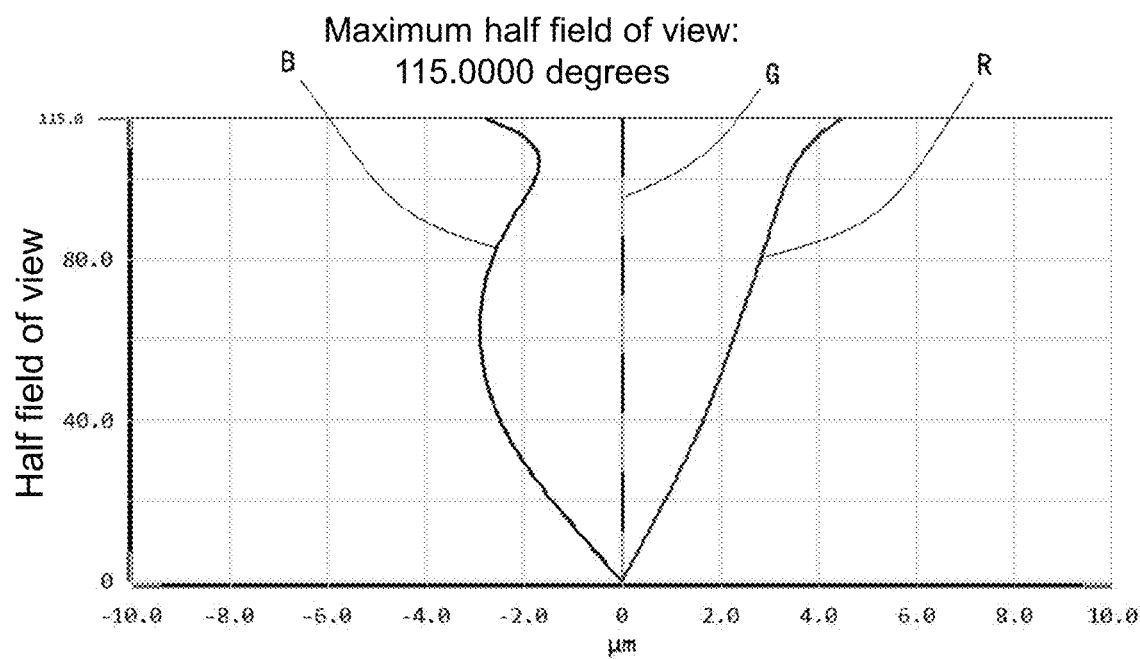
FIG. 3A illustrates lateral chromatic aberration (transverse chromatic aberration) of the wide-angle lens according to Embodiment 1 of the disclosure.
Figure 3B:
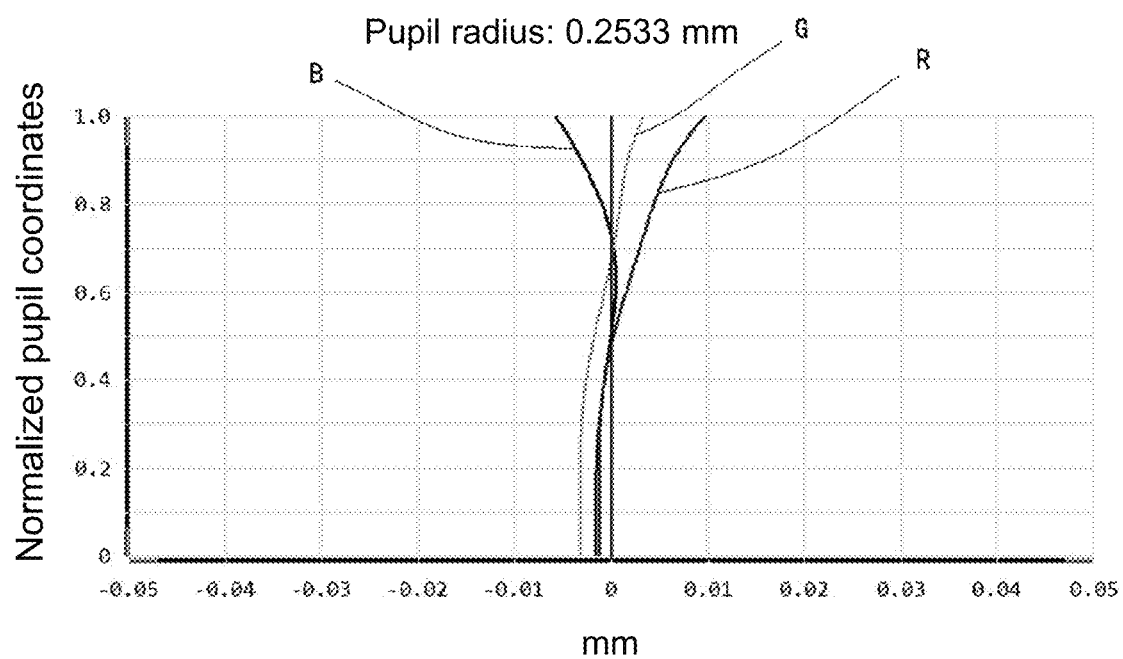
FIG. 3B illustrates spherical aberration (longitudinal aberration) of the wide-angle lens according to Embodiment 1 of the disclosure.
Figure 4A:
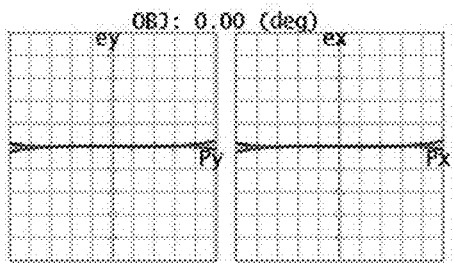
FIG. 4A to FIG. 4L illustrate transverse aberration of the wide-angle lens according to Embodiment 1 of the disclosure.
Figure 4B:
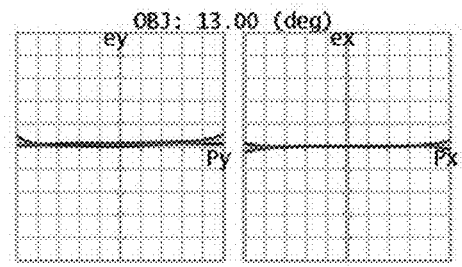
Figure 4C:
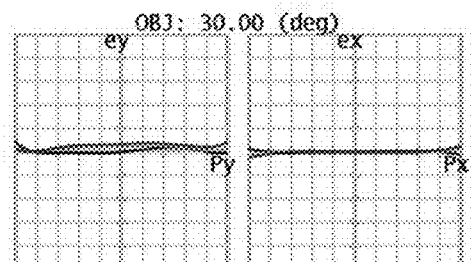
Figure 4D:
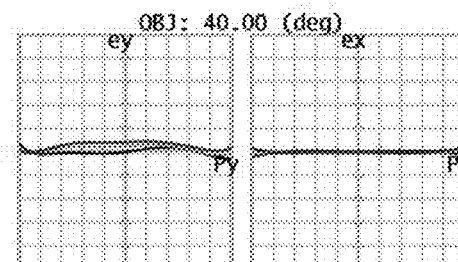
Figure 4E:
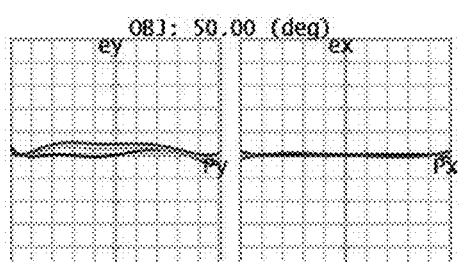
Figure 4F:
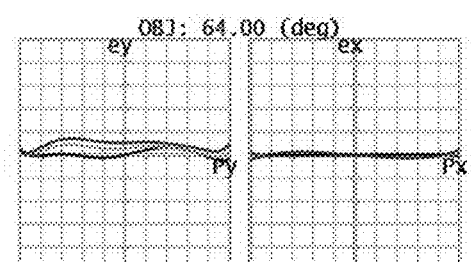
Figure 4G:
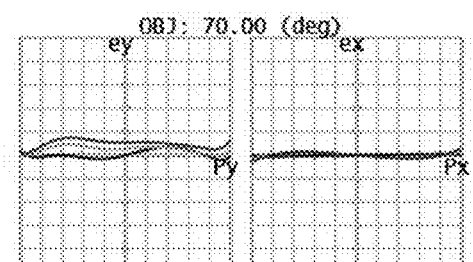
Figure 4H:
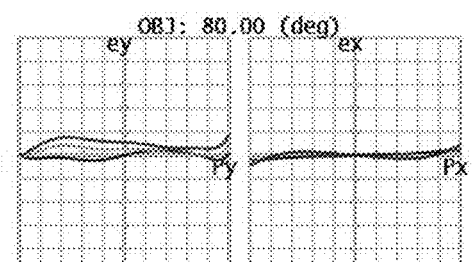
Figure 4I:
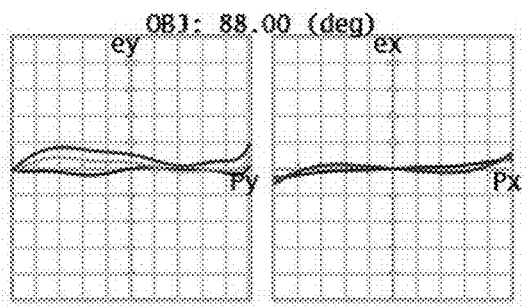
Figure 4J:
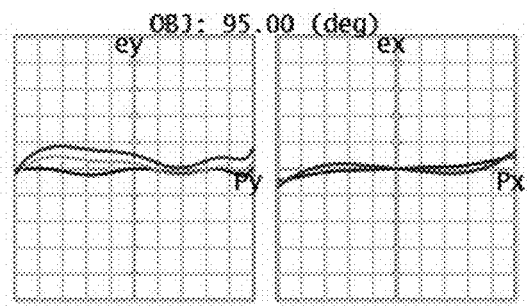
Figure 4K:
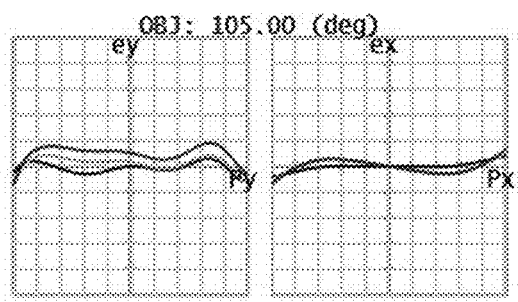
Figure 4L:
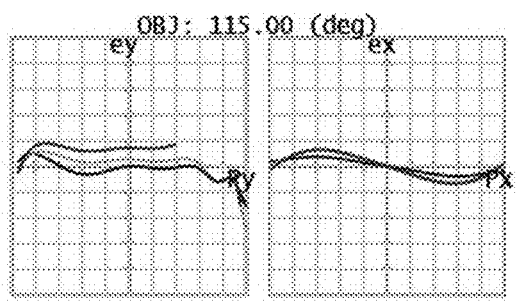

FIG. 1 illustrates a wide-angle lens according to Embodiment 1 of the disclosure. FIG. 2A illustrates curvature of field and distortion of the wide-angle lens according to Embodiment 1 of the disclosure. FIG. 2B illustrates curvature of field and distortion of the wide-angle lens according to Embodiment 1 of the disclosure. FIG. 3A illustrates lateral chromatic aberration (transverse chromatic aberration) of the wide-angle lens according to Embodiment 1 of the disclosure. FIG. 3B illustrates spherical aberration (longitudinal aberration) of the wide-angle lens according to Embodiment 1 of the disclosure. FIG. 4A to FIG. 4L illustrate transverse aberration of the wide-angle lens according to Embodiment 1 of the disclosure. Here, in FIG. 2A, FIG. 2B, FIG. 3A, FIG. 3B, and FIG. 4A to FIG. 4L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 4A to FIG. 4L, a maximum scale of the longitudinal axis is ±50.000 μm.

As shown in FIG. 1, a wide-angle lens 1000 includes, sequentially arranged from the object side (L1 side), a first lens 110, a second lens 120, a third lens 130, a fourth lens 140, a diaphragm 180, a fifth lens 150, a sixth lens 160 and a seventh lens 170. Among them, the sixth lens 160 and the seventh lens 170 are bonded together by an adhesive to constitute a cemented lens.

Here, the first lens 110 is a lens (simply referred to as negative lens) with negative refractive power, having a convex surface (first surface 1) facing the object side L1 and a concave surface (second surface 2) facing the image side L2. In this embodiment, the first lens 110 is a glass lens in which the first surface 1 and the second surface 2 are spherical surfaces.

The second lens 120 is a lens with negative refractive power, having a convex surface (third surface 3) facing the object side L1 and a concave surface (fourth surface 4) facing the image side L2. In this embodiment, the second lens 120 is a plastic lens in which the third surface 3 and the fourth surface 4 are aspherical surfaces.

The third lens 130 is a lens (simply referred to as positive lens) with positive refractive power, having a concave surface (fifth surface 5) facing the object side L1 and a convex surface (sixth surface 6) facing the image side L2. In this embodiment, the third lens 130 is a plastic lens in which the fifth surface 5 and the sixth surface 6 are aspherical surfaces.

The fourth lens 140 is a lens with positive refractive power, having a concave surface (seventh surface 7) facing the object side L1 and a convex surface (eighth surface 8) facing the image side L2. In this embodiment, the fourth lens 140 is a plastic lens in which the seventh surface 7 and the eighth surface 8 are aspherical surfaces.

The fifth lens 150 is a lens with positive refractive power, having a convex surface (tenth surface 10) facing the object side L1 and a convex surface (eleventh surface 11) facing the image side L2. In this embodiment, the fifth lens 150 is composed of a glass lens.

The sixth lens 160 is a lens with negative refractive power, having a concave surface (twelfth surface 12) facing the object side L1 and a concave surface (thirteenth surface 13) facing the image side L2. The sixth lens 160 constitutes a cemented lens with the seventh lens 170. In this embodiment, the sixth lens 160 is a plastic lens in which the twelfth surface 12 and the thirteenth surface 13 are aspherical surfaces.

The seventh lens 170 is a lens with positive refractive power, having a convex surface (thirteenth surface 13) facing the object side L1 and a convex surface (fourteenth surface 14) facing the image side L2. In this embodiment, the seventh lens 170 is a plastic lens in which the thirteenth surface 13 and the fourteenth surface 14 are aspherical surfaces.

In addition, in this embodiment, as shown in FIG. 1, a light-shielding sheet 190 is provided between the second lens 120 and the third lens 130, a filter 200 is arranged on the image side of the seventh lens 170, and an imaging element 300 is arranged on the image side of the filter 200.

In this embodiment, in the lens system as a whole, an effective focal length f is 1.023 mm, an object-to-image distance (total track) d is 13.611 mm, an F value (image space F/#) is 2.02, a maximum half field of view (HFOV) (maximum half field angle) is 115 degrees, and an entrance pupil diameter HEP is 0.507 mm.

Table 1 shows physical properties of each surface of the wide-angle lens 1000 of this embodiment. Table 2-1 and Table 2-2 show aspheric coefficients of each surface of the wide-angle lens 1000 of this embodiment.

TABLE 1

| Surface | Radius of curvature | Thickness | $N_d$ | $v_d$ | Effective focal length | Effective focal length | Effective focal length |
|---|---|---|---|---|---|---|---|
| 1 | 11.420 | 1.510 | 1.871 | 40.73 | −5.963 | −1.338 | 3.148 |
| 2 | 3.350 | 2.050 | | | | | |
| 3* | 40.687 | 0.600 | 1.544 | 56.4 | −2.328 | | |
| 4* | 1.222 | 1.427 | | | | | |
| 5* | −11.789 | 0.689 | 1.544 | 56.4 | 6.742 | 3.122 | |
| 6* | −2.855 | 0.597 | | | | | |
| 7* | −13.315 | 0.778 | 1.635 | 23.9 | 4.923 | | |
| 8* | −2.589 | −0.039 | | | | | |
| 9 (diaphragm) | Infinite | 0.257 | | | | | |
| 10 | 15.150 | 1.288 | 1.697 | 55.46 | 3.175 | | 3.740 |
| 11 | −2.501 | 0.101 | | | | | |
| 12* | −5.143 | 0.500 | 1.635 | 23.9 | −1.297 | 13.449 | |
| 13* | 1.018 | 2.362 | 1.544 | 56.4 | 1.745 | | |
| 14* | −2.561 | 0.965 | | | | | |
| 15 | Infinite | 0.400 | | | | | |
| 16 | Infinite | 0.125 | | | | | |

In Table 1 above, the radius of curvature, thickness, and effective focal length are in units of mm. $N_d$ represents a refractive index for a ray of 587.56 nm. $v_d$ represents the Abbe number. * represents an aspheric surface.

TABLE 2-1

| Surface | c (1/radius of curvature) | K | A4 | A6 |
|---|---|---|---|---|
| 3 | 2.45778E−02 | 0.00000E+00 | −7.34647E−04 | 0.00000E+00 |
| 4 | 8.18649E−01 | −1.00000E+00 | 3.34909E−02 | 1.52429E−02 |
| 5 | −8.48284E−02 | 0.00000E+00 | −1.05901E−02 | 2.28744E−02 |
| 6 | −3.50286E−01 | 0.00000E+00 | 4.60516E−02 | 1.35719E−02 |
| 7 | −7.51052E−02 | 0.00000E+00 | 6.96916E−02 | 5.26973E−04 |
| 8 | −3.86206E−01 | 0.00000E+00 | 4.85130E−02 | 1.07658E−02 |
| 12 | −1.94439E−01 | 0.00000E+00 | 1.37213E−02 | −3.80723E−02 |
| 13 | 9.82404E−01 | −1.00000E+00 | 2.47704E−01 | −2.97167E−01 |
| 14 | −3.90445E−01 | 0.00000E+00 | 2.43790E−02 | −1.73998E−02 |

TABLE 2-2

| Surface | A8 | A10 | A12 | A14 | A16 |
|---|---|---|---|---|---|
| 3 | 0.00000E+00 | 0.00000E+00 | 0.00000E+00 | 0.00000E+00 | 0.00000E+00 |
| 4 | −3.29328E−03 | 2.82298E−03 | −4.88754E−04 | 0.00000E+00 | 0.00000E+00 |
| 5 | −5.12306E−03 | 0.00000E+00 | 0.00000E+00 | 0.00000E+00 | 0.00000E+00 |
| 6 | 0.00000E+00 | 0.00000E+00 | 0.00000E+00 | 0.00000E+00 | 0.00000E+00 |
| 7 | 4.37857E−03 | 2.92148E−03 | 0.00000E+00 | 0.00000E+00 | 0.00000E+00 |

TABLE 2-2-continued

| Surface | A8 | A10 | A12 | A14 | A16 |
|---|---|---|---|---|---|
| 8 | −5.94177E−03 | 1.11565E−02 | 0.00000E+00 | 0.00000E+00 | 0.00000E+00 |
| 12 | 1.79956E−02 | −7.87537E−04 | −1.30556E−03 | 0.00000E+00 | 0.00000E+00 |
| 13 | 1.73181E−01 | −4.77496E−02 | 4.65741E−03 | 0.00000E+00 | 0.00000E+00 |
| 14 | 1.34046E−02 | −4.35536E−03 | 5.73510E−04 | 0.00000E+00 | 0.00000E+00 |

In Table 2-1 and Table 2-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 2-1 and Table 2-2 above show the aspheric coefficients A4, A6, A8, A10, A12, A14 and A16 of each of the aspheric surfaces, which satisfy the following expression (Expression 1). In the following expression, Z represents sag (axis in an optical axis direction), r represents height (ray height) in a direction perpendicular to the optical axis, K represents the conic coefficient, and c represents the reciprocal of the radius of curvature.

$$Z = \frac{cr^2}{1 + \sqrt{1 - (1+K)c^2r^2}} + \sum_{n=2}^{5} A_{2n} r^{2n} \quad \text{[Expression 1]}$$

Here, in the wide-angle lens 1000, the object-to-image distance d is 13.611 mm, and the entrance pupil diameter HEP is 0.507 mm. Therefore, the following condition 1 is satisfied:

$$d/HEP < 29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.611 mm, and the effective focal length f of the lens system as a whole is 1.023 mm. Therefore, the following condition 2 is satisfied:

$$11.000 < d/f < 15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.023 mm, and the entrance pupil diameter HEP is 0.507 mm. Therefore, the following condition 3 is satisfied:

$$f/HEP < 2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 3.148 mm, and the combined effective focal length f567 of the fifth lens 150, the sixth lens 160, and the seventh lens 170 is 3.740 mm. Therefore, the following condition 4 is satisfied:

$$0.800 < f1234/f567 < 8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.740 mm, and the effective focal length f of the lens system as a whole is 1.023 mm. Therefore, the following condition 5 is satisfied:

$$2.800 < f567/f < 3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 2A to FIG. 4L, it is easy to ensure the optical performance while preventing the overall length of the lens system from becoming excessively large.

Figure 5:
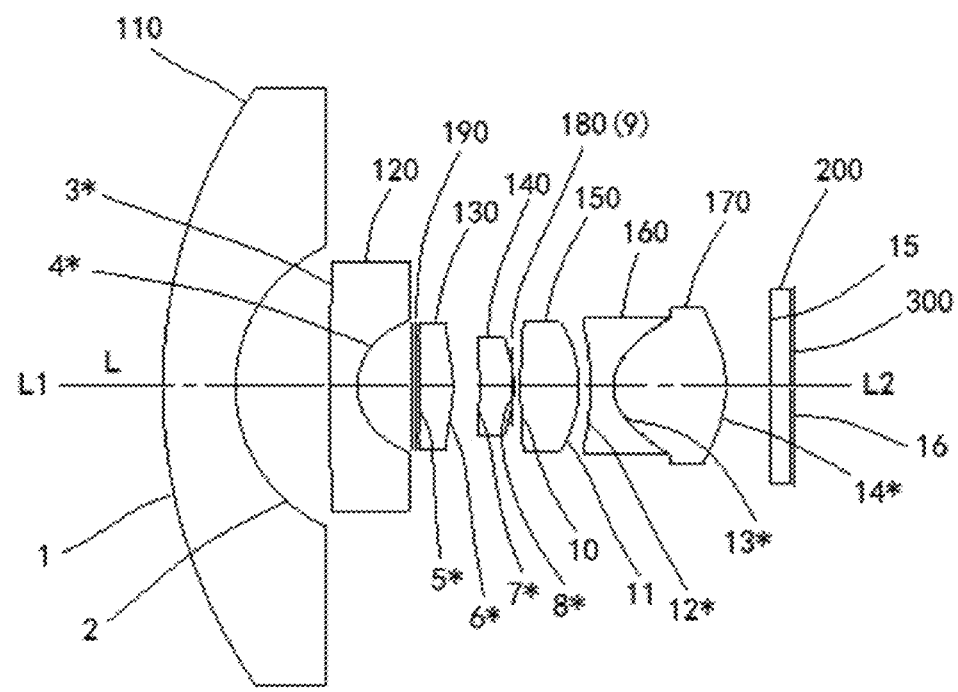
FIG. 5 illustrates a wide-angle lens according to Embodiment 2 of the disclosure.
Figure 6A:
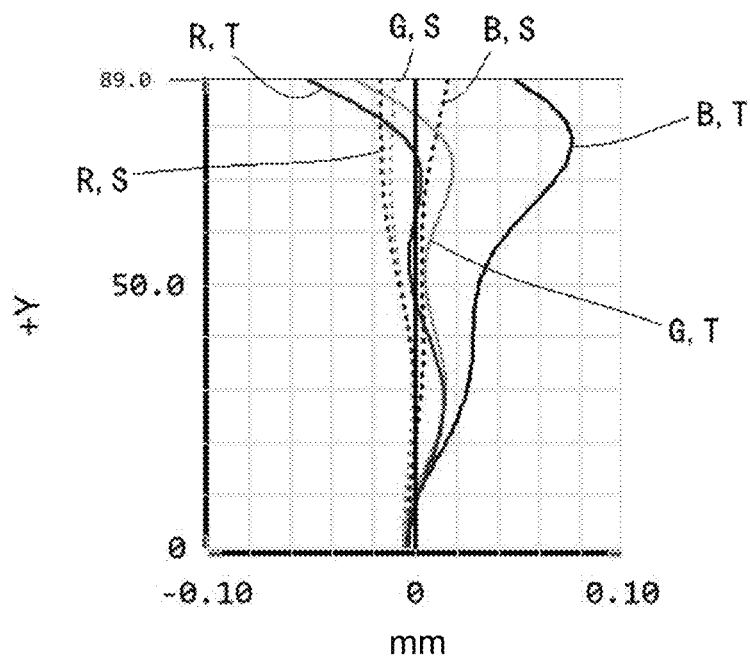
FIG. 6A illustrates curvature of field and distortion of the wide-angle lens according to Embodiment 2 of the disclosure.
Figure 6B:
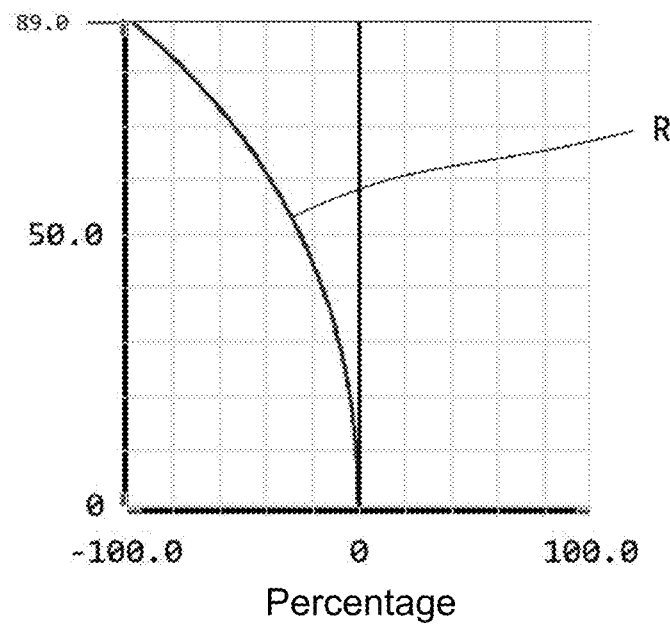
FIG. 6B illustrates curvature of field and distortion of the wide-angle lens according to Embodiment 2 of the disclosure.
Figure 7A:
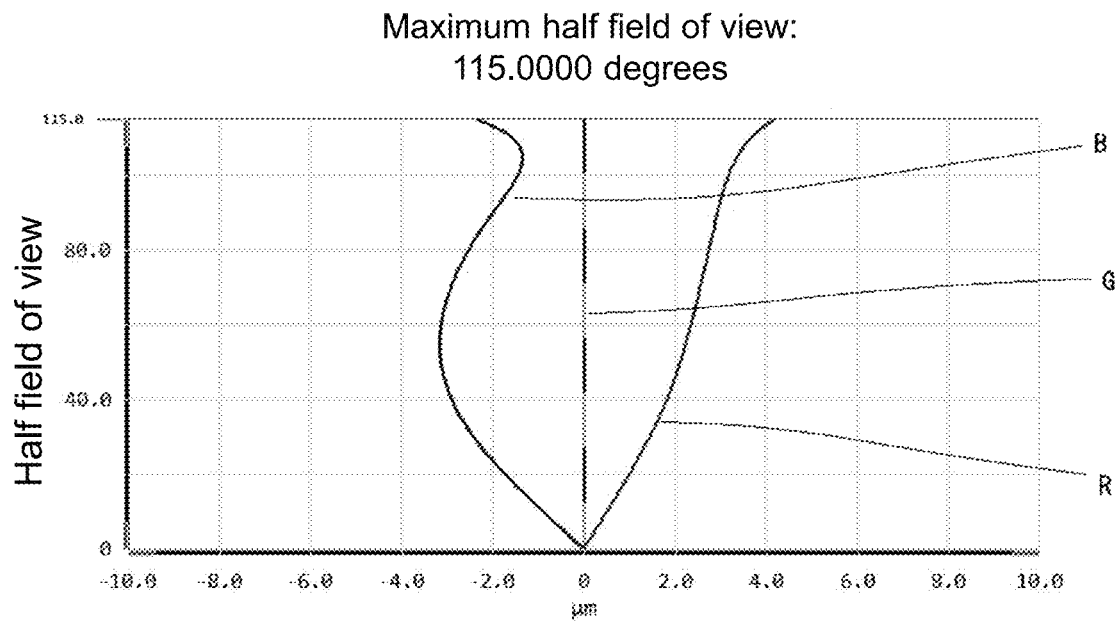
FIG. 7A illustrates lateral chromatic aberration (transverse chromatic aberration) of the wide-angle lens according to Embodiment 2 of the disclosure.
Figure 7B:
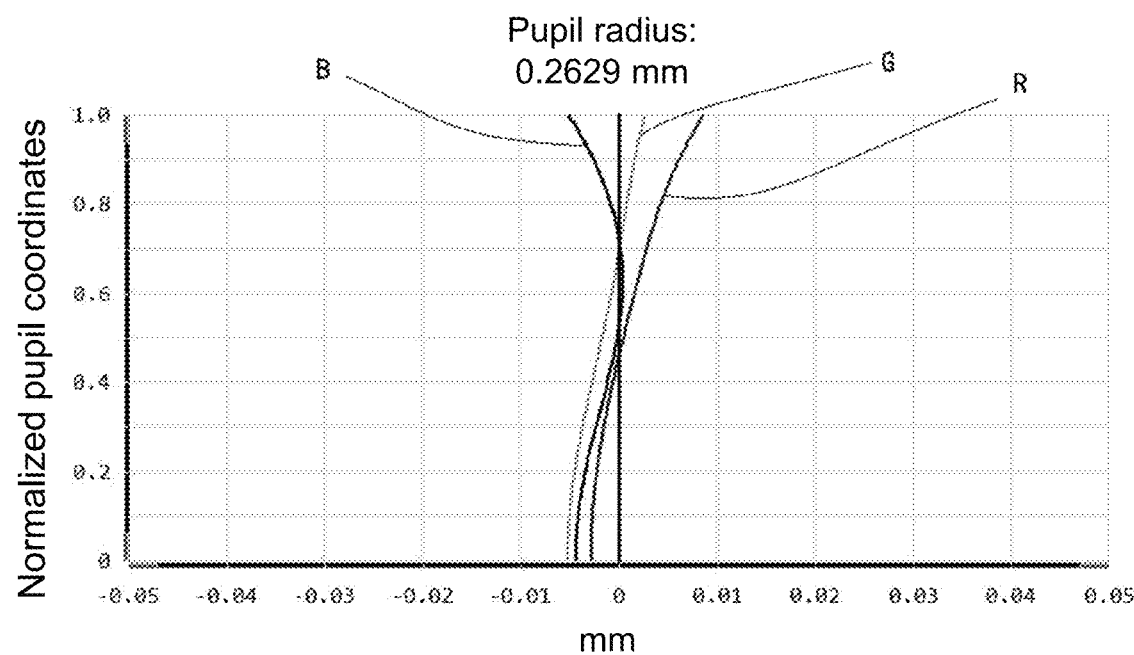
FIG. 7B illustrates spherical aberration (longitudinal aberration) of the wide-angle lens according to Embodiment 2 of the disclosure.
Figure 8A:
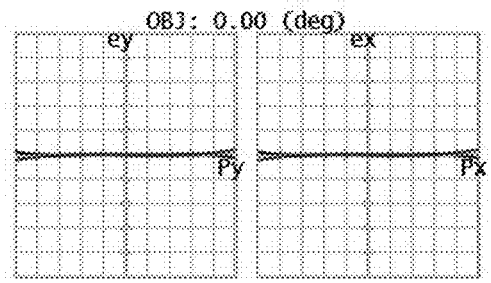
FIG. 8A to FIG. 8L illustrate transverse aberration of the wide-angle lens according to Embodiment 2 of the disclosure.
Figure 8B:
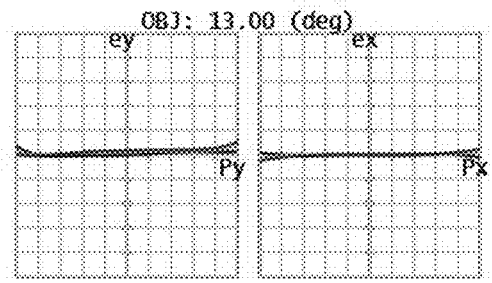
Figure 8C:
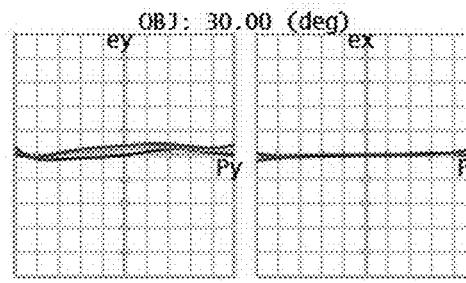
Figure 8D:
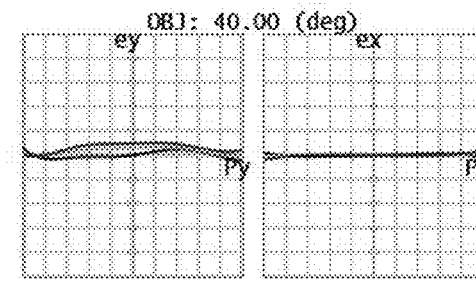
Figure 8E:
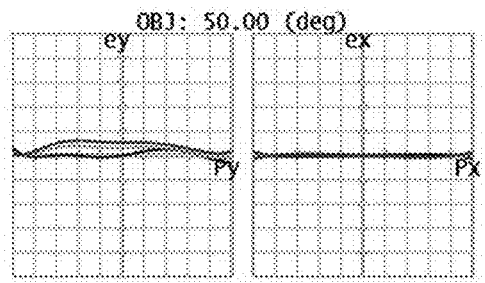
Figure 8F:
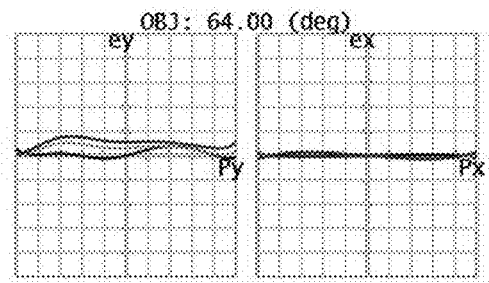
Figure 8G:
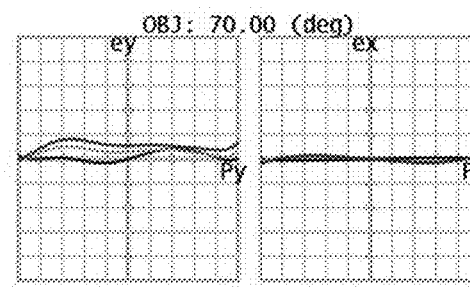
Figure 8H:
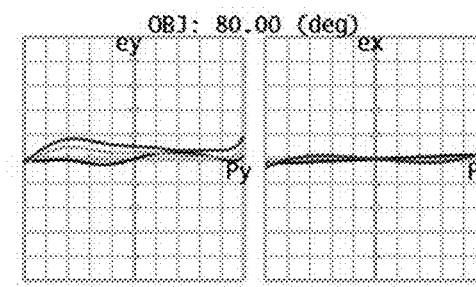
Figure 8I:
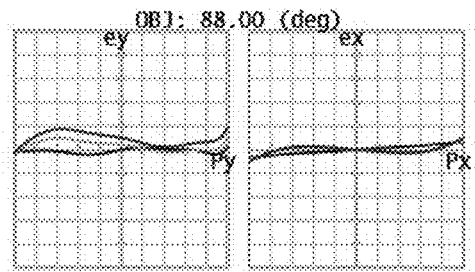
Figure 8J:
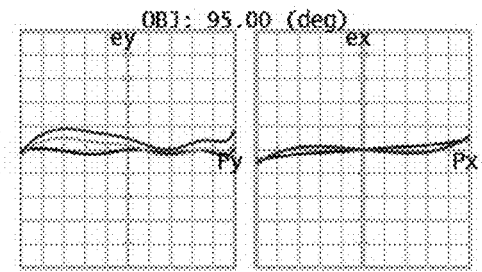
Figure 8K:
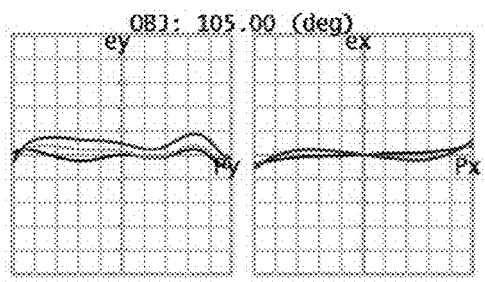
Figure 8L:
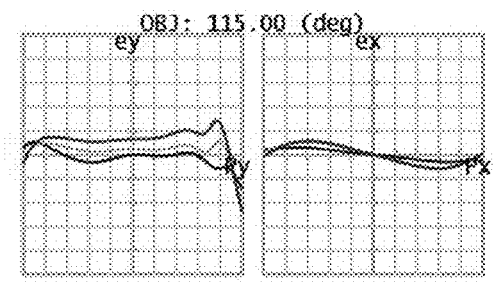

FIG. 5 illustrates a wide-angle lens according to Embodiment 2 of the disclosure. FIG. 6A illustrates curvature of field and distortion of the wide-angle lens according to Embodiment 2 of the disclosure. FIG. 6B illustrates curvature of field and distortion of the wide-angle lens according to Embodiment 2 of the disclosure. FIG. 7A illustrates lateral chromatic aberration (transverse chromatic aberration) of the wide-angle lens according to Embodiment 2 of the disclosure. FIG. 7B illustrates spherical aberration (longitudinal aberration) of the wide-angle lens according to Embodiment 2 of the disclosure. FIG. 8A to FIG. 8L illustrate transverse aberration of the wide-angle lens according to Embodiment 2 of the disclosure. Here, in FIG. 6A, FIG. 6B, FIG. 7A, FIG. 7B, and FIG. 8A to FIG. 8L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 8A to FIG. 8L, the maximum scale of the longitudinal axis is ±50.000 μm.

As shown in FIG. 5, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

In addition, as shown in FIG. 5, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.062 mm, the object-to-image distance (total track) d is 13.610 mm, the F value (image space F/#) is 2.02, the maximum HFOV (maximum half field angle) is 115 degrees, and the entrance pupil diameter HEP is 0.526 mm.

Table 3 shows physical properties of each surface of the wide-angle lens 1000 of this embodiment. Table 4-1 and Table 4-2 show aspheric coefficients of each surface of the wide-angle lens 1000 of this embodiment.

TABLE 3

| Surface | Radius of curvature | Thickness | $N_d$ | $v_d$ | Effective focal length | Effective focal length | Effective focal length |
|---|---|---|---|---|---|---|---|
| 1 | 11.363 | 1.561 | 1.871 | 40.73 | −5.895 | −1.406 | 4.237 |
| 2 | 3.310 | 2.024 | | | | | |
| 3* | 45.562 | 0.600 | 1.544 | 56.4 | −2.489 | | |
| 4* | 1.309 | 1.360 | | | | | |
| 5* | −9.695 | 0.703 | 1.544 | 56.4 | 6.297 | 3.380 | |
| 6* | −2.596 | 0.565 | | | | | |
| 7* | −4.818 | 0.732 | 1.635 | 23.9 | 5.955 | | |
| 8* | −2.244 | −0.043 | | | | | |
| 9 (diaphragm) | Infinite | 0.201 | | | | | |
| 10 | 16.738 | 1.245 | 1.697 | 55.46 | 3.436 | | 3.640 |
| 11 | −2.709 | 0.244 | | | | | |
| 12* | −6.978 | 0.500 | 1.635 | 23.9 | −1.379 | 8.893 | |
| 13* | 1.029 | 2.426 | 1.544 | 56.4 | 1.765 | | |
| 14* | −2.427 | 0.968 | | | | | |
| 15 | Infinite | 0.400 | | | | | |
| 16 | Infinite | 0.125 | | | | | |

In Table 3 above, the radius of curvature, thickness, and effective focal length are in units of mm. $N_d$ represents a refractive index for a ray of 587.56 nm. $v_d$ represents the Abbe number. * represents an aspheric surface.

TABLE 4-1

| Surface | c (1/radius of curvature) | K | A4 | A6 |
|---|---|---|---|---|
| 3 | 2.19479E−02 | 0.00000E+00 | −5.53459E−04 | 0.00000E+00 |
| 4 | 7.64121E−01 | −1.00000E+00 | 4.76939E−02 | 1.87020E−03 |
| 5 | −1.03144E−01 | 0.00000E+00 | −4.63672E−04 | 2.39479E−02 |
| 6 | −3.85243E−01 | 0.00000E+00 | 6.19526E−02 | 9.41258E−03 |
| 7 | −2.07563E−01 | 0.00000E+00 | 8.01905E−02 | −1.81445E−02 |
| 8 | −4.45687E−01 | 0.00000E+00 | 5.32792E−02 | −3.21513E−03 |
| 12 | −1.43308E−01 | 0.00000E+00 | 2.59200E−02 | −4.54679E−02 |
| 13 | 9.71678E−01 | −1.00000E+00 | 2.67381E−01 | −3.18917E−01 |
| 14 | −4.11994E−01 | 0.00000E+00 | 2.93182E−02 | −2.05884E−02 |

TABLE 4-2

| Surface | A8 | A10 | A12 | A14 | A16 |
|---|---|---|---|---|---|
| 3 | 0.00000E+00 | 0.00000E+00 | 0.00000E+00 | 0.00000E+00 | 0.00000E+00 |
| 4 | 1.18832E−02 | −3.21383E−03 | 7.23623E−04 | 0.00000E+00 | 0.00000E+00 |
| 5 | −7.11892E−03 | 0.00000E+00 | 0.00000E+00 | 0.00000E+00 | 0.00000E+00 |
| 6 | 0.00000E+00 | 0.00000E+00 | 0.00000E+00 | 0.00000E+00 | 0.00000E+00 |
| 7 | 1.48329E−02 | −9.20347E−04 | 0.00000E+00 | 0.00000E+00 | 0.00000E+00 |
| 8 | 3.16264E−03 | 4.17741E−03 | 0.00000E+00 | 0.00000E+00 | 0.00000E+00 |
| 12 | −7.44565E−04 | −1.42901E−03 | 0.00000E+00 | 0.00000E+00 | 0.00000E+00 |
| 13 | 1.80337E−01 | −4.80759E−02 | 4.57265E−03 | 0.00000E+00 | 0.00000E+00 |
| 14 | 1.50208E−02 | −4.69107E−03 | 5.90742E−04 | 0.00000E+00 | 0.00000E+00 |

In Table 4-1 and Table 4-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 4-1 and Table 4-2 above show the aspheric coefficients A4, A6, A8, A10, A12, A14 and A16 of each of the aspheric surfaces, which satisfy Expression 1 above.

Here, in the wide-angle lens 1000, the object-to-image distance d is 13.610 mm, and the entrance pupil diameter HEP is 0.526 mm. Therefore, the following condition 1 is satisfied:

$$d/HEP < 29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.610 mm, and the effective focal length f of the lens system as a whole is 1.062 mm. Therefore, the following condition 2 is satisfied:

$$11.000 < d/f < 15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.062 mm, and the entrance pupil diameter HEP is 0.526 mm. Therefore, the following condition 3 is satisfied:

$$f/HEP < 2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 4.237 mm, and the combined effective focal length f567 of the fifth lens 150, the sixth lens 160, and the seventh lens 170 is 3.640 mm. Therefore, the following condition 4 is satisfied:

$$0.800 < f1234/f567 < 8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.640 mm, and the effective focal length f of the lens system as a whole is 1.062 mm. Therefore, the following condition 5 is satisfied:

$$2.800 < f567/f < 3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 6A to FIG. 8L, it is easy to ensure the optical performance while preventing the overall length of the lens system from becoming excessively large.

Figure 9:
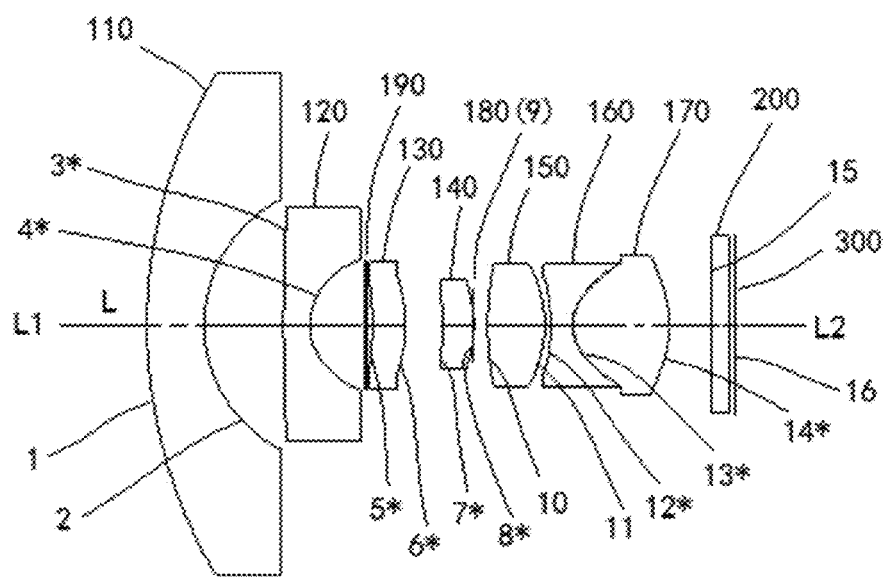
FIG. 9 illustrates a wide-angle lens according to Embodiment 3 of the disclosure.
Figure 10A:
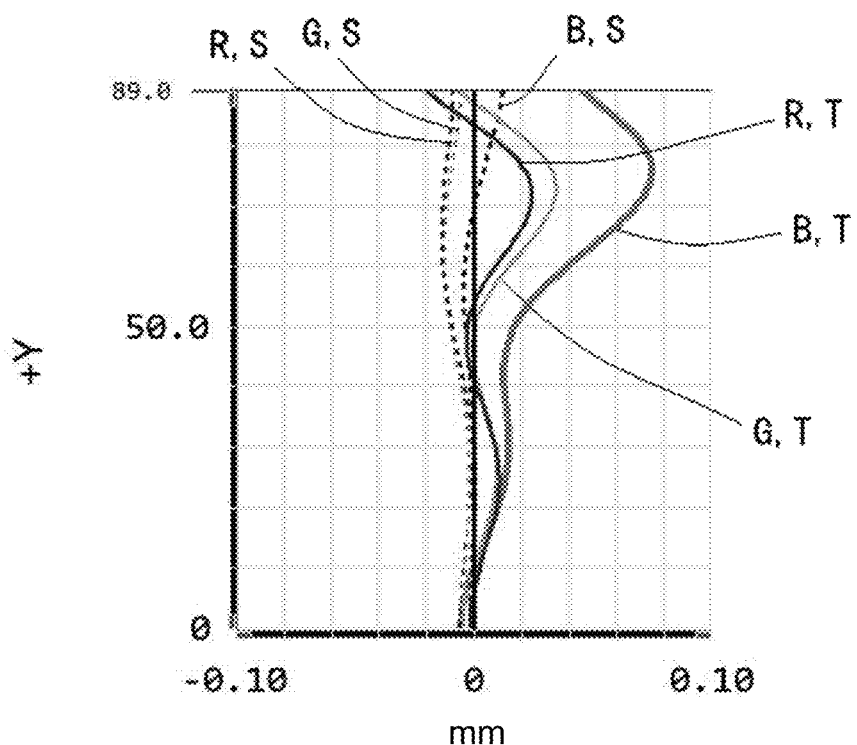
FIG. 10A illustrates curvature of field and distortion of the wide-angle lens according to Embodiment 3 of the disclosure.
Figure 10B:
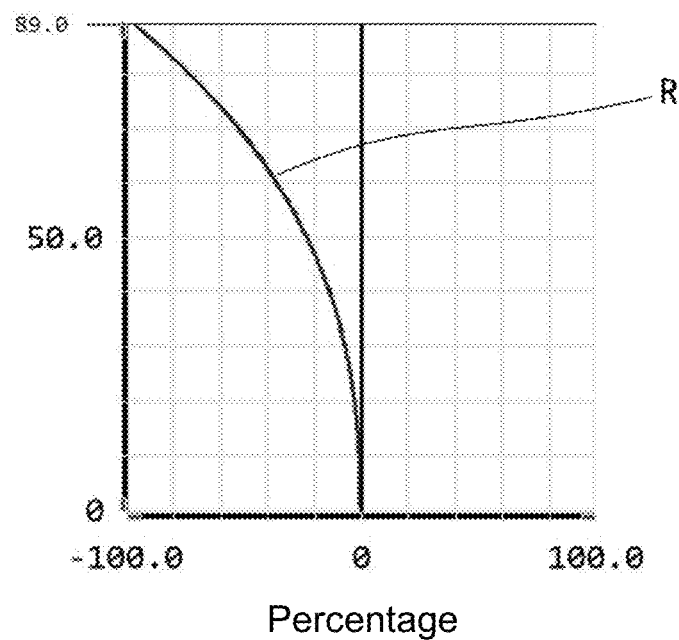
FIG. 10B illustrates curvature of field and distortion of the wide-angle lens according to Embodiment 3 of the disclosure.
Figure 11:
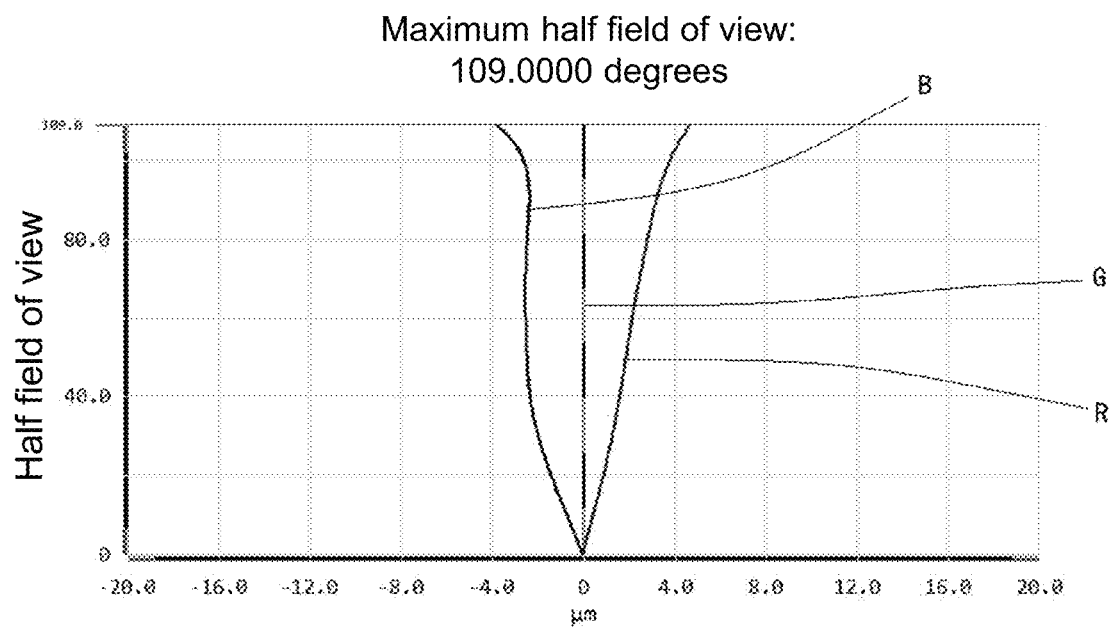
FIG. 11A illustrates lateral chromatic aberration (transverse chromatic aberration) of the wide-angle lens according to Embodiment 3 of the disclosure.
FIG. 11B illustrates spherical aberration (longitudinal aberration) of the wide-angle lens according to Embodiment 3 of the disclosure.
Figure 11B:
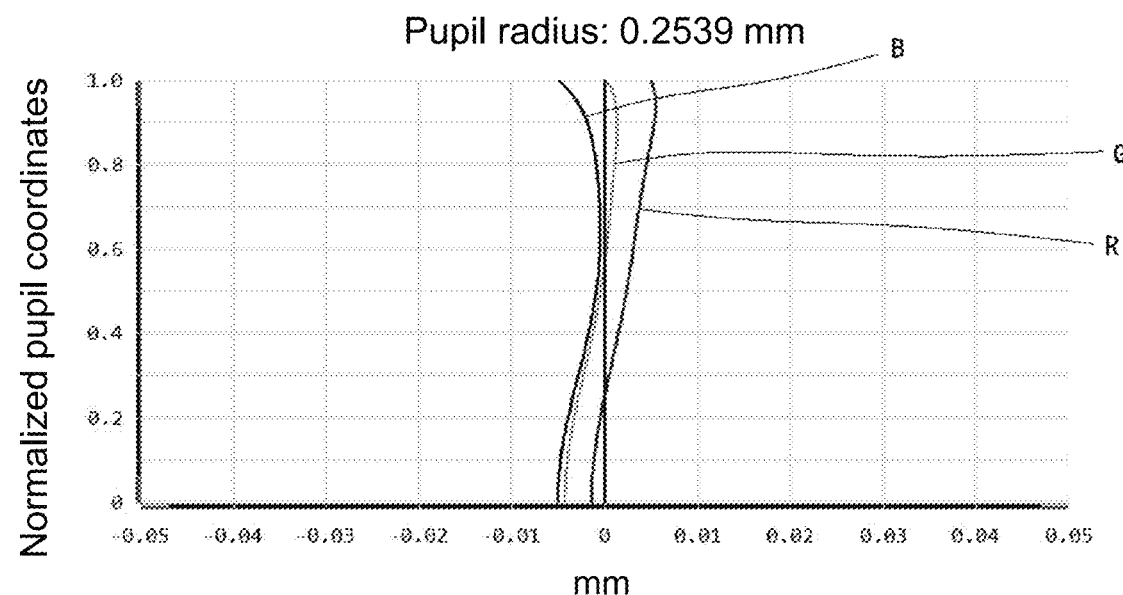
Figure 12A:
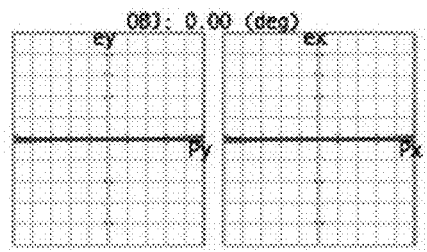
FIG. 12A to FIG. 12L illustrate transverse aberration of the wide-angle lens according to Embodiment 3 of the disclosure.
Figure 12B:
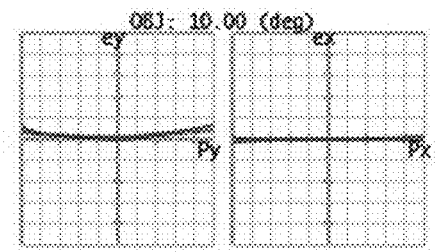
Figure 12C:
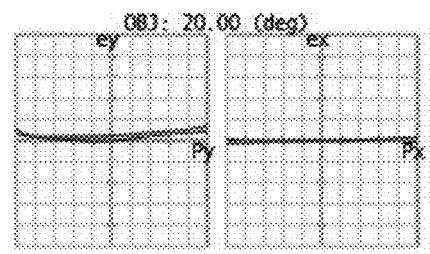
Figure 12D:
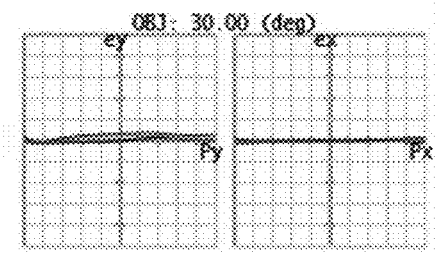
Figure 12E:
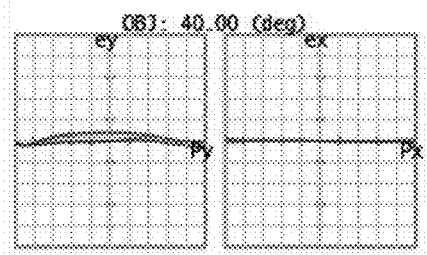
Figure 12F:
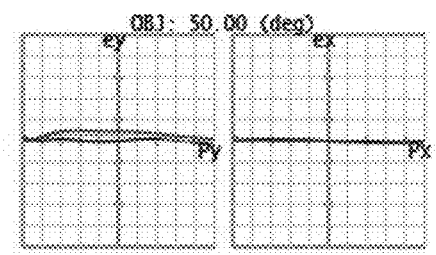
Figure 12G:
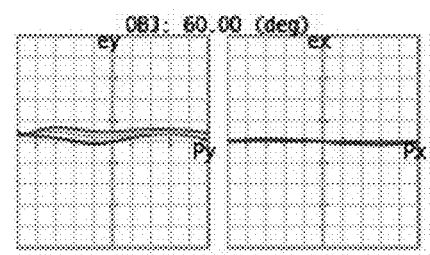
Figure 12H:
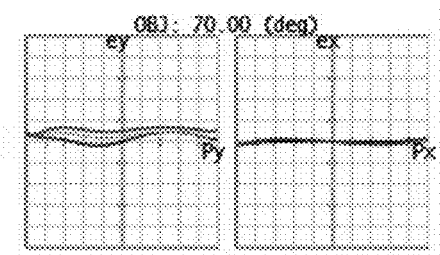
Figure 12I:
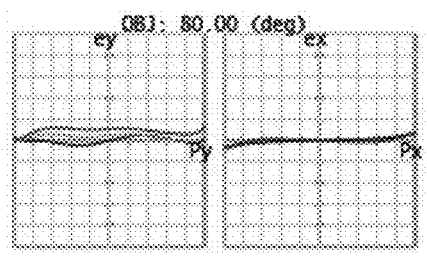
Figure 12J:
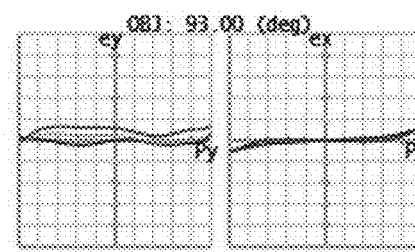
Figure 12K:
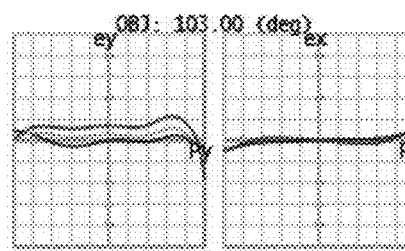
Figure 12L:
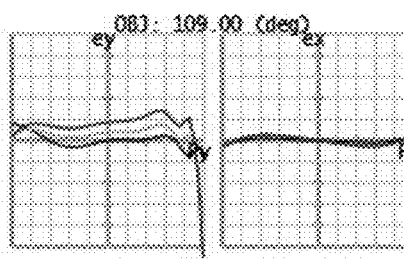

FIG. 9 illustrates a wide-angle lens according to Embodiment 3 of the disclosure. FIG. 10A illustrates curvature of field and distortion of the wide-angle lens according to Embodiment 3 of the disclosure. FIG. 10B illustrates curvature of field and distortion of the wide-angle lens according to Embodiment 3 of the disclosure. FIG. 11A illustrates lateral chromatic aberration (transverse chromatic aberration) of the wide-angle lens according to Embodiment 3 of the disclosure. FIG. 11B illustrates spherical aberration (longitudinal aberration) of the wide-angle lens according to Embodiment 3 of the disclosure. FIG. 12A to FIG. 12L illustrate transverse aberration of the wide-angle lens according to Embodiment 3 of the disclosure. Here, in FIG. 10A, FIG. 10B, FIG. 11A, FIG. 11B, and FIG. 12A to FIG. 12L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 12A to FIG. 12L, the maximum scale of the longitudinal axis is ±50.000 μm.

As shown in FIG. 9, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

In addition, as shown in FIG. 9, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.026 mm, the object-to-image distance (total track) d is 13.403 mm, the F value (image space F/#) is 2.02, the maximum HFOV (maximum half field angle) is 109 degrees, and the entrance pupil diameter HEP is 0.508 mm.

Table 5 shows physical properties of each surface of the wide-angle lens 1000 of this embodiment. Table 6-1 and Table 6-2 show aspheric coefficients of each surface of the wide-angle lens 1000 of this embodiment.

TABLE 5

| Surface | Radius of curvature | Thickness | $N_d$ | $v_d$ | Effective focal length | Effective focal length | Effective focal length |
|---|---|---|---|---|---|---|---|
| 1 | 11.171 | 1.300 | 1.871 | 40.73 | −5.584 | −1.467 | 3.572 |
| 2 | 3.204 | 1.815 | | | | | |
| 3* | 35.057 | 0.600 | 1.544 | 56.4 | −2.673 | | |
| 4* | 1.388 | 1.422 | | | | | |
| 5* | −5.882 | 0.763 | 1.544 | 56.4 | 7.039 | 3.456 | |
| 6* | −2.425 | 0.839 | | | | | |
| 7* | −6.368 | 0.718 | 1.635 | 23.9 | 5.655 | | |
| 8* | −2.397 | −0.037 | | | | | |
| 9 (diaphragm) | Infinite | 0.347 | | | | | |
| 10 | 7.103 | 1.300 | 1.697 | 55.46 | 3.076 | | 3.663 |
| 11 | −2.839 | 0.135 | | | | | |
| 12* | −4.077 | 0.500 | 1.635 | 23.9 | −1.284 | 11.542 | |
| 13* | 1.068 | 2.213 | 1.544 | 56.4 | 1.744 | | |
| 14* | −2.294 | 0.963 | | | | | |
| 15 | Infinite | 0.400 | | | | | |
| 16 | Infinite | 0.125 | | | | | |

In Table 5 above, the radius of curvature, thickness, and effective focal length are in units of mm. $N_d$ represents a refractive index for a ray of 587.56 nm. $v_d$ represents the Abbe number. * represents an aspheric surface.

TABLE 6-1

| Surface | c (1/radius of curvature) | K | A4 | A6 |
|---|---|---|---|---|
| 3 | 2.85248E−02 | 0.00000E+00 | −7.73953E−04 | −2.76248E−05 |
| 4 | 7.20578E−01 | −1.00000E+00 | 1.69157E−02 | 2.83585E−02 |
| 5 | −1.69997E−01 | 0.00000E+00 | 4.77013E−03 | 1.28269E−02 |
| 6 | −4.12314E−01 | 0.00000E+00 | 4.38590E−02 | 3.36563E−03 |
| 7 | −1.57044E−01 | 0.00000E+00 | 5.20793E−02 | −9.74604E−03 |
| 8 | −4.17218E−01 | 0.00000E+00 | 3.75209E−02 | −1.18387E−03 |
| 12 | −2.45256E−01 | 0.00000E+00 | 1.12258E−02 | −2.18878E−02 |
| 13 | 9.36158E−01 | −1.00000E+00 | 1.84892E−01 | −2.17248E−01 |
| 14 | −4.35910E−01 | 0.00000E+00 | 6.08264E−02 | −6.37284E−02 |

TABLE 6-2

| Surface | A8 | A10 | A12 | A14 | A16 |
|---|---|---|---|---|---|
| 3 | 0.00000E+00 | 0.00000E+00 | 0.00000E+00 | 0.00000E+00 | 0.00000E+00 |
| 4 | −1.08170E−02 | 3.74135E−03 | 0.00000E+00 | 0.00000E+00 | 0.00000E+00 |
| 5 | −6.95368E−04 | 2.73435E−05 | 0.00000E+00 | 0.00000E+00 | 0.00000E+00 |
| 6 | 2.29705E−03 | −1.23857E−05 | 0.00000E+00 | 0.00000E+00 | 0.00000E+00 |
| 7 | 8.85677E−03 | −7.73714E−05 | 0.00000E+00 | 0.00000E+00 | 0.00000E+00 |
| 8 | 4.43504E−03 | 9.66329E−04 | 0.00000E+00 | 0.00000E+00 | 0.00000E+00 |
| 12 | 3.37862E−04 | 9.82658E−03 | −3.53648E−03 | −1.65685E−04 | 0.00000E+00 |
| 13 | 1.49413E−01 | −7.49877E−02 | 2.96657E−02 | −5.71297E−03 | 0.00000E+00 |
| 14 | 5.78846E−02 | −2.66940E−02 | 6.28648E−03 | −5.86821E−04 | 0.00000E+00 |

In Table 6-1 and Table 6-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 6-1 and Table 6-2 above show the aspheric coefficients A4, A6, A8, A10, A12, A14 and A16 of each of the aspheric surfaces, which satisfy Expression 1 above.

Here, in the wide-angle lens 1000, the object-to-image distance d is 13.403 mm, and the entrance pupil diameter HEP is 0.508 mm. Therefore, the following condition 1 is satisfied:

$$d/HEP < 29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.403 mm, and the effective focal length f of the lens system as a whole is 1.026 mm. Therefore, the following condition 2 is satisfied:

$$11.000 < d/f < 15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.026 mm, and the entrance pupil diameter HEP is 0.508 mm. Therefore, the following condition 3 is satisfied:

$$f/HEP < 2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 3.572 mm, and the combined effective focal length f567 of the fifth lens 150, the sixth lens 160, and the seventh lens 170 is 3.663 mm. Therefore, the following condition 4 is satisfied:

$$0.800 < f1234/f567 < 8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.663 mm, and the effective focal length f of the lens system as a whole is 1.026 mm. Therefore, the following condition 5 is satisfied:

$$2.800 < f567/f < 3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 10A to FIG. 12L, it is easy to ensure the optical performance while preventing the overall length of the lens system from becoming excessively large.

Figure 13:
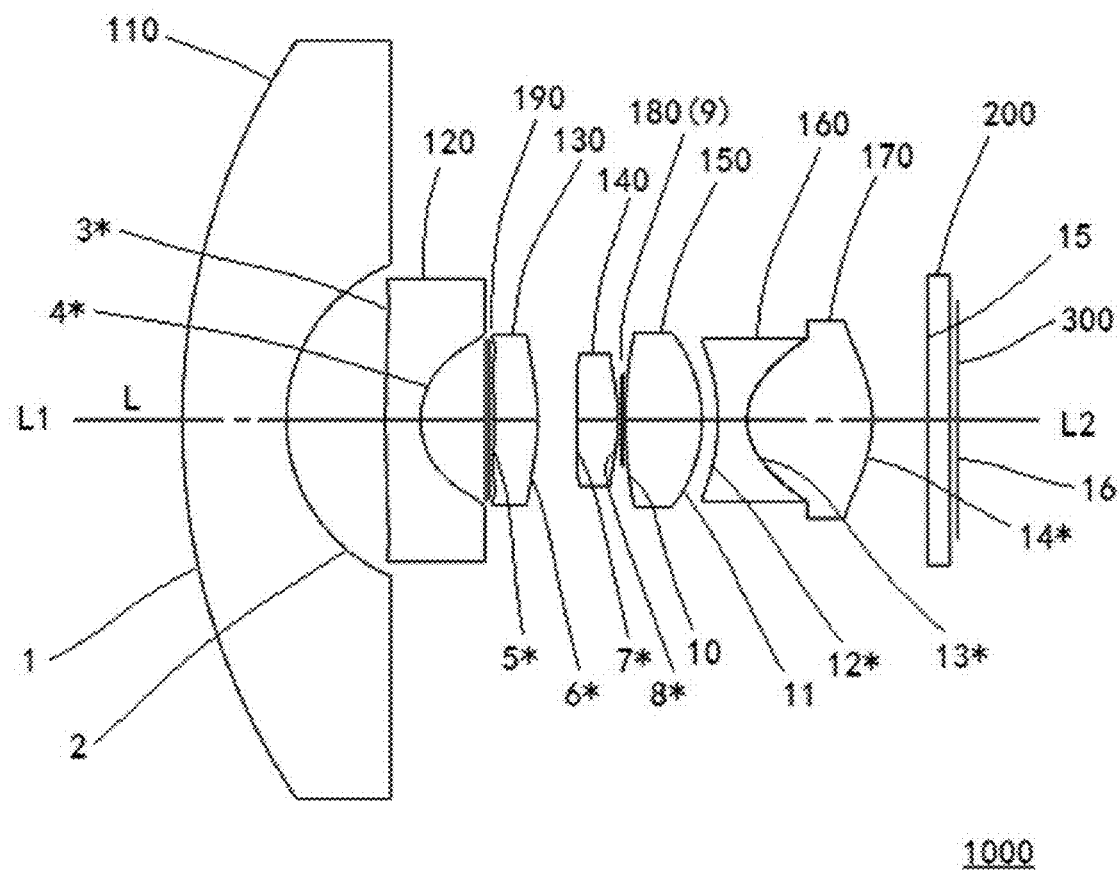
FIG. 13 illustrates a wide-angle lens according to Embodiment 4 of the disclosure.
Figure 14A:
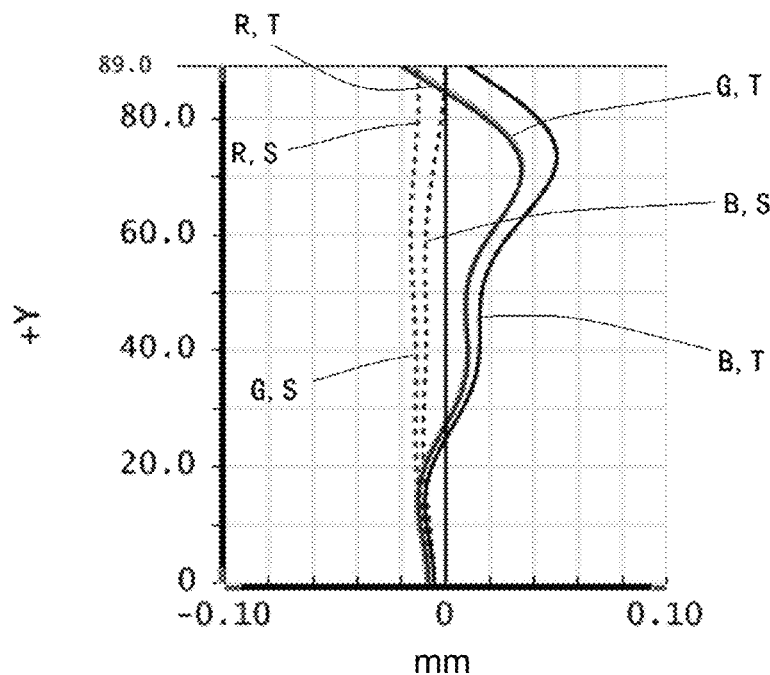
FIG. 14A illustrates curvature of field and distortion of the wide-angle lens according to Embodiment 4 of the disclosure.
Figure 14B:
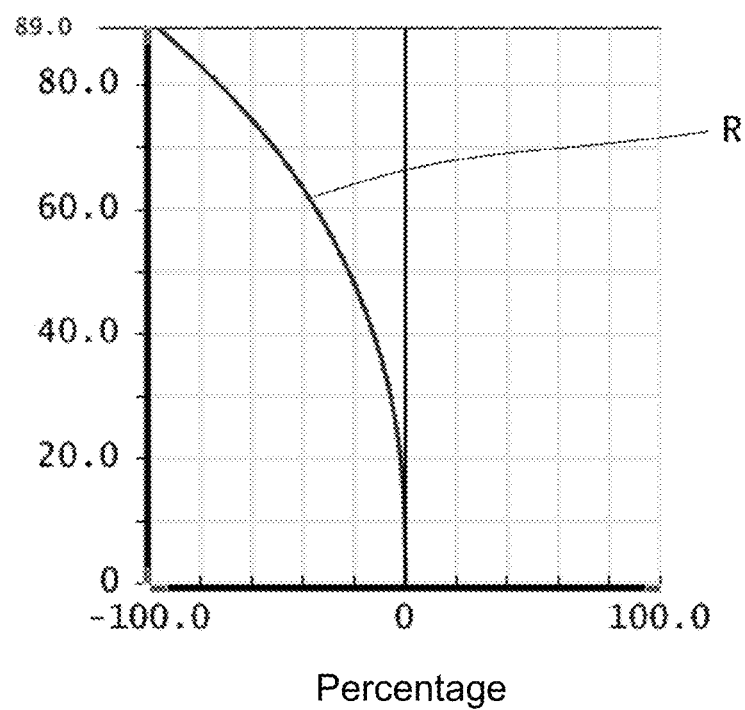
FIG. 14B illustrates curvature of field and distortion of the wide-angle lens according to Embodiment 4 of the disclosure.
Figure 15A:
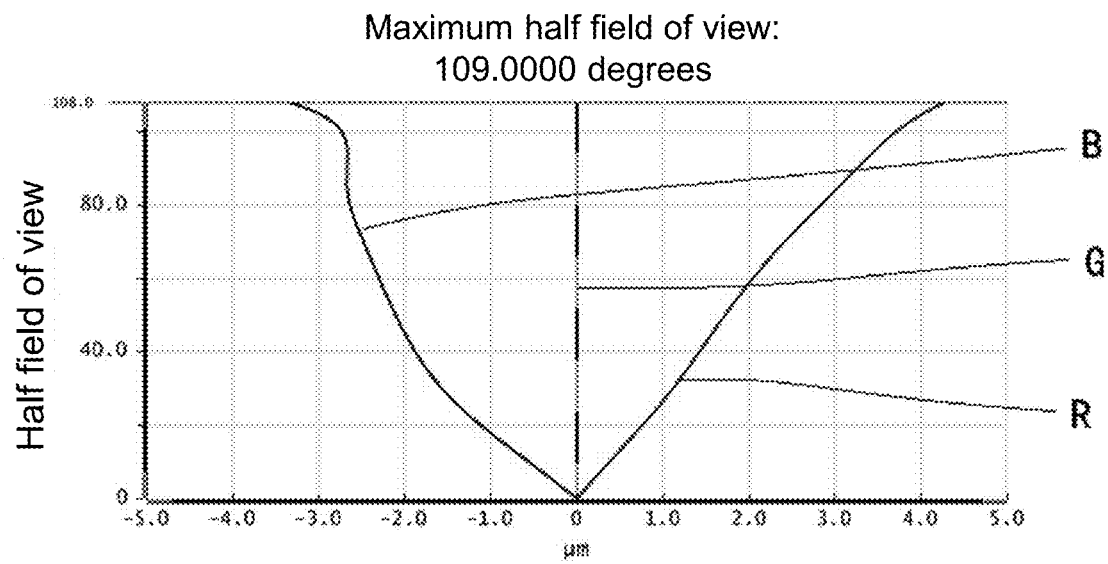
FIG. 15A illustrates lateral chromatic aberration (transverse chromatic aberration) of the wide-angle lens according to Embodiment 4 of the disclosure.
Figure 15B:
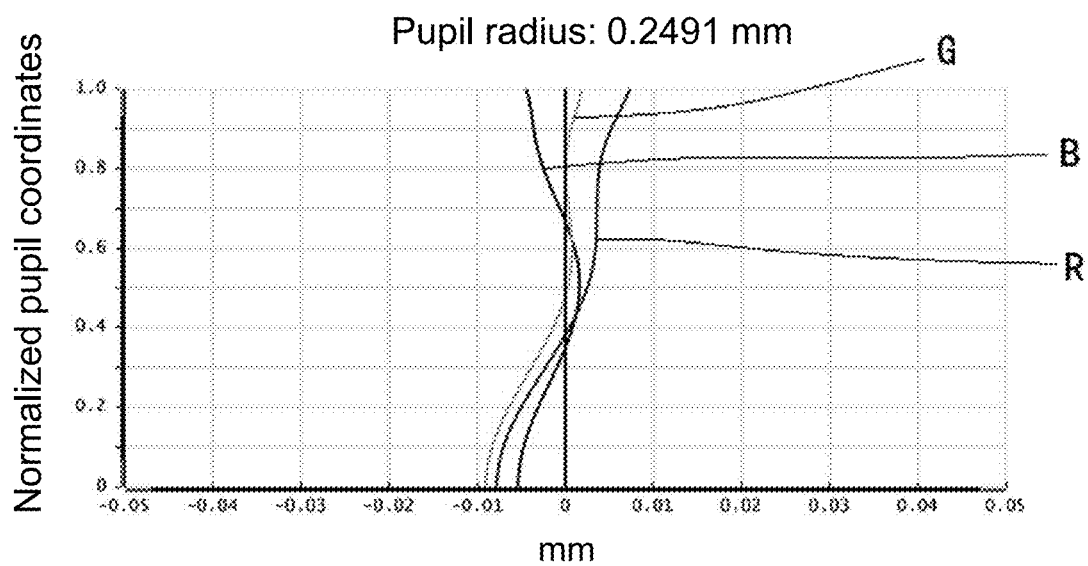
FIG. 15B illustrates spherical aberration (longitudinal aberration) of the wide-angle lens according to Embodiment 4 of the disclosure.
Figure 16I:
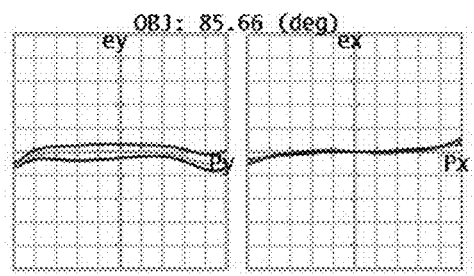
Figure 16J:
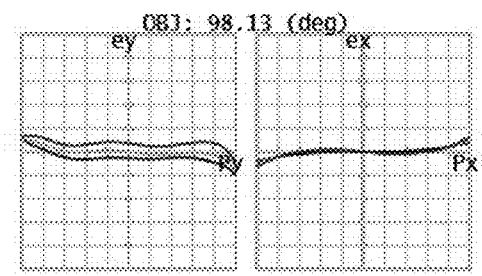
Figure 16K:
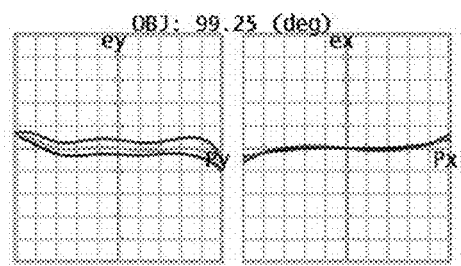
Figure 16L:
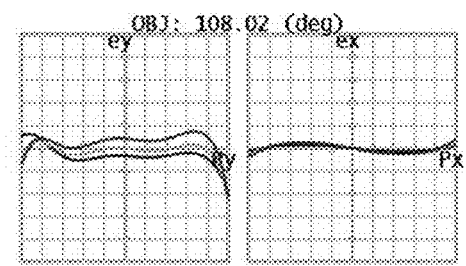

FIG. 13 illustrates a wide-angle lens according to Embodiment 4 of the disclosure. FIG. 14A illustrates curvature of field and distortion of the wide-angle lens according to Embodiment 4 of the disclosure. FIG. 14B illustrates curvature of field and distortion of the wide-angle lens according to Embodiment 4 of the disclosure. FIG. 15A illustrates lateral chromatic aberration (transverse chromatic aberration) of the wide-angle lens according to Embodiment 4 of the disclosure. FIG. 15B illustrates spherical aberration (longitudinal aberration) of the wide-angle lens according to Embodiment 4 of the disclosure. FIG. 16A to FIG. 16L illustrate transverse aberration of the wide-angle lens according to Embodiment 4 of the disclosure. Here, in FIG. 14A, FIG. 14B, FIG. 15A, FIG. 15B, and FIG. 16A to FIG. 16L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 16A to FIG. 16L, the maximum scale of the longitudinal axis is ±50.000 μm.

As shown in FIG. 13, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

In addition, as shown in FIG. 13, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.011 mm, the object-to-image distance (total track) d is 13.404 mm, the F value (image space F/#) is 2.03, the maximum HFOV (maximum half field angle) is 109 degrees, and the entrance pupil diameter HEP is 0.498 mm.

Table 7 shows physical properties of each surface of the wide-angle lens 1000 of this embodiment. Table 8-1 and Table 8-2 show aspheric coefficients of each surface of the wide-angle lens 1000 of this embodiment.

TABLE 7

| Surface | Radius of curvature | Thickness | $N_d$ | $v_d$ | Effective focal length | Effective focal length | Effective focal length |
|---|---|---|---|---|---|---|---|
| 1 | 11.850 | 1.800 | 1.871 | 40.73 | −4.888 | −1.347 | 6.571 |
| 2 | 2.910 | 1.717 | | | | | |
| 3* | 23.043 | 0.600 | 1.544 | 56.4 | −2.540 | | |
| 4* | 1.291 | 1.276 | | | | | |
| 5* | −13.541 | 0.750 | 1.544 | 56.4 | 7.736 | 3.614 | |
| 6* | −3.273 | 0.679 | | | | | |
| 7* | −20.063 | 0.710 | 1.635 | 23.9 | 5.873 | | |
| 8* | −3.188 | 0.056 | | | | | |
| 9 (diaphragm) | Infinite | 0.076 | | | | | |
| 10 | 7.740 | 1.320 | 1.697 | 55.46 | 2.821 | | 3.355 |
| 11 | −2.450 | 0.271 | | | | | |
| 12* | −4.136 | 0.500 | 1.635 | 23.9 | −1.168 | 8.497 | |
| 13* | 0.946 | 2.180 | 1.544 | 56.4 | 1.601 | | |
| 14* | −2.056 | 0.944 | | | | | |
| 15 | Infinite | 0.400 | | | | | |
| 16 | Infinite | 0.125 | | | | | |

In Table 7 above, the radius of curvature, thickness, and effective focal length are in units of mm. $N_d$ represents a refractive index for a ray of 587.56 nm. $v_d$ represents the Abbe number. * represents an aspheric surface.

TABLE 8-1

| Surface | c (1/radius of curvature) | K | A4 | A6 |
|---|---|---|---|---|
| 3 | 4.33971E−02 | 0.00000E+00 | −6.82448E−03 | 3.73911E−03 |
| 4 | 7.74346E−01 | −5.39587E+00 | 2.32631E−01 | −1.17492E−01 |
| 5 | −7.38477E−02 | 0.00000E+00 | 2.29113E−02 | 4.37979E−03 |
| 6 | −3.05528E−01 | 0.00000E+00 | 4.74057E−02 | −5.28192E−03 |
| 7 | −4.98442E−02 | 0.00000E+00 | 4.27102E−02 | −4.22032E−04 |
| 8 | −3.13660E−01 | 0.00000E+00 | 3.38907E−02 | 3.26534E−03 |
| 12 | −2.41789E−01 | 0.00000E+00 | −3.09436E−02 | 3.41185E−02 |
| 13 | 1.05668E+00 | −1.00000E+00 | 5.66189E−04 | −1.14232E−02 |
| 14 | −4.86390E−01 | 0.00000E+00 | 7.16605E−02 | −6.17165E−02 |

TABLE 8-2

| Surface | A8 | A10 | A12 | A14 | A16 |
|---|---|---|---|---|---|
| 3 | −1.15147E−03 | 1.50789E−04 | −7.30801E−06 | 0.00000E+00 | 0.00000E+00 |
| 4 | 7.01048E−02 | −7.98133E−03 | −4.17335E−03 | 0.00000E+00 | 0.00000E+00 |
| 5 | 1.21716E−02 | −8.91664E−03 | 0.00000E+00 | 0.00000E+00 | 0.00000E+00 |
| 6 | 2.05279E−02 | −2.11693E−02 | 5.41203E−03 | 0.00000E+00 | 0.00000E+00 |
| 7 | 6.15517E−03 | 0.00000E+00 | 0.00000E+00 | 0.00000E+00 | 0.00000E+00 |
| 8 | 8.49340E−03 | 3.83965E−03 | −2.61241E−03 | 0.00000E+00 | 0.00000E+00 |
| 12 | −5.25642E−02 | 5.03801E−02 | −2.60337E−02 | 5.67639E−03 | 0.00000E+00 |
| 13 | 1.93193E−02 | −2.02628E−02 | 1.27147E−02 | −3.03203E−03 | 0.00000E+00 |
| 14 | 5.37377E−02 | −2.41958E−02 | 5.72598E−03 | −5.29799E−04 | 0.00000E+00 |

In Table 8-1 and Table 8-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 8-1 and Table 8-2 above show the aspheric coefficients A4, A6, A8, A10, A12, A14 and A16 of each of the aspheric surfaces, which satisfy Expression 1 above.

Here, in the wide-angle lens 1000, the object-to-image distance d is 13.404 mm, and the entrance pupil diameter HEP is 0.498 mm. Therefore, the following condition 1 is satisfied:

$$d/HEP<29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.404 mm, and the effective focal length f of the lens system as a whole is 1.011 mm. Therefore, the following condition 2 is satisfied:

$$11.000<d/f<15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.011 mm, and the entrance pupil diameter HEP is 0.498 mm. Therefore, the following condition 3 is satisfied:

$$f/HEP<2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 6.571 mm, and the combined effective focal length f567 of the fifth lens 150, the sixth lens 160, and the seventh lens 170 is 3.355 mm. Therefore, the following condition 4 is satisfied:

$$0.800<f1234/f4567<8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.355 mm, and the effective focal length f of the lens system as a whole is 1.011 mm. Therefore, the following condition 5 is satisfied:

$$2.800<f567/f<3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 14A to FIG. 16L, it is easy to ensure the optical performance while preventing the overall length of the lens system from becoming excessively large.

Figure 17:
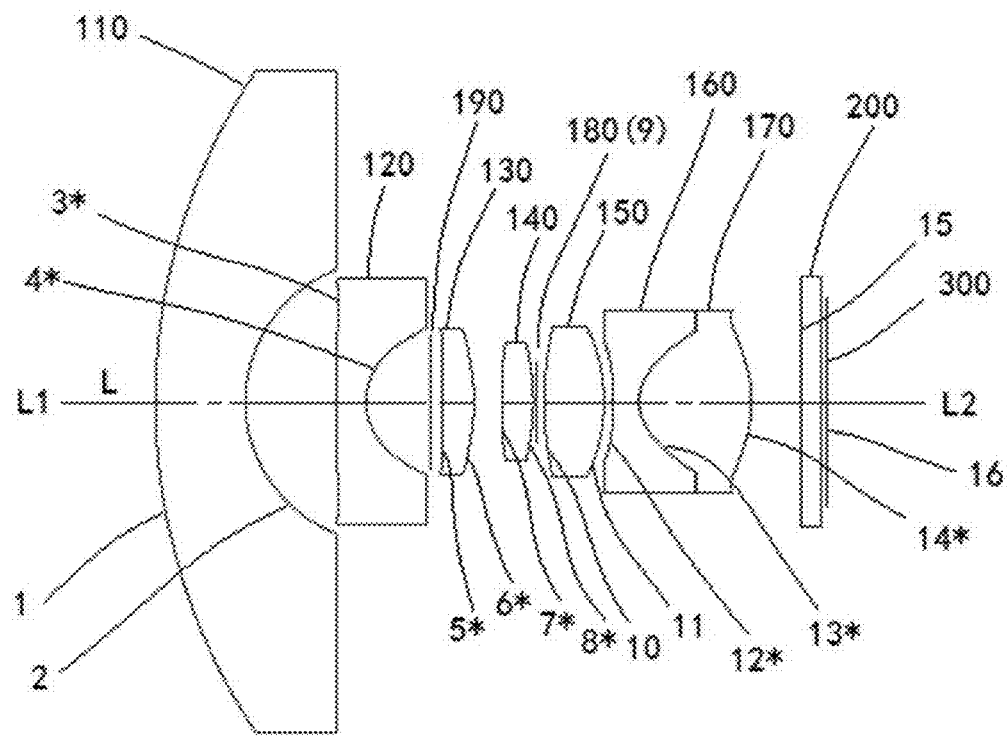
FIG. 17 illustrates a wide-angle lens according to Embodiment 5 of the disclosure.
Figure 18A:
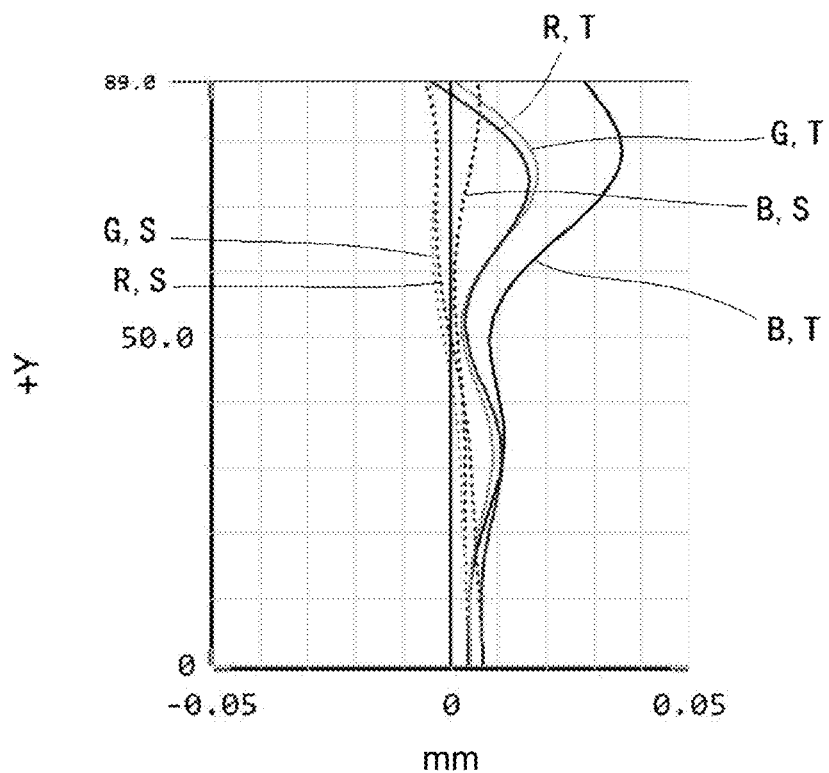
FIG. 18A illustrates curvature of field and distortion of the wide-angle lens according to Embodiment 5 of the disclosure.
Figure 18B:
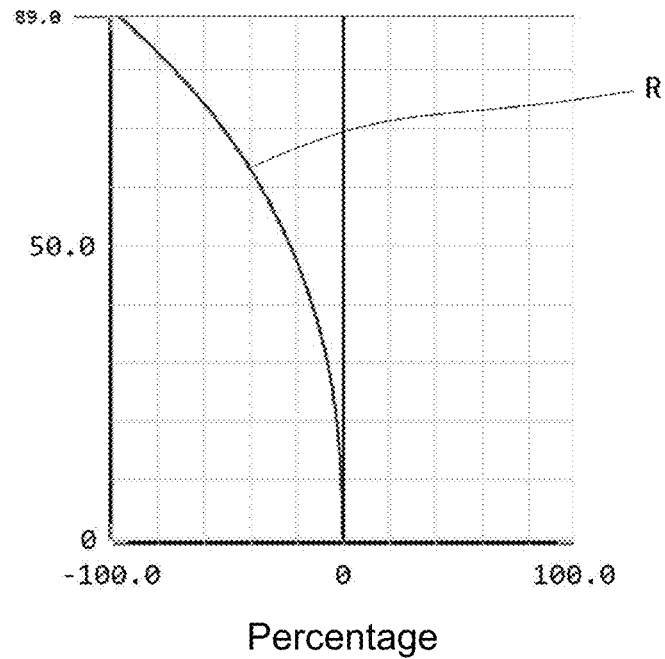
FIG. 18B illustrates curvature of field and distortion of the wide-angle lens according to Embodiment 5 of the disclosure.
Figure 19A:
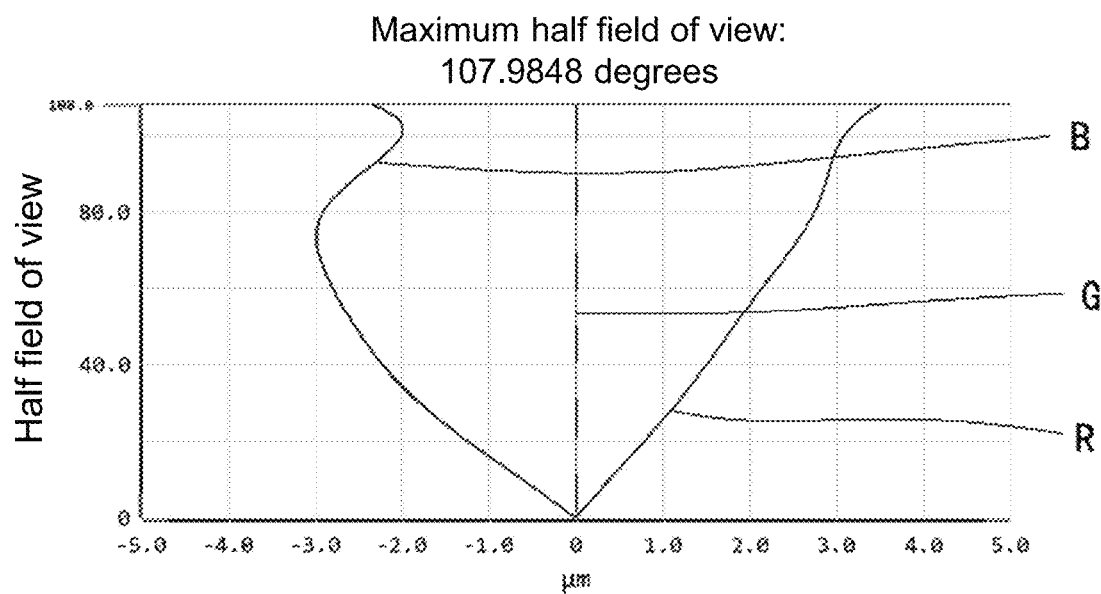
FIG. 19A illustrates lateral chromatic aberration (transverse chromatic aberration) of the wide-angle lens according to Embodiment 5 of the disclosure.
Figure 19B:
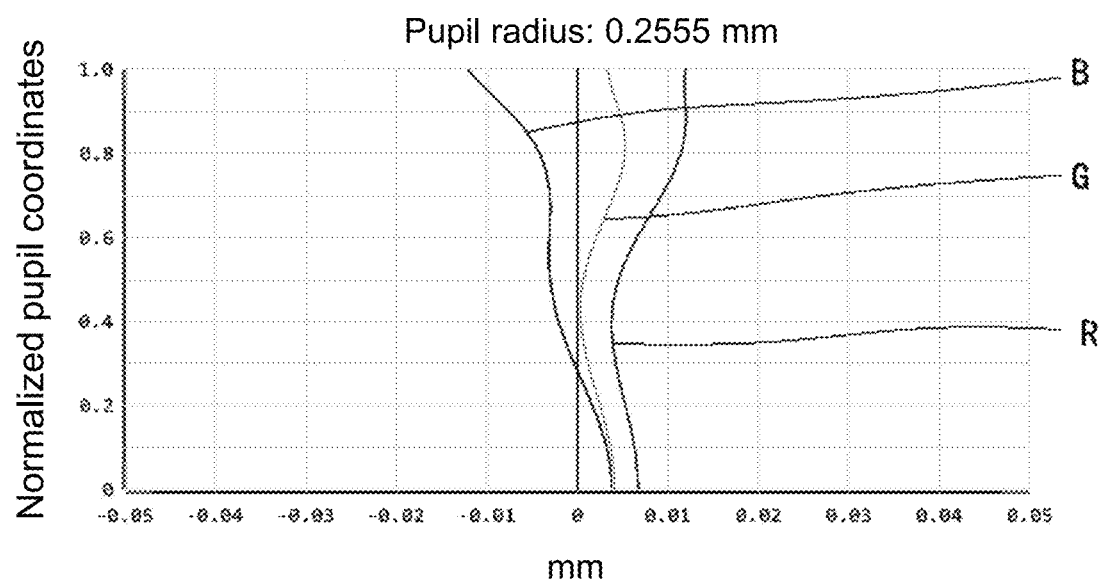
FIG. 19B illustrates spherical aberration (longitudinal aberration) of the wide-angle lens according to Embodiment 5 of the disclosure.
Figure 20I:
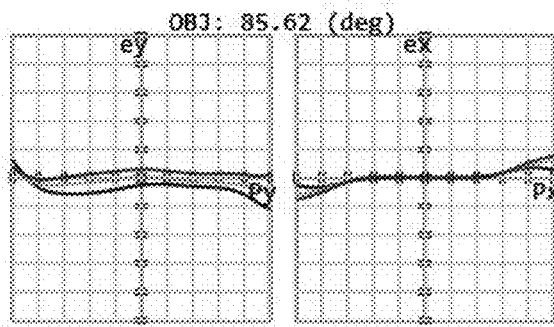
Figure 20J:
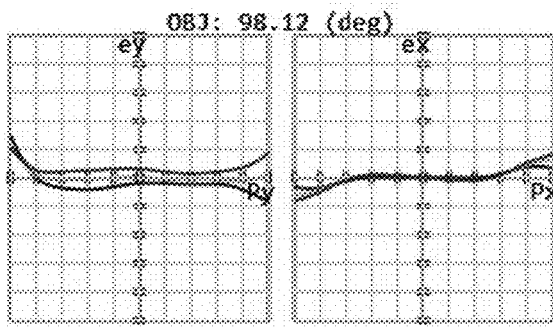
Figure 20K:
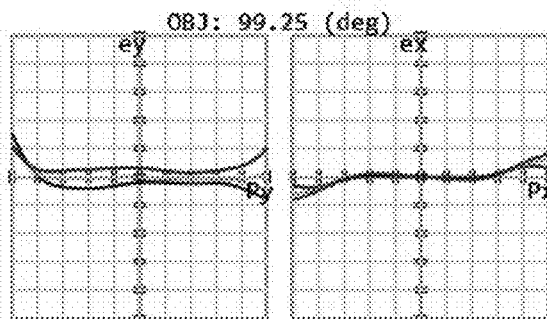
Figure 20L:
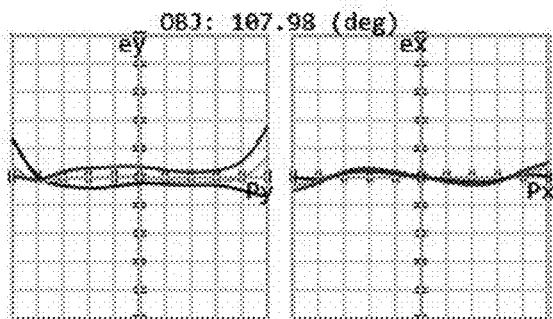

FIG. 17 illustrates a wide-angle lens according to Embodiment 5 of the disclosure. FIG. 18A illustrates curvature of field and distortion of the wide-angle lens according to Embodiment 5 of the disclosure. FIG. 18B illustrates curvature of field and distortion of the wide-angle lens according to Embodiment 5 of the disclosure. FIG. 19A illustrates lateral chromatic aberration (transverse chromatic aberration) of the wide-angle lens according to Embodiment 5 of the disclosure. FIG. 19B illustrates spherical aberration (longitudinal aberration) of the wide-angle lens according to Embodiment 5 of the disclosure. FIG. 20A to FIG. 20L illustrate transverse aberration of the wide-angle lens according to Embodiment 5 of the disclosure. Here, in FIG. 18A, FIG. 18B, FIG. 19A, FIG. 19B, and FIG. 20A to FIG. 20L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 20A to FIG. 20L, the maximum scale of the longitudinal axis is ±50.000 μm.

As shown in FIG. 17, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

In addition, as shown in FIG. 17, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.021 mm, the object-to-image distance (total track) d is 13.398 mm, the F value (image space F/#) is 2, the maximum HFOV (maximum half field angle) is 108 degrees, and the entrance pupil diameter HEP is 0.511 mm.

Table 9 shows physical properties of each surface of the wide-angle lens 1000 of this embodiment. Table 10-1 and Table 10-2 show aspheric coefficients of each surface of the wide-angle lens 1000 of this embodiment.

TABLE 9

| Surface | Radius of curvature | Thickness | $N_d$ | $v_d$ | Effective focal length | Effective focal length | Effective focal length |
|---|---|---|---|---|---|---|---|
| 1 | 11.850 | 1.800 | 1.871 | 40.73 | −4.662 | −1.258 | 4.142 |
| 2 | 2.810 | 1.790 | | | | | |
| 3* | 21.109 | 0.610 | 1.544 | 56.4 | −2.419 | | |
| 4* | 1.226 | 1.511 | | | | | |
| 5* | −41.052 | 0.645 | 1.544 | 56.4 | 7.227 | 3.259 | |
| 6* | −3.608 | 0.559 | | | | | |
| 7* | 35.384 | 0.625 | 1.635 | 23.9 | 5.224 | | |
| 8* | −3.636 | 0.050 | | | | | |
| 9 (diaphragm) | Infinite | 0.157 | | | | | |
| 10 | 6.330 | 1.200 | 1.697 | 55.46 | 3.312 | | 3.679 |
| 11 | −3.350 | 0.180 | | | | | |
| 12* | −5.730 | 0.510 | 1.635 | 23.9 | −1.201 | 9.670 | |
| 13* | 0.910 | 2.250 | 1.544 | 56.4 | 1.592 | | |
| 14* | −2.306 | 0.986 | | | | | |
| 15 | Infinite | 0.400 | | | | | |
| 16 | Infinite | 0.125 | | | | | |

In Table 9 above, the radius of curvature, thickness, and effective focal length are in units of mm. $N_d$ represents a refractive index for a ray of 587.56 nm. $v_d$ represents the Abbe number. * represents an aspheric surface.

TABLE 10-1

| Surface | c (1/radius of curvature) | K | A4 | A6 |
|---|---|---|---|---|
| 3 | 4.73738E−02 | 0.00000E+00 | −5.16461E−03 | 2.97096E−03 |
| 4 | 8.15727E−01 | −3.85594E+00 | 2.02517E−01 | −7.83664E−02 |
| 5 | −2.43593E−02 | 0.00000E+00 | 7.18080E−04 | 1.54312E−02 |
| 6 | −2.77185E−01 | 0.00000E+00 | 1.27000E−02 | 1.84355E−02 |
| 7 | 2.82614E−02 | 0.00000E+00 | 1.29430E−02 | 2.83444E−02 |
| 8 | −2.75058E−01 | 0.00000E+00 | 5.20665E−03 | 2.87756E−02 |
| 12 | −1.74511E−01 | 0.00000E+00 | −2.22912E−02 | −2.24026E−04 |
| 13 | 1.09890E+00 | −1.00000E+00 | 5.45916E−02 | −8.55229E−02 |
| 14 | −4.33708E−01 | 0.00000E+00 | 5.56964E−02 | −4.87201E−02 |

TABLE 10-2

| Surface | A8 | A10 | A12 | A14 | A16 |
|---|---|---|---|---|---|
| 3 | −1.12779E−03 | 1.69605E−04 | −9.24708E−06 | 0.00000E+00 | 0.00000E+00 |
| 4 | 5.54759E−02 | −1.43828E−02 | −3.40212E−05 | 0.00000E+00 | 0.00000E+00 |
| 5 | 4.27755E−03 | −5.97392E−03 | 0.00000E+00 | 0.00000E+00 | 0.00000E+00 |
| 6 | 1.27283E−03 | −1.01399E−02 | 2.46941E−03 | 0.00000E+00 | 0.00000E+00 |
| 7 | −2.19533E−02 | 8.91100E−03 | 0.00000E+00 | 0.00000E+00 | 0.00000E+00 |
| 8 | −2.59952E−02 | 1.31396E−02 | 0.00000E+00 | 0.00000E+00 | 0.00000E+00 |
| 12 | −5.53989E−03 | 2.10400E−02 | −2.03506E−02 | 6.17103E−03 | 0.00000E+00 |
| 13 | 7.91865E−02 | −3.44941E−02 | 3.84031E−03 | 7.90842E−04 | 0.00000E+00 |
| 14 | 4.18221E−02 | −1.79457E−02 | 3.88481E−03 | −3.05248E−04 | 0.00000E+00 |

In Table 10-1 and Table 10-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 10-1 and Table 10-2 above show the aspheric coefficients A4, A6, A8, A10, A12, A14 and A16 of each of the aspheric surfaces, which satisfy Expression 1 above.

Here, in the wide-angle lens 1000, the object-to-image distance d is 13.398 mm, and the entrance pupil diameter HEP is 0.511 mm. Therefore, the following condition 1 is satisfied:

$$d/HEP < 29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.398 mm, and the effective focal length f of the lens system as a whole is 1.021 mm. Therefore, the following condition 2 is satisfied:

$$11.000 < d/f < 15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.021 mm, and the entrance pupil diameter HEP is 0.511 mm. Therefore, the following condition 3 is satisfied:

$$f/HEP < 2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 4.142 mm, and the combined effective focal length f567 of the fifth lens 150, the sixth lens 160, and the seventh lens 170 is 3.679 mm. Therefore, the following condition 4 is satisfied:

$$0.800 < f1234/f4567 < 8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.679 mm, and the effective focal length f of the lens system as a whole is 1.021 mm. Therefore, the following condition 5 is satisfied:

$$2.800 < f567/f < 3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 18A to FIG. 20L, it is easy to ensure the optical performance while preventing the overall length of the lens system from becoming excessively large.

Figure 21:
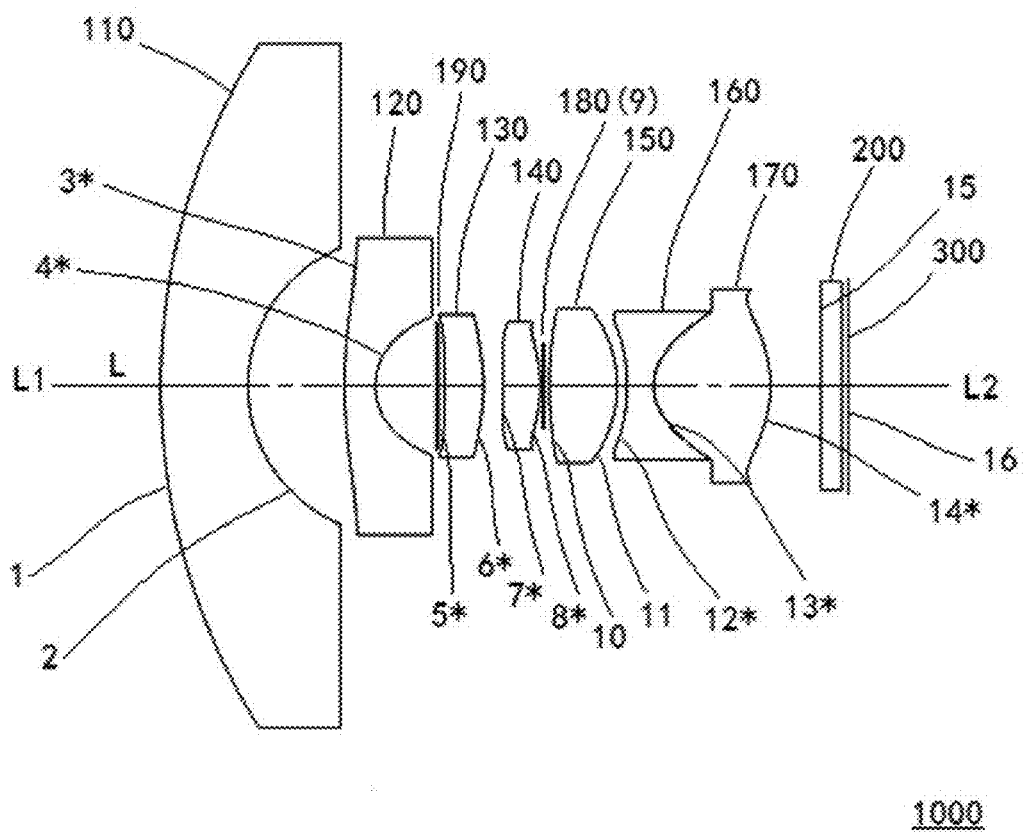
FIG. 21 illustrates a wide-angle lens according to Embodiment 6 of the disclosure.
Figure 22A:
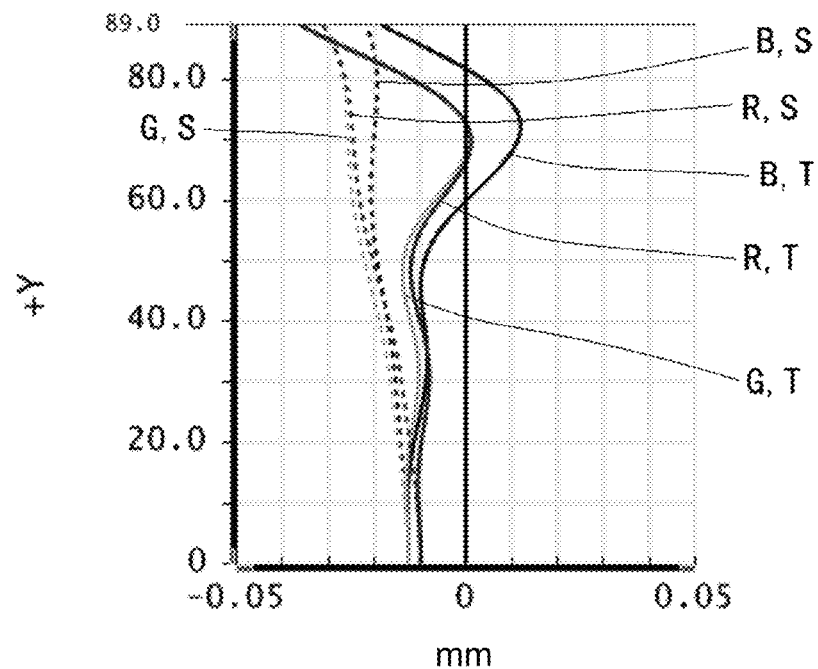
FIG. 22A illustrates curvature of field and distortion of the wide-angle lens according to Embodiment 6 of the disclosure.
Figure 22B:
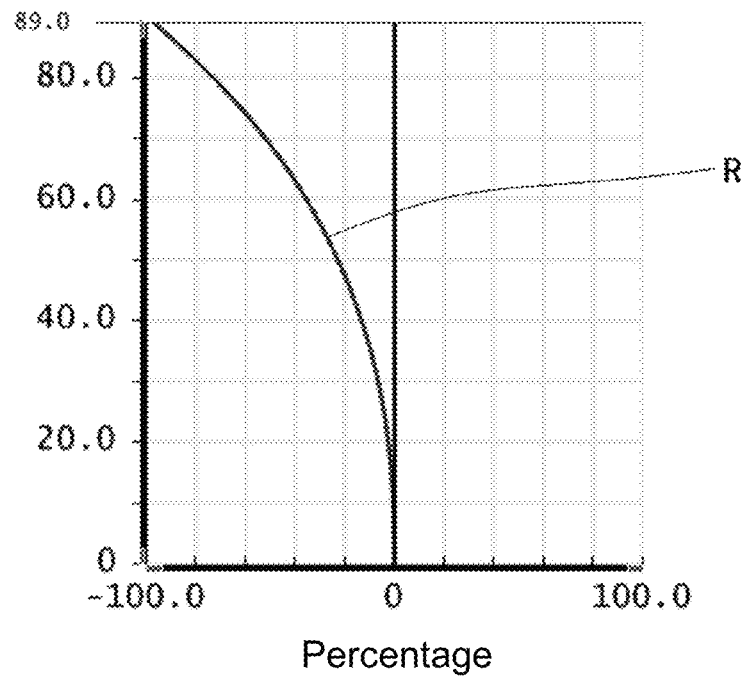
FIG. 22B illustrates curvature of field and distortion of the wide-angle lens according to Embodiment 6 of the disclosure.
Figure 23A:
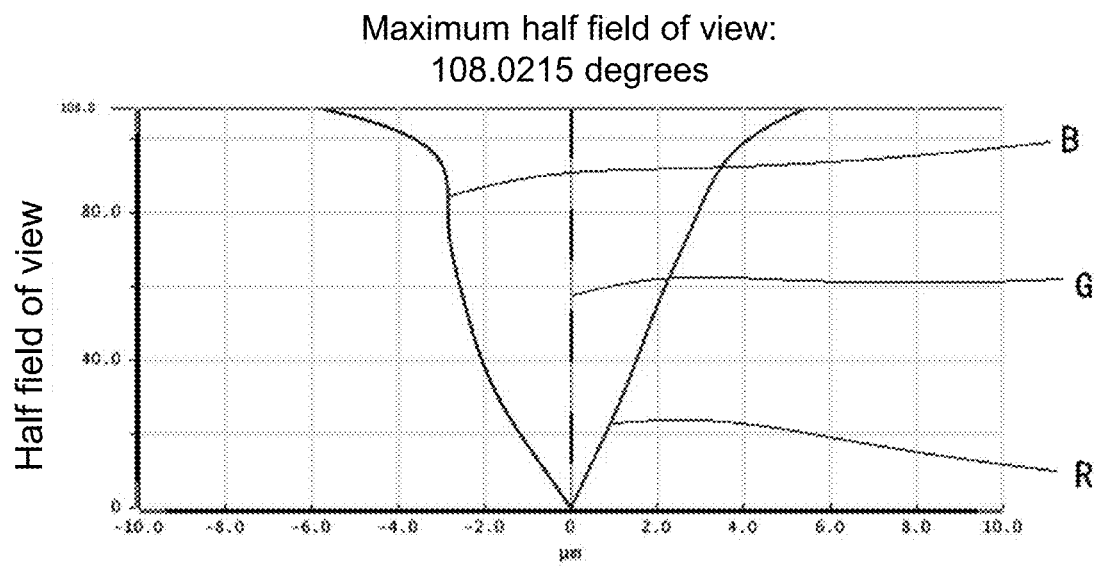
FIG. 23A illustrates lateral chromatic aberration (transverse chromatic aberration) of the wide-angle lens according to Embodiment 6 of the disclosure.
Figure 23B:
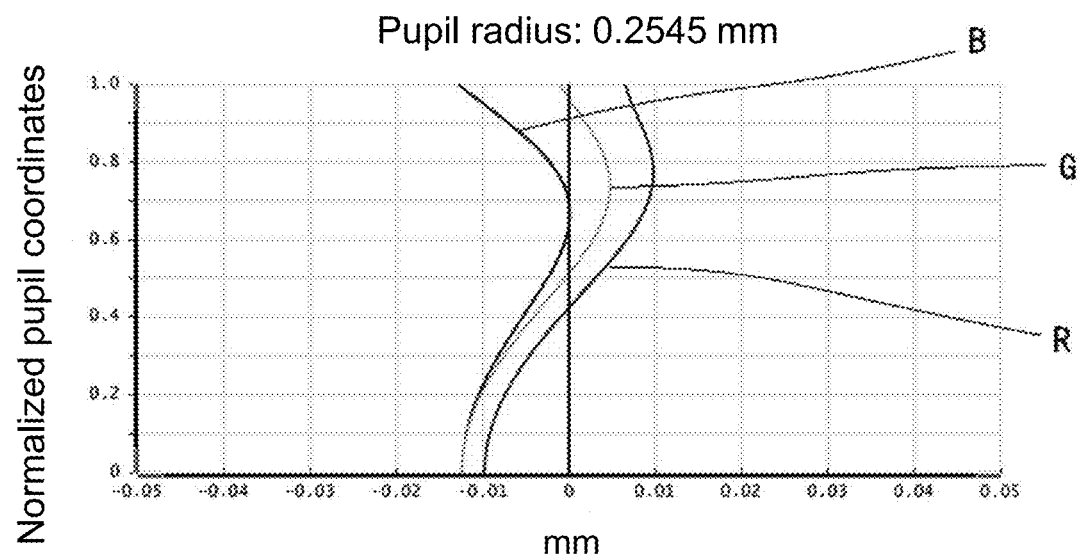
FIG. 23B illustrates spherical aberration (longitudinal aberration) of the wide-angle lens according to Embodiment 6 of the disclosure.
Figure 24A:
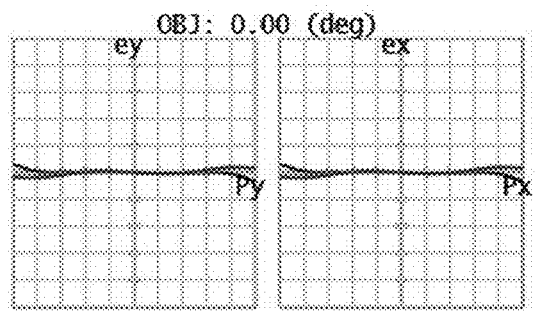
FIG. 24A to FIG. 24L illustrate transverse aberration of the wide-angle lens according to Embodiment 6 of the disclosure.
Figure 24B:
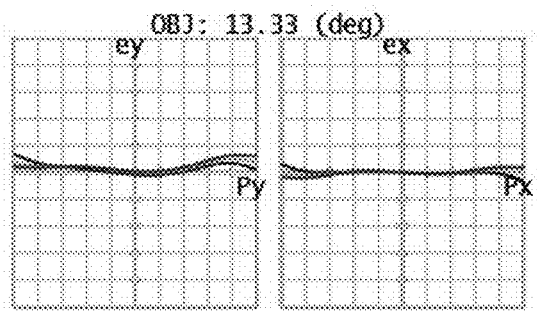
Figure 24C:
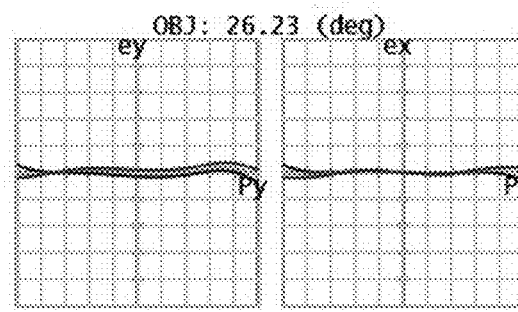
Figure 24D:
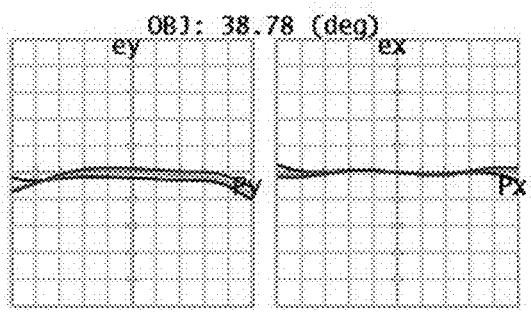
Figure 24E:
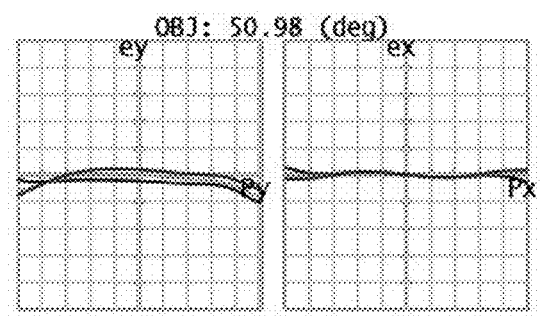
Figure 24F:
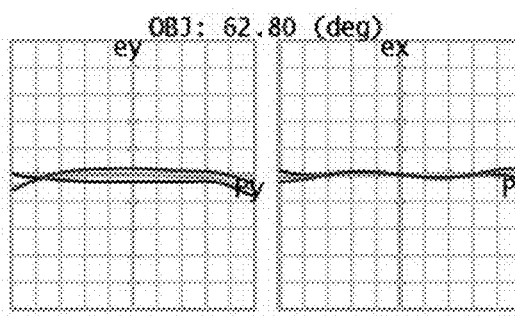
Figure 24G:
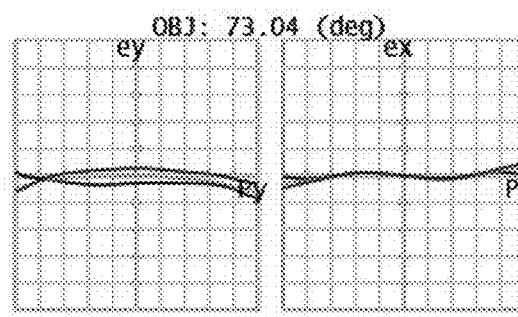
Figure 24H:
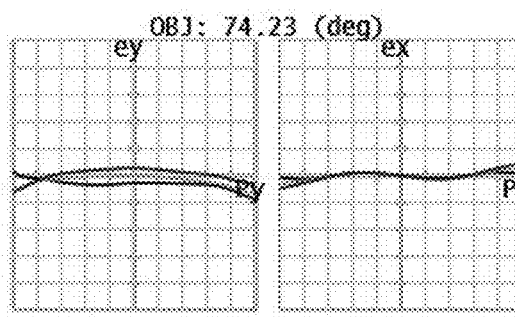
Figure 24I:
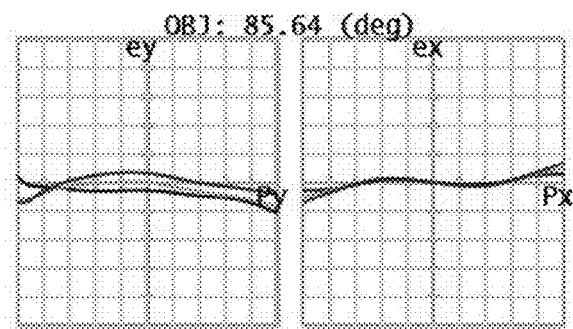
Figure 24J:
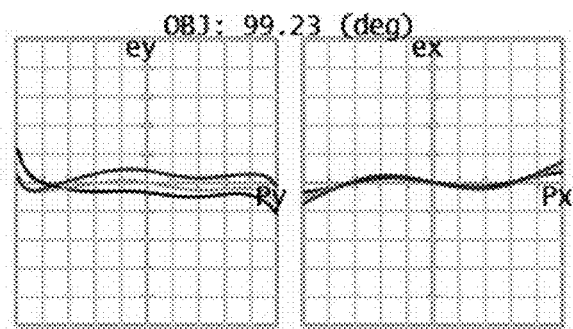
Figure 24K:
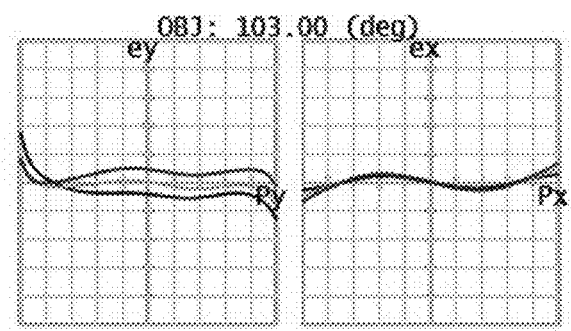
Figure 24L:
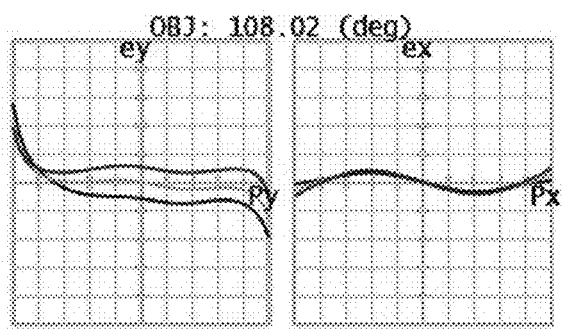

FIG. 21 illustrates a wide-angle lens according to Embodiment 6 of the disclosure. FIG. 22A illustrates curvature of field and distortion of the wide-angle lens according to Embodiment 6 of the disclosure. FIG. 22B illustrates curvature of field and distortion of the wide-angle lens according to Embodiment 6 of the disclosure. FIG. 23A illustrates lateral chromatic aberration (transverse chromatic aberration) of the wide-angle lens according to Embodiment 6 of the disclosure. FIG. 23B illustrates spherical aberration (longitudinal aberration) of the wide-angle lens according to Embodiment 6 of the disclosure. FIG. 24A to FIG. 24L illustrate transverse aberration of the wide-angle lens according to Embodiment 6 of the disclosure. Here, in FIG. 22A, FIG. 22B, FIG. 23A, FIG. 23B, and FIG. 24A to FIG. 24L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 24A to FIG. 24L, the maximum scale of the longitudinal axis is ±50.000 μm.

As shown in FIG. 21, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

In addition, as shown in FIG. 21, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.018 mm, the object-to-image distance (total track) d is 13.383 mm, the F value (image space F/#) is 2, the maximum HFOV (maximum half field angle) is 108 degrees, and the entrance pupil diameter HEP is 0.509 mm.

Table 11 shows physical properties of each surface of the wide-angle lens 1000 of this embodiment. Table 12-1 and Table 12-2 show aspheric coefficients of each surface of the wide-angle lens 1000 of this embodiment.

TABLE 11

| Surface | Radius of curvature | Thickness | $N_d$ | $v_d$ | Effective focal length | Effective focal length | Effective focal length |
|---|---|---|---|---|---|---|---|
| 1 | 12.500 | 1.700 | 1.871 | 40.73 | −4.748 | −1.310 | 4.528 |
| 2 | 2.910 | 1.880 | 1.000 | | | | |
| 3* | 9.149 | 0.600 | 1.544 | 56.4 | −2.585 | | |
| 4* | 1.191 | 1.354 | 1.000 | | | | |
| 5* | −14.140 | 0.750 | 1.544 | 56.4 | 9.374 | 3.338 | |
| 6* | −3.818 | 0.381 | 1.000 | | | | |
| 7* | −22.250 | 0.722 | 1.635 | 23.9 | 4.796 | | |
| 8* | −2.713 | 0.050 | 1.000 | | | | |
| 9 (diaphragm) | Infinite | 0.130 | 1.000 | | | | |
| 10 | 7.740 | 1.320 | 1.697 | 55.46 | 2.821 | | 3.546 |
| 11 | −2.450 | 0.199 | 1.000 | | | | |
| 12* | −3.600 | 0.510 | 1.635 | 23.9 | −1.147 | 10.463 | |
| 13* | 0.963 | 2.282 | 1.544 | 56.4 | 1.648 | | |
| 14* | −2.141 | 0.980 | 1.000 | | | | |
| 15 | Infinite | 0.400 | | | | | |
| 16 | Infinite | 0.125 | | | | | |

In Table 11 above, the radius of curvature, thickness, and effective focal length are in units of mm. $N_d$ represents a refractive index for a ray of 587.56 nm. $v_d$ represents the Abbe number. * represents an aspheric surface.

TABLE 12-1

| Surface | c (1/radius of curvature) | K | A4 | A6 |
|---|---|---|---|---|
| 3 | 1.09306E−01 | 0.00000E+00 | −4.51092E−03 | 2.92728E−03 |
| 4 | 8.39842E−01 | −3.71100E+00 | 2.15910E−01 | −7.58275E−02 |
| 5 | −7.07214E−02 | 0.00000E+00 | −5.47555E−03 | 1.09203E−02 |
| 6 | −2.61938E−01 | 0.00000E+00 | 1.43606E−02 | 2.26240E−02 |
| 7 | −4.49438E−02 | 0.00000E+00 | 1.40010E−02 | 4.01310E−02 |
| 8 | −3.68664E−01 | 0.00000E+00 | 1.66786E−02 | 2.21644E−02 |
| 12 | −2.77778E−01 | 0.00000E+00 | −2.23667E−02 | 7.48072E−03 |
| 13 | 1.03842E+00 | −1.00000E+00 | 4.72309E−02 | −6.05266E−02 |
| 14 | −4.67071E−01 | 0.00000E+00 | 5.78738E−02 | −4.73130E−02 |

TABLE 12-2

| Surface | A8 | A10 | A12 | A14 | A16 |
|---|---|---|---|---|---|
| 3 | −1.14938E−03 | 1.63223E−04 | −7.82147E−06 | 0.00000E+00 | 0.00000E+00 |
| 4 | 5.61909E−02 | −1.28652E−02 | −3.10366E−04 | 0.00000E+00 | 0.00000E+00 |
| 5 | 2.71037E−03 | −6.63668E−03 | 0.00000E+00 | 0.00000E+00 | 0.00000E+00 |
| 6 | −3.16016E−03 | −9.85165E−03 | 2.97746E−03 | 0.00000E+00 | 0.00000E+00 |
| 7 | −1.96461E−02 | 8.38631E−03 | 0.00000E+00 | 0.00000E+00 | 0.00000E+00 |
| 8 | −1.03312E−02 | 1.03923E−02 | 0.00000E+00 | 0.00000E+00 | 0.00000E+00 |
| 12 | −8.59213E−03 | 1.81642E−02 | −1.67818E−02 | 5.17215E−03 | 0.00000E+00 |
| 13 | 5.15225E−02 | −2.02257E−02 | 1.88707E−03 | 3.30690E−04 | 0.00000E+00 |
| 14 | 4.12895E−02 | −1.76625E−02 | 3.69776E−03 | −2.59955E−04 | 0.00000E+00 |

In Table 12-1 and Table 12-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 12-1 and Table 12-2 above show the aspheric coefficients A4, A6, A8, A10, A12, A14 and A16 of each of the aspheric surfaces, which satisfy Expression 1 above.

Here, in the wide-angle lens 1000, the object-to-image distance d is 13.383 mm, and the entrance pupil diameter HEP is 0.509 mm. Therefore, the following condition 1 is satisfied:

$$d/HEP < 29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.383 mm, and the effective focal length f of the lens system as a whole is 1.018 mm. Therefore, the following condition 2 is satisfied:

$$11.000 < d/f < 15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.018 mm, and the entrance pupil diameter HEP is 0.509 mm. Therefore, the following condition 3 is satisfied:

$$f/HEP < 2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 4.528 mm, and the combined effective focal length f567 of the fifth lens 150, the sixth lens 160, and the seventh lens 170 is 3.546 mm. Therefore, the following condition 4 is satisfied:

$$0.800 < f1234/f4567 < 8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.546 mm, and the effective focal length f of the lens system as a whole is 1.018 mm. Therefore, the following condition 5 is satisfied:

$$2.800 < f567/f < 3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 22A to FIG. 24L, it is easy to ensure the optical performance while preventing the overall length of the lens system from becoming excessively large.

Figure 25:
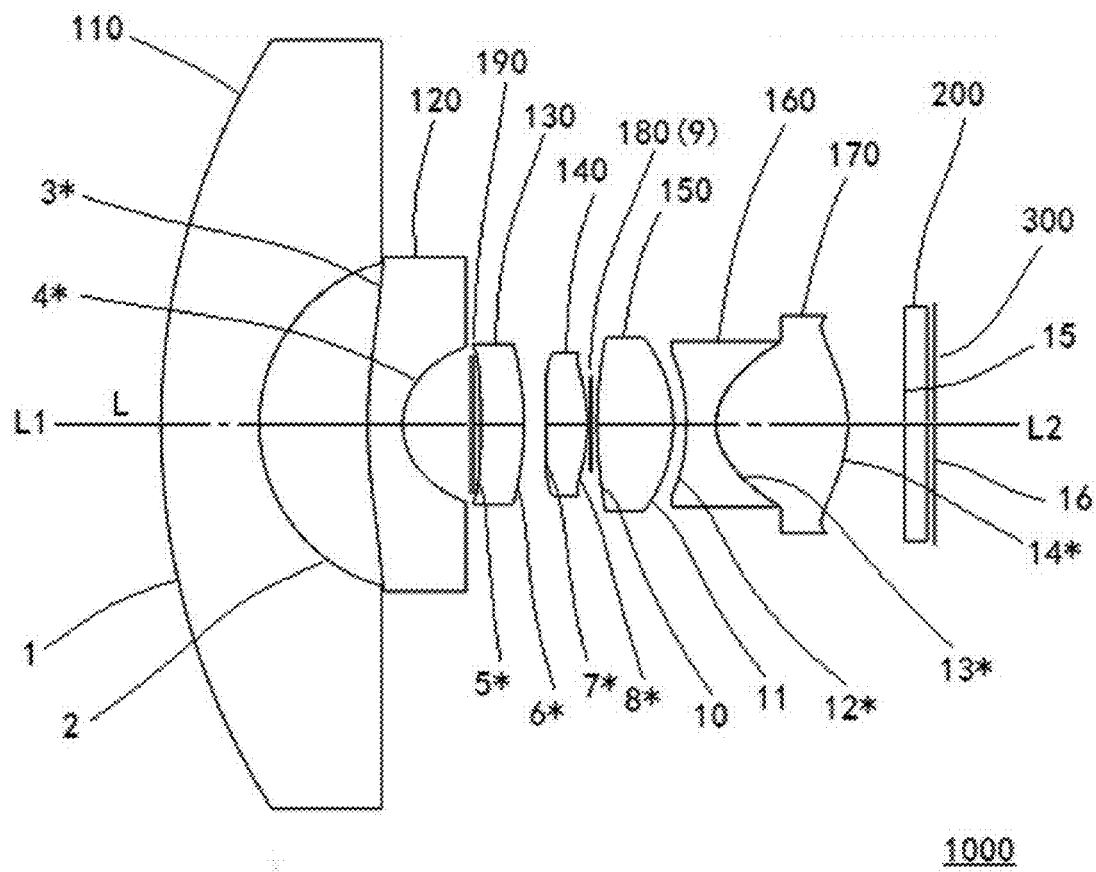
FIG. 25 illustrates a wide-angle lens according to Embodiment 7 of the disclosure.
Figure 26A:
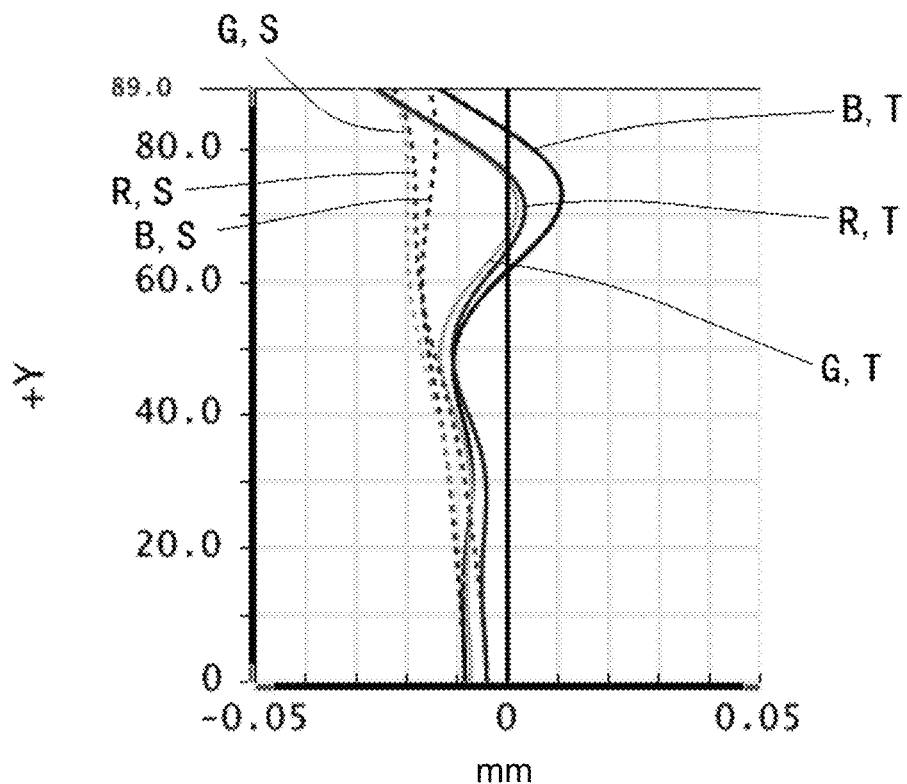
FIG. 26A illustrates curvature of field and distortion of the wide-angle lens according to Embodiment 7 of the disclosure.
Figure 26B:
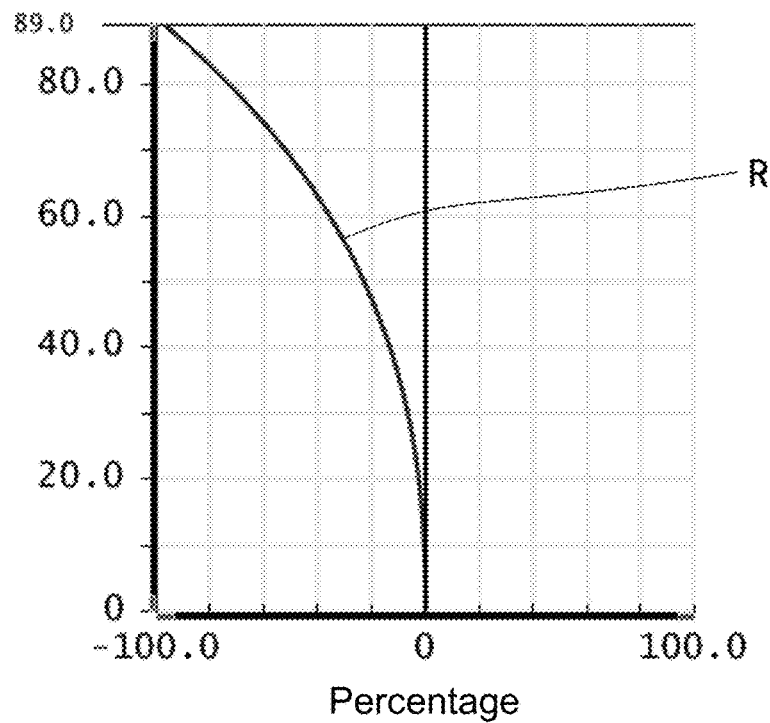
FIG. 26B illustrates curvature of field and distortion of the wide-angle lens according to Embodiment 7 of the disclosure.
Figure 27A:
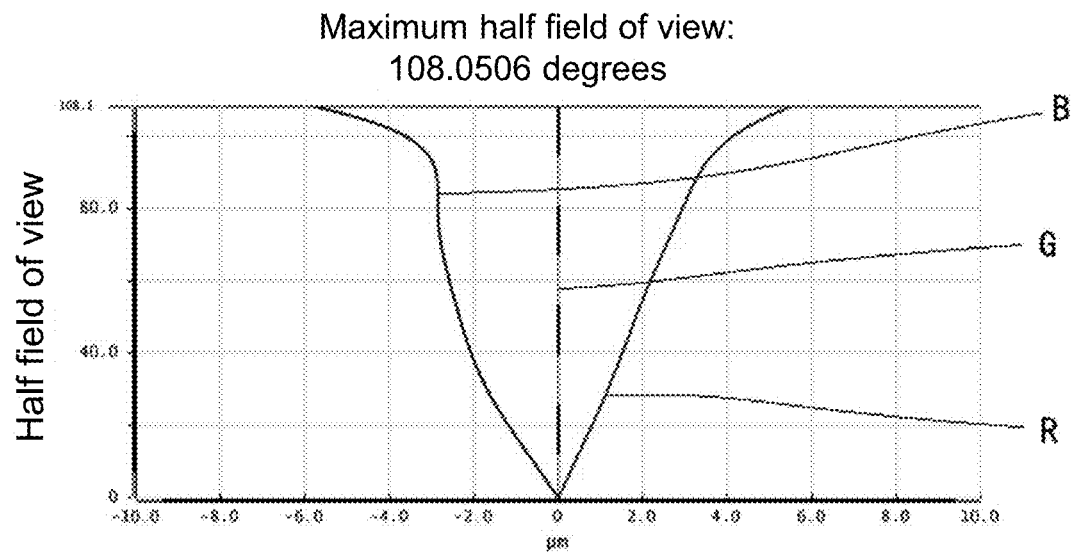
FIG. 27A illustrates lateral chromatic aberration (transverse chromatic aberration) of the wide-angle lens according to Embodiment 7 of the disclosure.
Figure 27B:
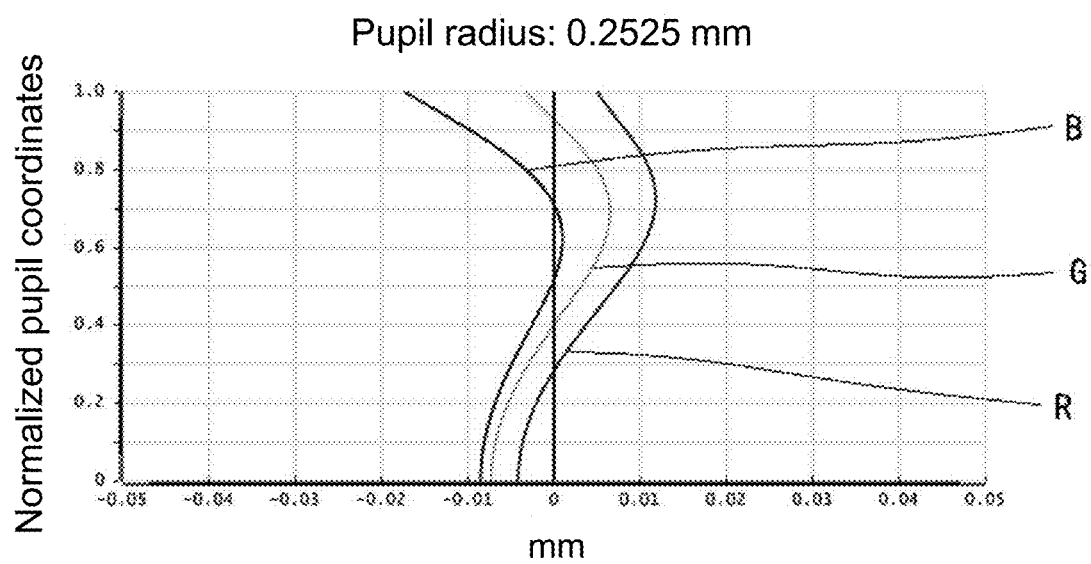
FIG. 27B illustrates spherical aberration (longitudinal aberration) of the wide-angle lens according to Embodiment 7 of the disclosure.
Figure 28A:
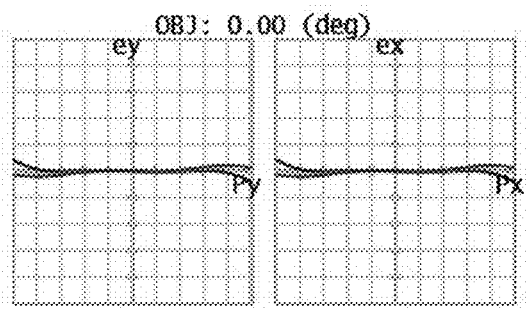
FIG. 28A to FIG. 28L illustrate transverse aberration of the wide-angle lens according to Embodiment 7 of the disclosure.
Figure 28B:
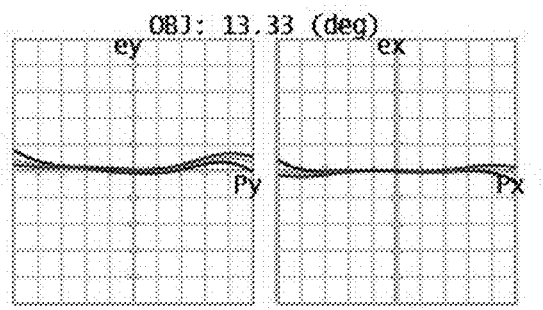
Figure 28C:
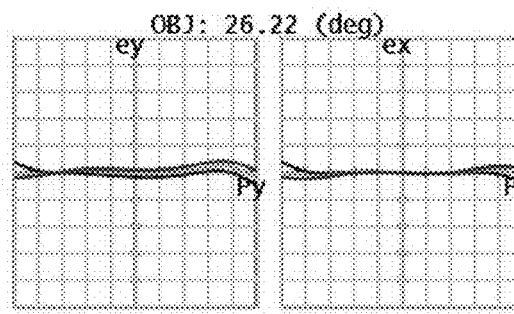
Figure 28D:
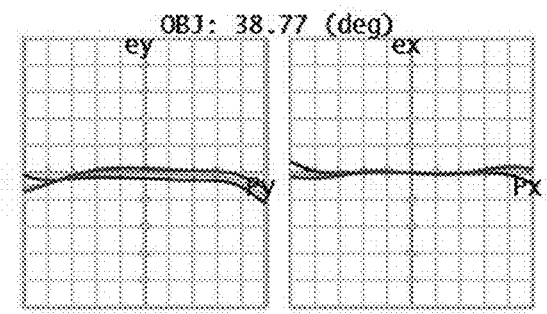
Figure 28E:
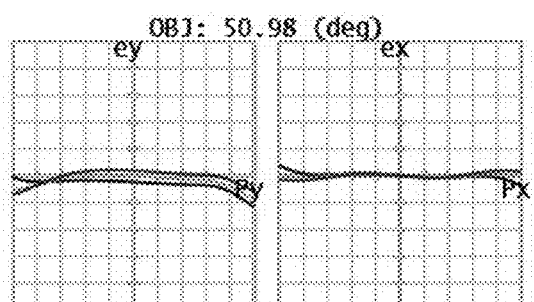
Figure 28F:
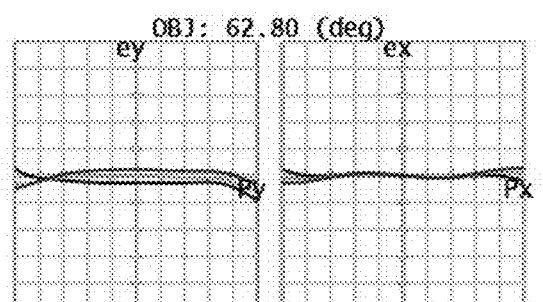
Figure 28G:
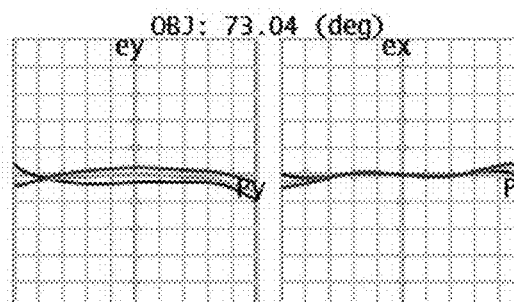
Figure 28H:
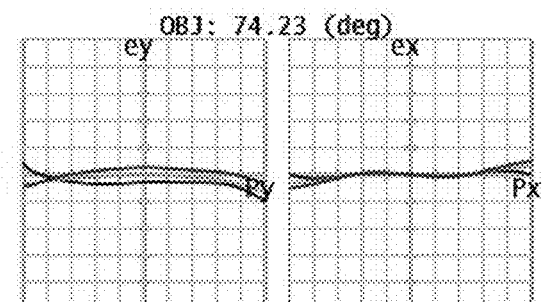
Figure 28I:
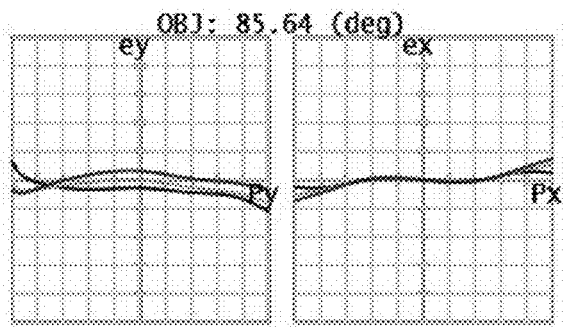
Figure 28J:
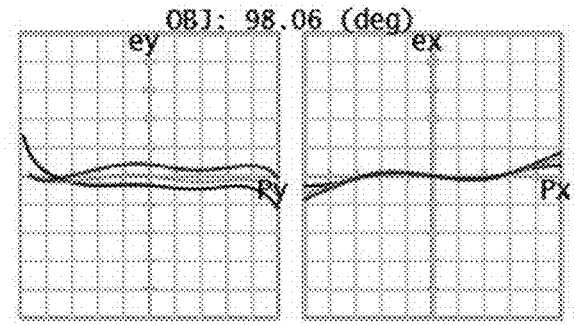
Figure 28K:
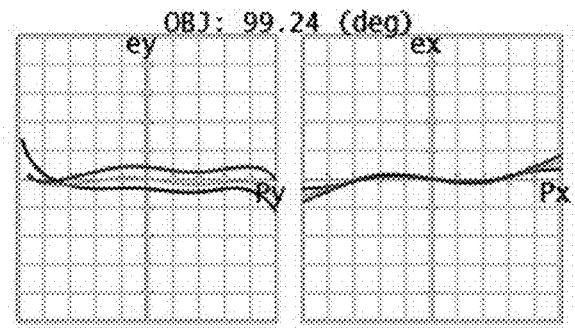
Figure 28L:
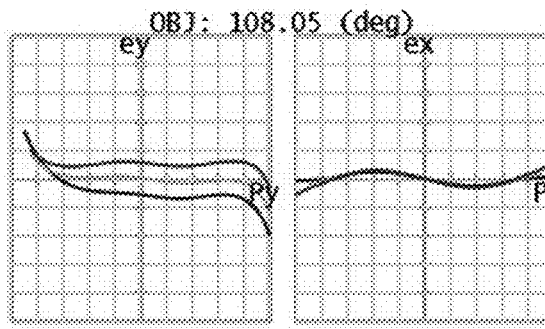

FIG. 25 illustrates a wide-angle lens according to Embodiment 7 of the disclosure. FIG. 26A illustrates curvature of field and distortion of the wide-angle lens according to Embodiment 7 of the disclosure. FIG. 26B illustrates curvature of field and distortion of the wide-angle lens according to Embodiment 7 of the disclosure. FIG. 27A illustrates lateral chromatic aberration (transverse chromatic aberration) of the wide-angle lens according to Embodiment 7 of the disclosure. FIG. 27B illustrates spherical aberration (longitudinal aberration) of the wide-angle lens according to Embodiment 7 of the disclosure. FIG. 28A to FIG. 28L illustrate transverse aberration of the wide-angle lens according to Embodiment 7 of the disclosure. Here, in FIG. 26A, FIG. 26B, FIG. 27A, FIG. 27B, and FIG. 28A to FIG. 28L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 28A to FIG. 28L, a maximum scale of the longitudinal axis is ±50.000 μm.

As shown in FIG. 25, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110 (located closest to the object side), the second lens 120 (located on the image side of and adjacent to the first lens 110), the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

In addition, as shown in FIG. 25, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.019 mm, the object-to-image distance (total track) d is 13.381 mm, the F value (image space F/#) is 2.0163, the maximum HFOV (maximum half field angle) is 108 degrees, and the entrance pupil diameter HEP is 0.505 mm.

Table 13 shows physical properties of each surface of the wide-angle lens 1000 of this embodiment. Table 14-1 and Table 14-2 show aspheric coefficients of each surface of the wide-angle lens 1000 of this embodiment.

TABLE 13

| Surface | Radius of curvature | Thickness | $N_d$ | $v_d$ | Effective focal length | Effective focal length | Effective focal length |
|---|---|---|---|---|---|---|---|
| 1 | 12.500 | 1.700 | 1.871 | 40.73 | −4.748 | −1.310 | 4.815 |
| 2 | 2.910 | 1.880 | | | | | |
| 3* | 9.138 | 0.600 | 1.544 | 56.4 | −2.586 | | |
| 4* | 1.191 | 1.354 | | | | | |
| 5* | −11.789 | 0.750 | 1.544 | 56.4 | 10.047 | 3.394 | |
| 6* | −3.818 | 0.381 | | | | | |
| 7* | −22.250 | 0.710 | 1.635 | 23.9 | 4.797 | | |
| 8* | −2.713 | 0.050 | | | | | |
| 9 (diaphragm) | Infinite | 0.116 | | | | | |
| 10 | 7.740 | 1.320 | 1.697 | 55.46 | 2.821 | | 3.557 |
| 11 | −2.450 | 0.225 | | | | | |
| 12* | −3.600 | 0.510 | 1.635 | 23.9 | −1.147 | 10.463 | |
| 13* | 0.963 | 2.282 | 1.544 | 56.4 | 1.648 | | |
| 14* | −2.141 | 0.978 | | | | | |
| 15 | Infinite | 0.400 | | | | | |
| 16 | Infinite | 0.125 | | | | | |

In Table 11 above, the radius of curvature, thickness, and effective focal length are in units of mm. $N_d$ represents a refractive index for a ray of 587.56 nm. $v_d$ represents the Abbe number. * represents an aspheric surface.

TABLE 14-1

| Surface | c (1/radius of curvature) | K | A4 | A6 |
|---|---|---|---|---|
| 3 | 1.09439E−01 | 0.00000E+00 | −4.39546E−03 | 2.94241E−03 |
| 4 | 8.39842E−01 | −3.71100E+00 | 2.15910E−01 | −7.58275E−02 |
| 5 | −8.48248E−02 | 0.00000E+00 | −5.99821E−03 | 9.40179E−03 |
| 6 | −2.61938E−01 | 0.00000E+00 | 1.43606E−02 | 2.26240E−02 |
| 7 | −4.49438E−02 | 0.00000E+00 | 1.40010E−02 | 4.01310E−02 |
| 8 | −3.68664E−01 | 0.00000E+00 | 1.66786E−02 | 2.21644E−02 |
| 12 | −2.77778E−01 | 0.00000E+00 | −2.23667E−02 | 7.48072E−03 |
| 13 | 1.03842E+00 | −1.00000E+00 | 4.72309E−02 | −6.05266E−02 |
| 14 | −4.67071E−01 | 0.00000E+00 | 5.76337E−02 | −4.72421E−02 |

TABLE 14-2

| Surface | A8 | A10 | A12 | A14 | A16 |
|---|---|---|---|---|---|
| 3 | −1.15296E−03 | 1.63212E−04 | −7.75247E−06 | 0.00000E+00 | 0.00000E+00 |
| 4 | 5.61909E−02 | −1.28652E−02 | −3.10366E−04 | 0.00000E+00 | 0.00000E+00 |
| 5 | 3.12004E−03 | −6.74245E−03 | 0.00000E+00 | 0.00000E+00 | 0.00000E+00 |
| 6 | −3.16016E−03 | −9.85165E−03 | 2.97746E−03 | 0.00000E+00 | 0.00000E+00 |
| 7 | −1.96461E−02 | 8.38631E−03 | 0.00000E+00 | 0.00000E+00 | 0.00000E+00 |
| 8 | −1.03312E−02 | 1.03923E−02 | 0.00000E+00 | 0.00000E+00 | 0.00000E+00 |
| 12 | −8.59213E−03 | 1.81642E−02 | −1.67818E−02 | 5.17215E−03 | 0.00000E+00 |
| 13 | 5.15225E−02 | −2.02257E−02 | 1.88707E−03 | 3.30690E−04 | 0.00000E+00 |
| 14 | 4.13120E−02 | −1.76585E−02 | 3.69817E−03 | −2.61279E−04 | 0.00000E+00 |

In Table 14-1 and Table 14-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 14-1 and Table 14-2 above show the aspheric coefficients A4, A6, A8, A10, A12, A14 and A16 of each of the aspheric surfaces, which satisfy Expression 1 above.

Here, in the wide-angle lens 1000, the object-to-image distance d is 13.381 mm, and the entrance pupil diameter HEP is 0.505 mm. Therefore, the following condition 1 is satisfied:

$$d/HEP < 29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.381 mm, and the effective focal length f of the lens system as a whole is 1.019 mm. Therefore, the following condition 2 is satisfied:

$$11.000 < d/f < 15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.019 mm, and the entrance pupil diameter HEP is 0.505 mm. Therefore, the following condition 3 is satisfied:

$$f/HEP < 2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 4.815 mm, and the combined effective focal length f567 of the fifth lens 150, the sixth lens 160, and the seventh lens 170 is 3.557 mm. Therefore, the following condition 4 is satisfied:

$$0.800 < f1234/f4567 < 8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.557 mm, and the effective focal length f of the lens system as a whole is 1.019 mm. Therefore, the following condition 5 is satisfied:

$$2.800 < f567/f < 3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 26A to FIG. 28L, it is easy to ensure the optical performance while preventing the overall length of the lens system from becoming excessively large.

Figure 29:
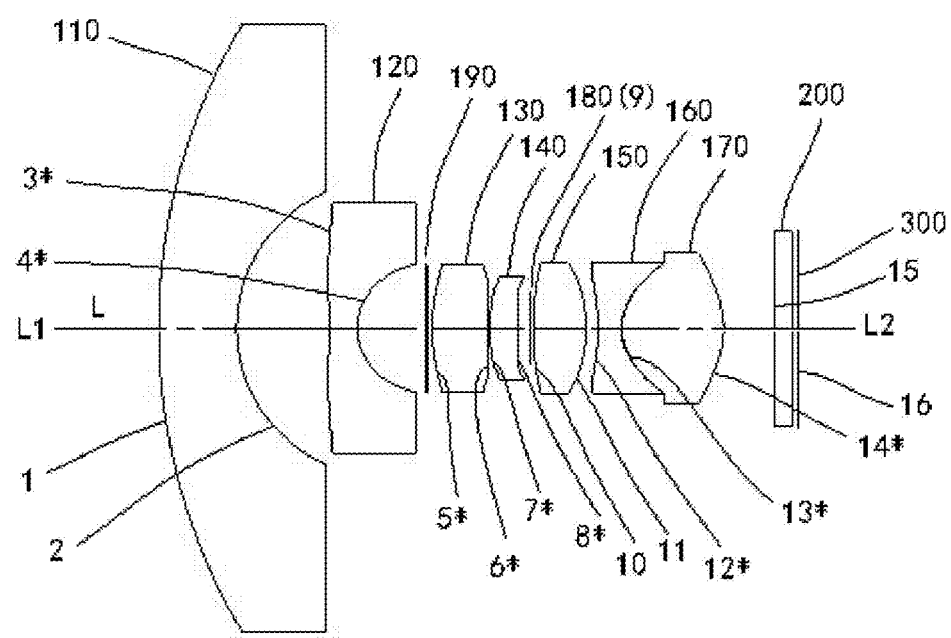
FIG. 29 illustrates a wide-angle lens according to Embodiment 8 of the disclosure.
Figure 30A:
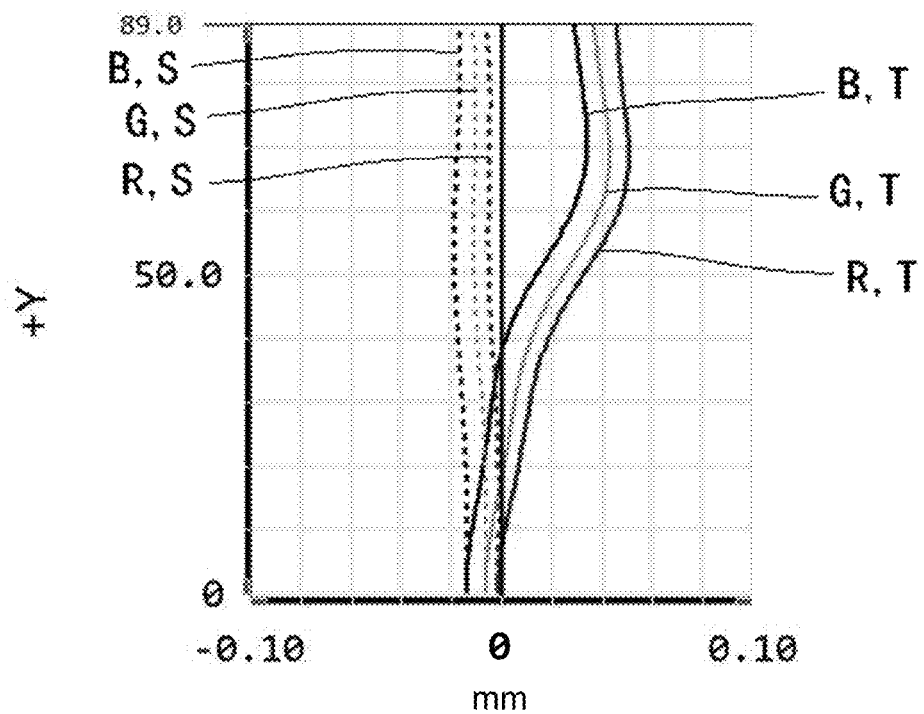
FIG. 30A illustrates curvature of field and distortion of the wide-angle lens according to Embodiment 8 of the disclosure.
Figure 30B:
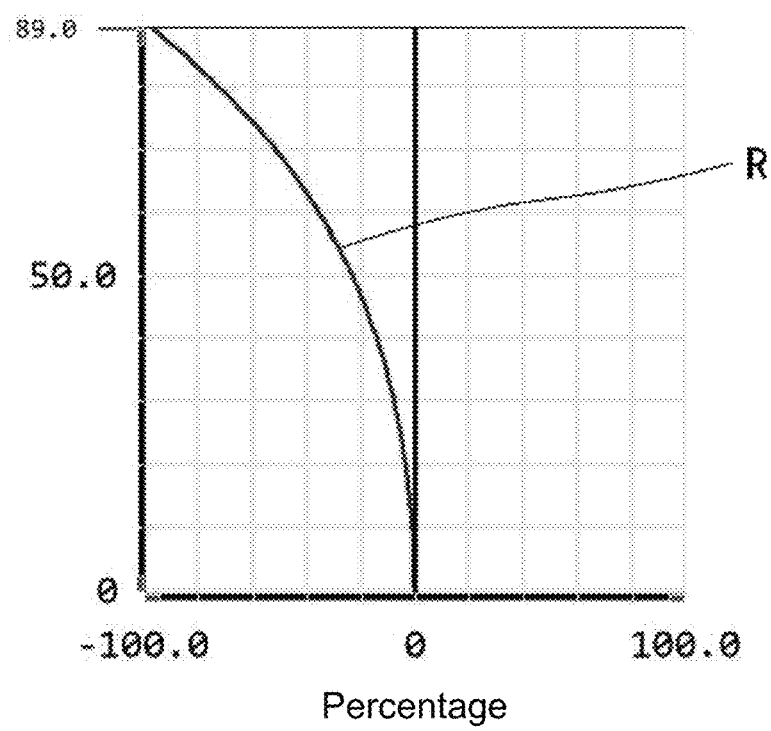
FIG. 30B illustrates curvature of field and distortion of the wide-angle lens according to Embodiment 8 of the disclosure.
Figure 31A:
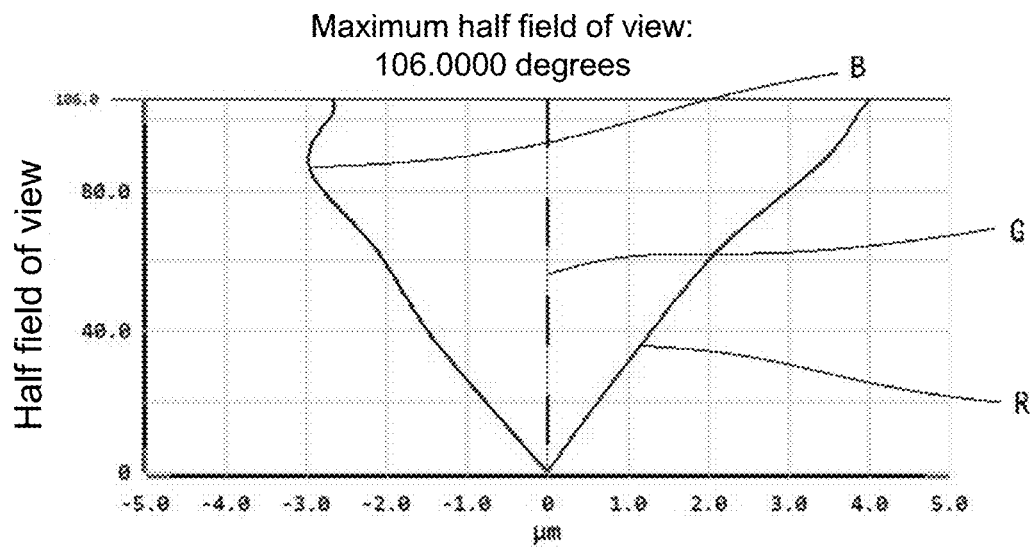
FIG. 31A illustrates lateral chromatic aberration (transverse chromatic aberration) of the wide-angle lens according to Embodiment 8 of the disclosure.
Figure 31B:
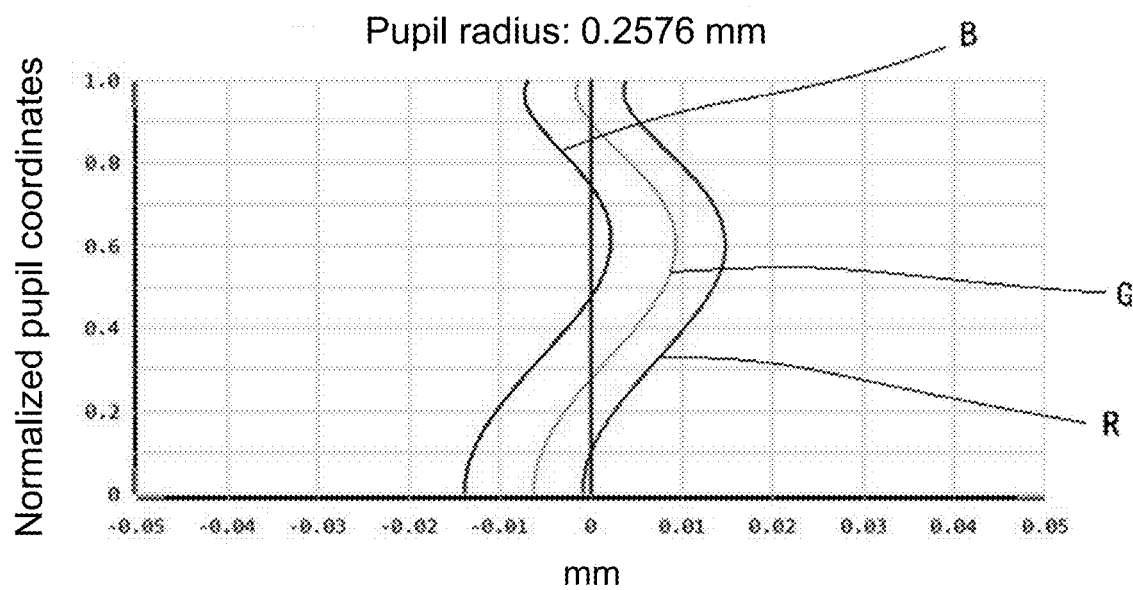
FIG. 31B illustrates spherical aberration (longitudinal aberration) of the wide-angle lens according to Embodiment 8 of the disclosure.
Figure 32A:
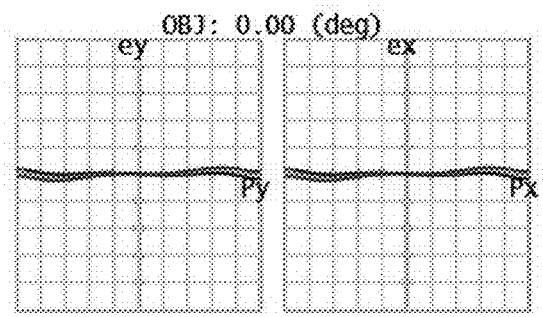
FIG. 32A to FIG. 32L illustrate transverse aberration of the wide-angle lens according to Embodiment 8 of the disclosure.
Figure 32B:
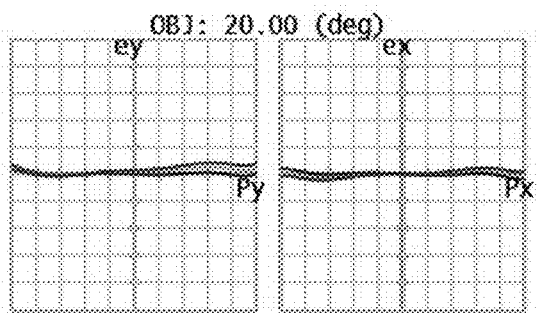
Figure 32C:
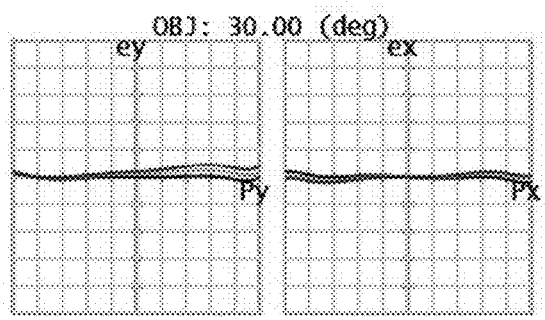
Figure 32D:
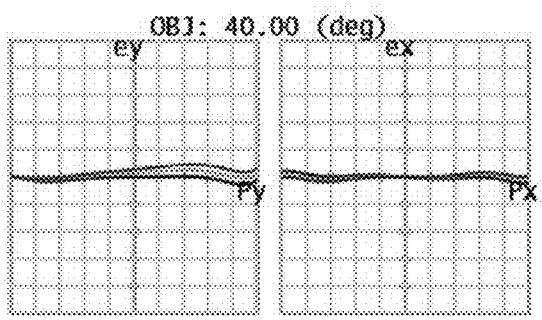
Figure 32E:
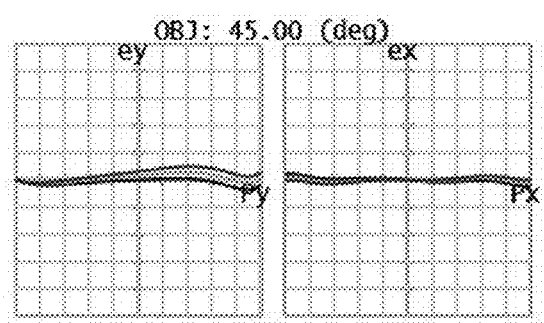
Figure 32F:
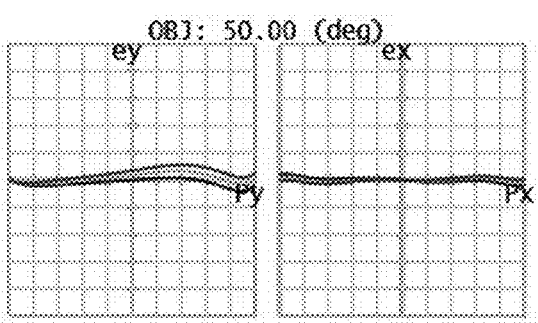
Figure 32G:
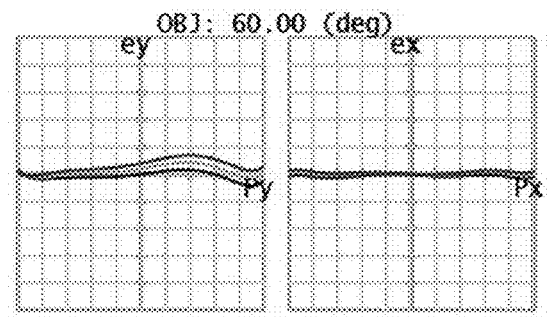
Figure 32H:
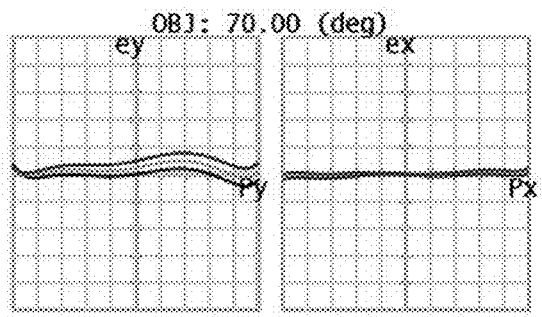
Figure 32I:
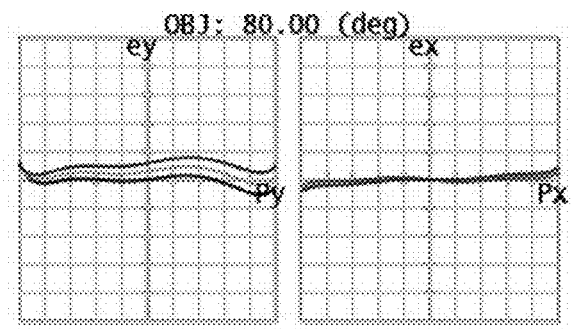
Figure 32J:
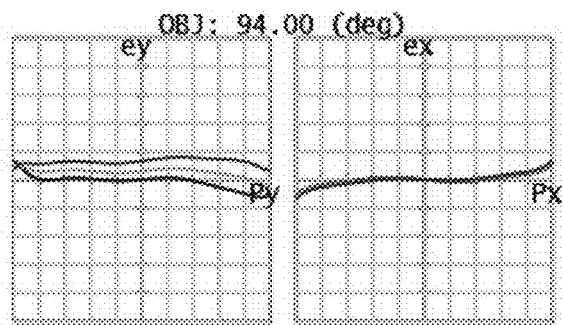
Figure 32K:
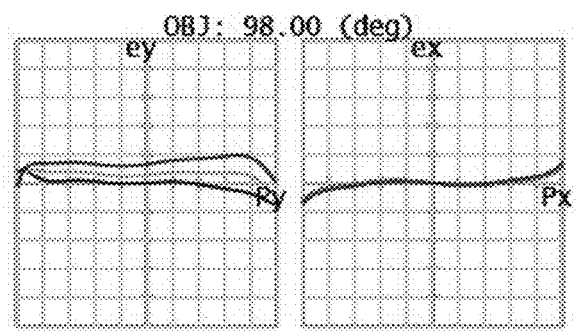
Figure 32L:
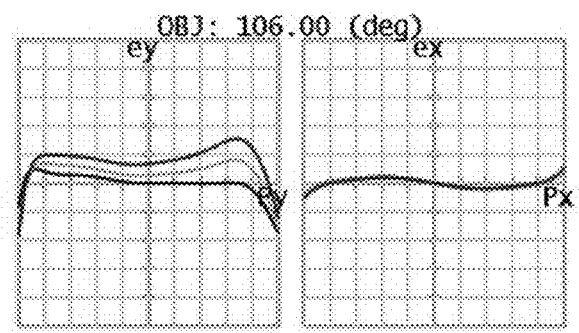

FIG. 29 illustrates a wide-angle lens according to Embodiment 8 of the disclosure. FIG. 30A illustrates curvature of field and distortion of the wide-angle lens according to Embodiment 8 of the disclosure. FIG. 30B illustrates curvature of field and distortion of the wide-angle lens according to Embodiment 8 of the disclosure. FIG. 31A illustrates lateral chromatic aberration (transverse chromatic aberration) of the wide-angle lens according to Embodiment 8 of the disclosure. FIG. 31B illustrates spherical aberration (longitudinal aberration) of the wide-angle lens according to Embodiment 8 of the disclosure. FIG. 32A to FIG. 32L illustrate transverse aberration of the wide-angle lens according to Embodiment 8 of the disclosure. Here, in FIG. 30A, FIG. 30B, FIG. 31A, FIG. 31B, and FIG. 32A to FIG. 32L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 32A to FIG. 32L, the maximum scale of the longitudinal axis is ±50.000 μm.

As shown in FIG. 29, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

In addition, as shown in FIG. 29, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.030 mm, the object-to-image distance (total track) d is 13.609 mm, the F value (image space F/#) is 2, the maximum HFOV (maximum half field angle) is 106 degrees, and the entrance pupil diameter HEP is 0.515 mm.

Table 15 shows physical properties of each surface of the wide-angle lens 1000 of this embodiment. Table 16-1 and Table 16-2 show aspheric coefficients of each surface of the wide-angle lens 1000 of this embodiment.

TABLE 15

| Surface | Radius of curvature | Thickness | $N_d$ | $v_d$ | Effective focal length | Effective focal length | Effective focal length |
|---|---|---|---|---|---|---|---|
| 1 | 12.641 | 1.659 | 1.804 | 46.5 | −5.702 | −1.262 | 21.864 |
| 2 | 3.168 | 1.968 | | | | | |
| 3* | −22.811 | 0.600 | 1.544 | 56.4 | −2.189 | | |
| 4* | 1.268 | 1.587 | | | | | |
| 5* | 3.542 | 1.200 | 1.544 | 56.4 | 10.255 | 3.623 | |
| 6* | 8.543 | 0.036 | | | | | |
| 7* | 4.456 | 0.592 | 1.639 | 23.5 | 4.851 | | |
| 8* | −9.668 | 0.248 | | | | | |
| 9 (diaphragm) | Infinite | 0.078 | | | | | |
| 10 | 6.001 | 1.129 | 1.697 | 55.46 | 2.908 | | 3.125 |
| 11 | −2.824 | 0.247 | | | | | |
| 12* | −5.445 | 0.500 | 1.639 | 23.5 | −1.380 | 6.310 | |
| 13* | 1.090 | 2.170 | 1.544 | 56.4 | 1.720 | | |
| 14* | −1.971 | 1.070 | | | | | |
| 15 | Infinite | 0.400 | | | | | |
| 16 | Infinite | 0.125 | | | | | |

In Table 15 above, the radius of curvature, thickness, and effective focal length are in units of mm. $N_d$ represents a refractive index for a ray of 587.56 nm. $v_d$ represents the Abbe number. * represents an aspheric surface.

TABLE 16-1

| Surface | c (1/radius of curvature) | K | A4 | A6 |
|---|---|---|---|---|
| 3 | −4.38390E−02 | 0.00000E+00 | 1.02948E−02 | −1.01140E−03 |
| 4 | 7.88668E−01 | −1.13571E+00 | 5.66499E−02 | 1.84231E−03 |
| 5 | 2.82343E−01 | 0.00000E+00 | −2.18543E−02 | 5.16357E−03 |
| 6 | 1.17050E−01 | 0.00000E+00 | −6.48711E−02 | −8.41810E−03 |
| 7 | 2.24418E−01 | 0.00000E+00 | 3.04785E−02 | 1.99197E−02 |
| 8 | −1.03429E−01 | 0.00000E+00 | 9.05286E−02 | 3.48783E−02 |
| 12 | −1.83670E−01 | 0.00000E+00 | −3.32106E−02 | 4.95833E−02 |
| 13 | 9.17180E−01 | −3.67711E+00 | 1.58393E−01 | −3.03404E−02 |
| 14 | −5.07238E−01 | −6.42125E−01 | 3.25791E−02 | −8.99922E−03 |

TABLE 16-2

| Surface | A8 | A10 | A12 | A14 | A16 |
|---|---|---|---|---|---|
| 3 | 2.82136E−05 | 8.57444E−16 | 0.00000E+00 | 0.00000E+00 | 0.00000E+00 |
| 4 | 3.99185E−02 | −2.56858E−02 | 9.68214E−03 | 0.00000E+00 | 0.00000E+00 |
| 5 | −3.88312E−04 | 0.00000E+00 | 0.00000E+00 | 0.00000E+00 | 0.00000E+00 |
| 6 | 3.26148E−03 | 0.00000E+00 | 0.00000E+00 | 0.00000E+00 | 0.00000E+00 |
| 7 | −6.50576E−03 | 0.00000E+00 | 0.00000E+00 | 0.00000E+00 | 0.00000E+00 |
| 8 | 4.33217E−03 | 0.00000E+00 | 0.00000E+00 | 0.00000E+00 | 0.00000E+00 |
| 12 | −4.63097E−02 | 2.53604E−02 | −5.68334E−03 | 0.00000E+00 | 0.00000E+00 |
| 13 | −2.77646E−02 | 2.45247E−02 | −5.43979E−03 | 0.00000E+00 | 0.00000E+00 |
| 14 | 4.06471E−03 | −7.04269E−04 | 4.21913E−05 | 0.00000E+00 | 0.00000E+00 |

In Table 16-1 and Table 16-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 16-1 and Table 16-2 above show the aspheric coefficients A4, A6, A8, A10, A12, A14 and A16 of each of the aspheric surfaces, which satisfy Expression 1 above.

Here, in the wide-angle lens 1000, the object-to-image distance d is 13.609 mm, and the entrance pupil diameter HEP is 0.515 mm. Therefore, the following condition 1 is satisfied:

$$d/HEP < 29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.609 mm, and the effective focal length f of the lens system as a whole is 1.030 mm. Therefore, the following condition 2 is satisfied:

$$11.000 < d/f < 15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.030 mm, and the entrance pupil diameter HEP is 0.515 mm. Therefore, the following condition 3 is satisfied:

$$f/HEP < 2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 21.864 mm, and the combined effective focal length f567 of the fifth lens 150, the sixth lens 160, and the seventh lens 170 is 3.125 mm. Therefore, the following condition 4 is satisfied:

$$0.800 < f1234/f4567 < 8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.125 mm, and the effective focal length f of the lens system as a whole is 1.030 mm. Therefore, the following condition 5 is satisfied:

$$2.800 < f567/f < 3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 30A to FIG. 32L, it is easy to ensure the optical performance while preventing the overall length of the lens system from becoming excessively large.

Figure 33:
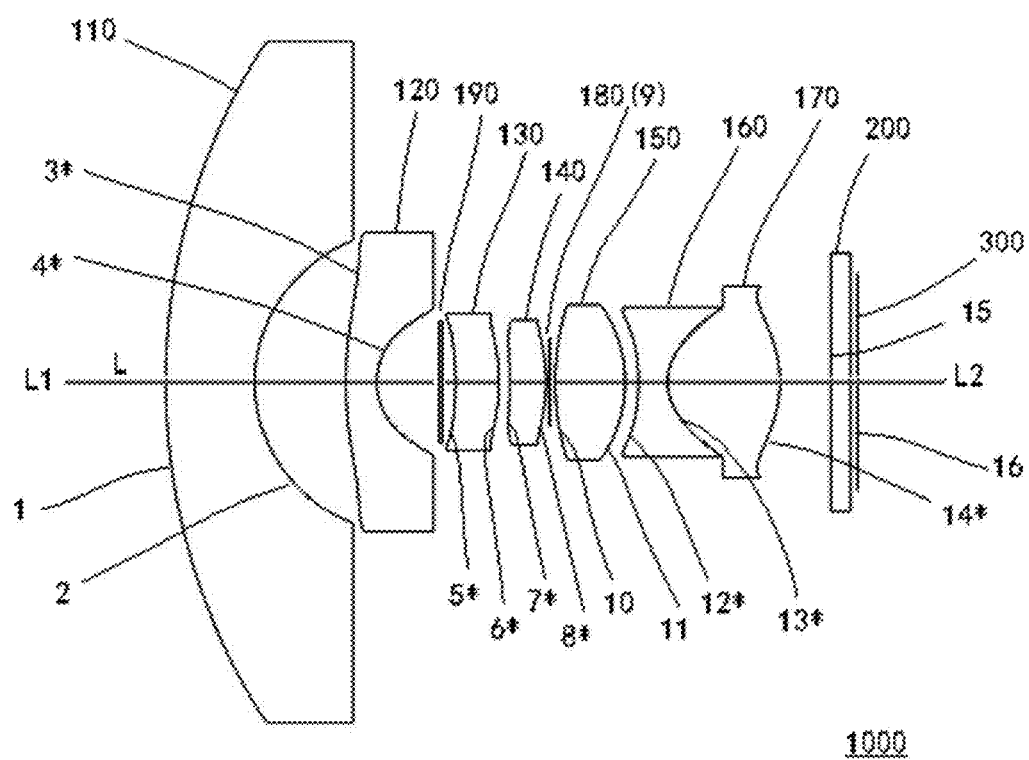
FIG. 33 illustrates a wide-angle lens according to Embodiment 9 of the disclosure.
Figure 34A:
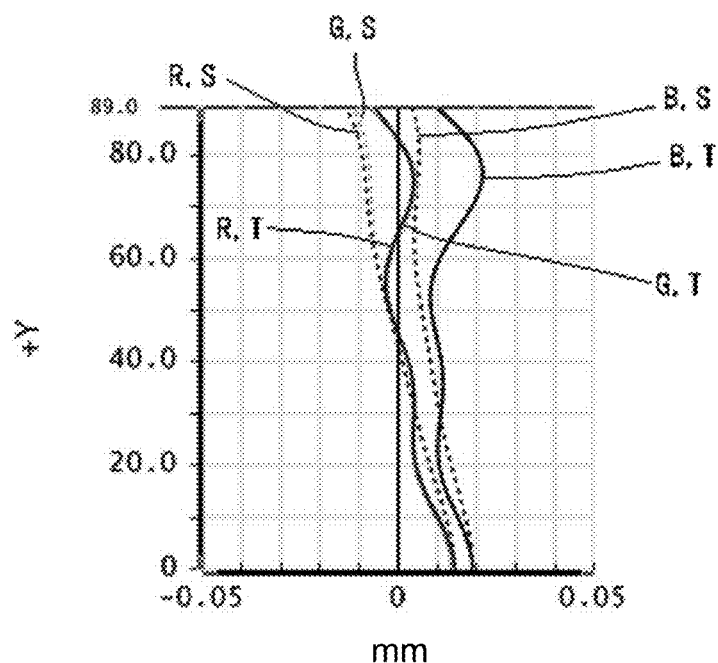
FIG. 34A illustrates curvature of field and distortion of the wide-angle lens according to Embodiment 9 of the disclosure.
Figure 34B:
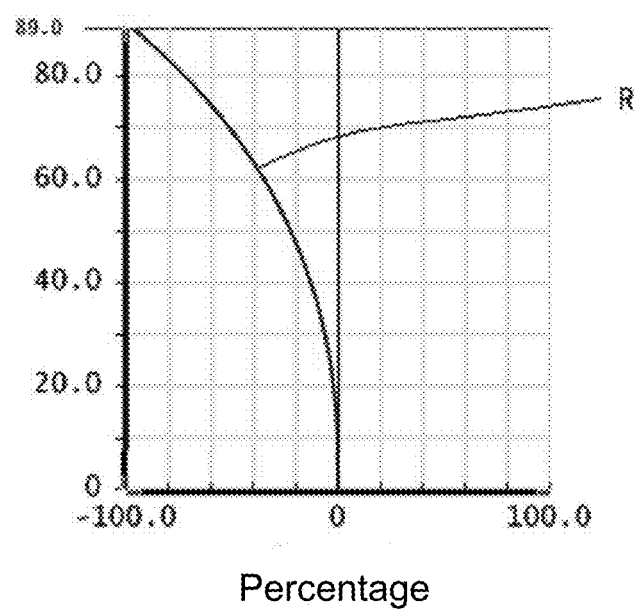
FIG. 34B illustrates curvature of field and distortion of the wide-angle lens according to Embodiment 9 of the disclosure.
Figure 35A:
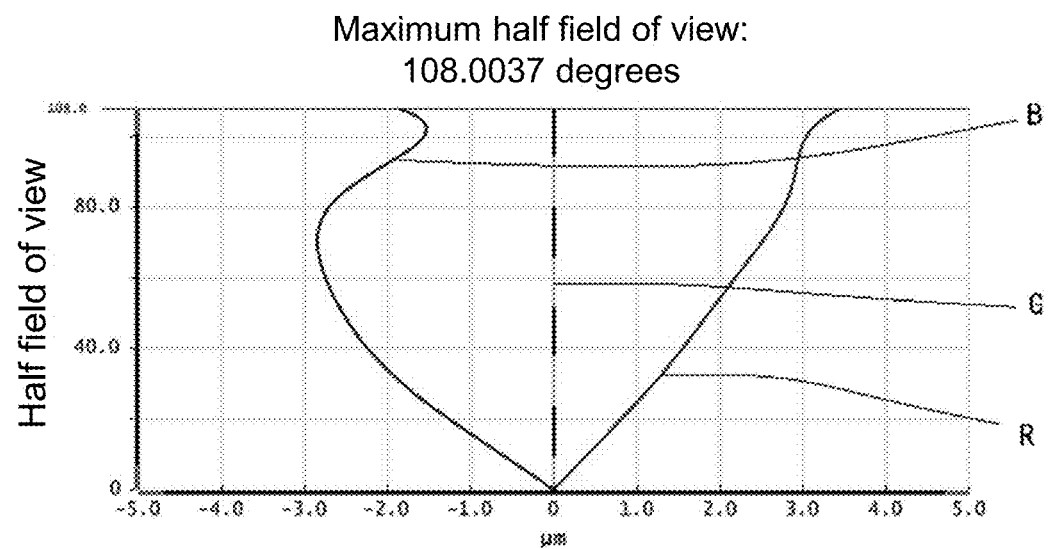
FIG. 35A illustrates lateral chromatic aberration (transverse chromatic aberration) of the wide-angle lens according to Embodiment 9 of the disclosure.
Figure 35B:
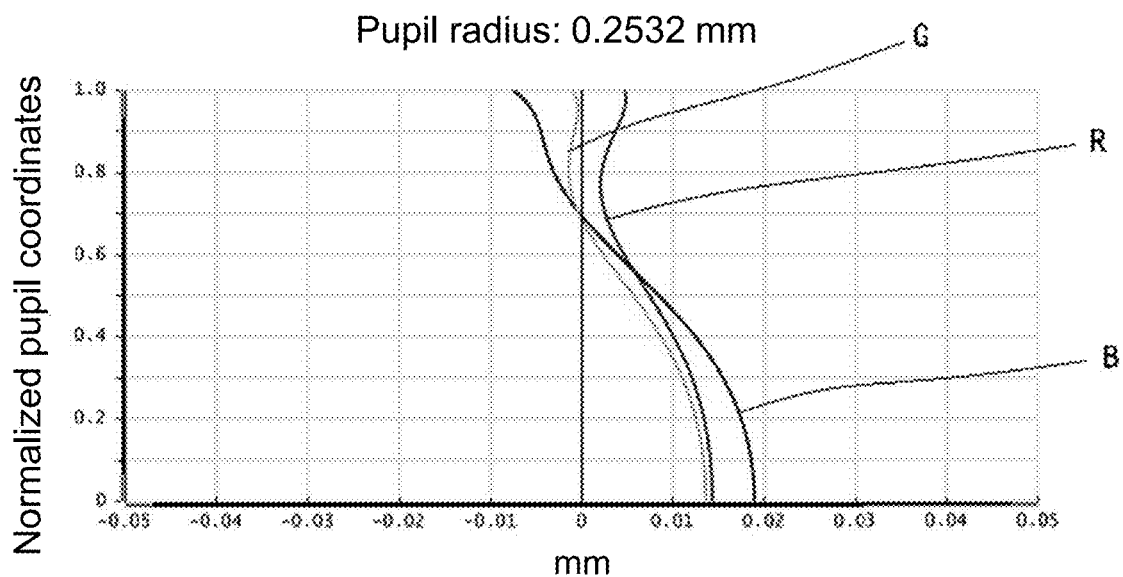
FIG. 35B illustrates spherical aberration (longitudinal aberration) of the wide-angle lens according to Embodiment 9 of the disclosure.
Figure 36A:
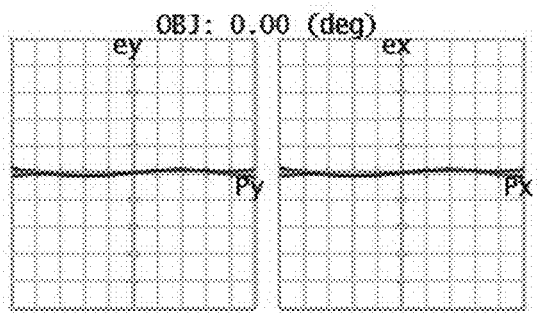
FIG. 36A to FIG. 36L illustrate transverse aberration of the wide-angle lens according to Embodiment 9 of the disclosure.
Figure 36B:
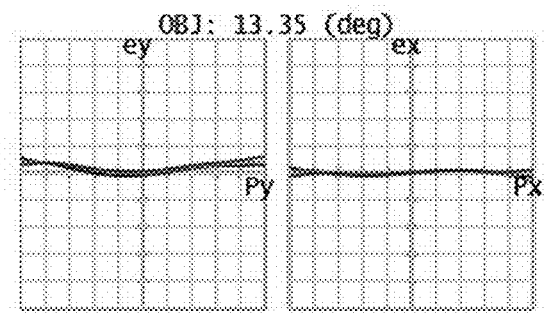
Figure 36C:
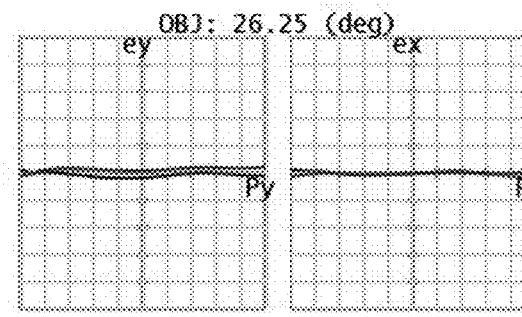
Figure 36D:
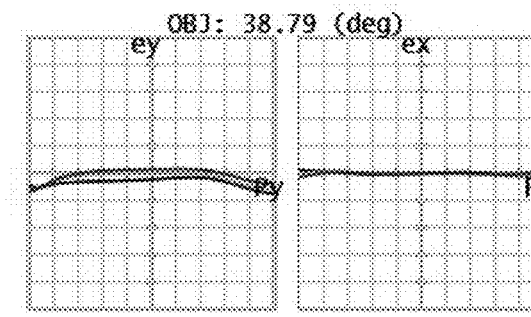
Figure 36E:
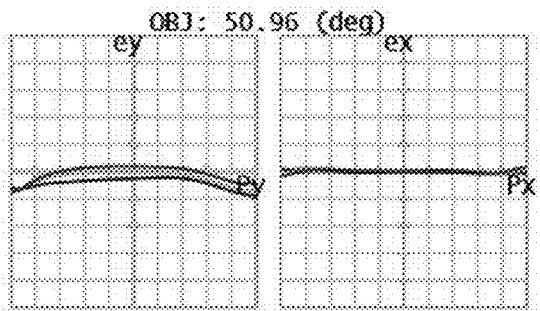
Figure 36F:
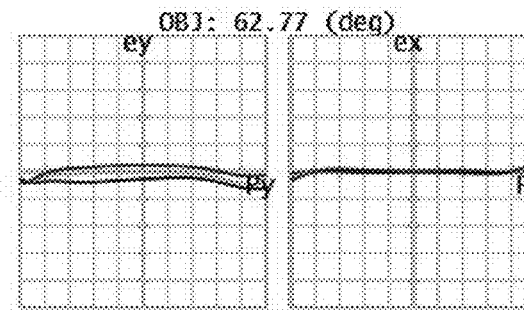
Figure 36G:
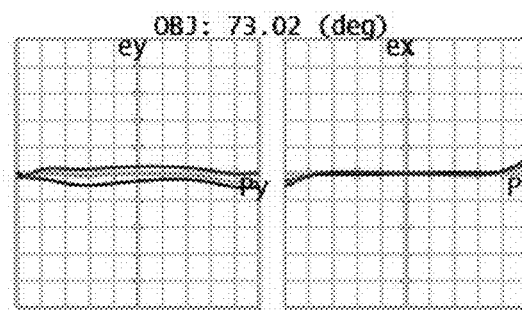
Figure 36H:
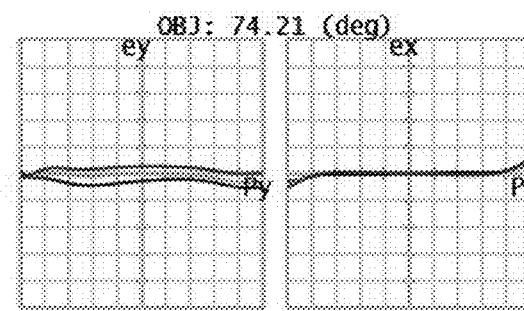
Figure 36I:
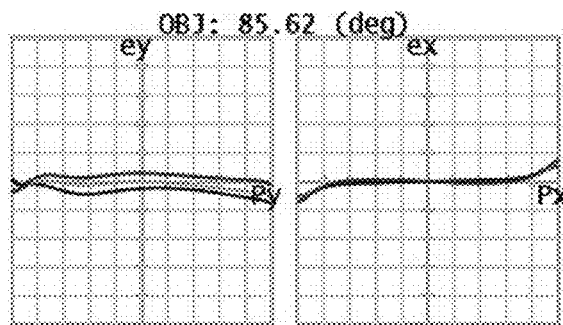
Figure 36J:
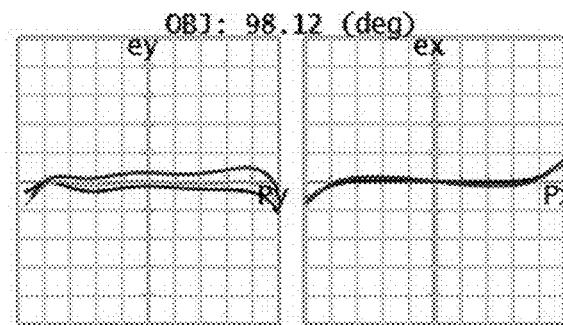
Figure 36K:
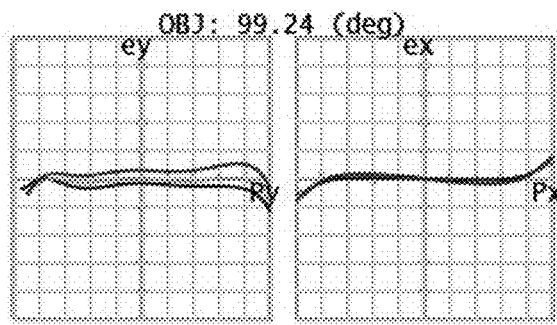
Figure 36L:
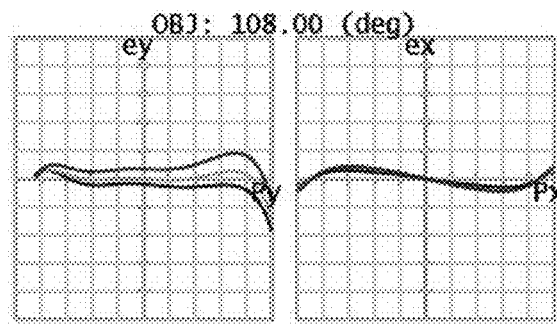

FIG. 33 illustrates a wide-angle lens according to Embodiment 9 of the disclosure. FIG. 34A illustrates curvature of field and distortion of the wide-angle lens according to Embodiment 9 of the disclosure. FIG. 34B illustrates curvature of field and distortion of the wide-angle lens according to Embodiment 9 of the disclosure. FIG. 35A illustrates lateral chromatic aberration (transverse chromatic aberration) of the wide-angle lens according to Embodiment 9 of the disclosure. FIG. 35B illustrates spherical aberration (longitudinal aberration) of the wide-angle lens according to Embodiment 9 of the disclosure. FIG. 36A to FIG. 36L illustrate transverse aberration of the wide-angle lens according to Embodiment 9 of the disclosure. Here, in FIG. 34A, FIG. 34B, FIG. 35A, FIG. 35B, and FIG. 36A to FIG. 36L, a correlation curve of red light R (having a wavelength of 656 nm) is denoted by R, a correlation curve of green light G (having a wavelength of 588 nm) is denoted by G, and a correlation curve of blue light B (having a wavelength of 486 nm) is denoted by B. T indicates being related to the meridian plane, and S indicates being related to the sagittal plane. Moreover, in FIG. 36A to FIG. 36L, a maximum scale of the longitudinal axis is ±50.000 μm.

As shown in FIG. 33, the wide-angle lens 1000 includes, sequentially arranged from the object side (L1 side), the first lens 110, the second lens 120, the third lens 130, the fourth lens 140, the diaphragm 180, the fifth lens 150, the sixth lens 160 and the seventh lens 170. Among them, the sixth lens 160 and the seventh lens 170 are bonded together by an adhesive to constitute a cemented lens.

Here, the wide-angle lens 1000 in this embodiment has the same basic structure (that is, whether each of the first lens 110, the second lens 120, the third lens 130, the fourth lens 140, the fifth lens 150, the sixth lens 160 and the seventh lens 170 has positive refractive power or negative refractive power, whether each of these lenses is a glass lens or plastic lens, whether the object side surface and the image side surface of each of these lenses are convex surfaces or concave surfaces, and whether the object side surface and the image side surface are spherical surfaces or aspheric surfaces) as that of the wide-angle lens of Embodiment 1, and thus the details thereof will be omitted.

In addition, as shown in FIG. 33, similarly to Embodiment 1, the light-shielding sheet 190 is provided between the second lens 120 and the third lens 130, the filter 200 is arranged on the image side of the seventh lens 170, and the imaging element 300 is arranged on the image side of the filter 200.

In this embodiment, in the lens system as a whole, the effective focal length f is 1.019 mm, the object-to-image distance (total track) d is 13.397 mm, the F value (image space F/#) is 2.012, the maximum HFOV (maximum half field angle) is 108.004 degrees, and the entrance pupil diameter HEP is 0.506 mm.

Table 17 shows physical properties of each surface of the wide-angle lens 1000 of this embodiment. Table 18-1 and Table 18-2 show aspheric coefficients of each surface of the wide-angle lens 1000 of this embodiment.

TABLE 17

| Surface | Radius of curvature | Thickness | $N_d$ | $v_d$ | Effective focal length | Effective focal length | Effective focal length |
|---|---|---|---|---|---|---|---|
| 1 | 12.100 | 1.730 | 1.871 | 40.73 | −4.823 | −1.415 | 26.363 |
| 2 | 2.910 | 1.765 | | | | | |
| 3* | 7.693 | 0.600 | 1.544 | 56.4 | −2.800 | | |
| 4* | 1.237 | 1.517 | | | | | |
| 5* | −6.607 | 0.850 | 1.544 | 56.4 | 12.527 | 4.381 | |
| 6* | −3.507 | 0.202 | | | | | |
| 7* | −12.641 | 0.700 | 1.635 | 23.9 | 6.634 | | |
| 8* | −3.228 | 0.050 | | | | | |
| 9 (diaphragm) | Infinite | 0.129 | | | | | |
| 10 | 5.000 | 1.360 | 1.697 | 55.46 | 2.636 | | 3.374 |
| 11 | −2.580 | 0.260 | | | | | |
| 12* | −3.864 | 0.550 | 1.635 | 23.9 | −1.179 | 10.147 | |
| 13* | 0.980 | 2.190 | 1.544 | 56.4 | 1.642 | | |
| 14* | −2.151 | 0.969 | | | | | |
| 15 | Infinite | 0.400 | | | | | |
| 16 | Infinite | 0.125 | | | | | |

In Table 17 above, the radius of curvature, thickness, and effective focal length are in units of mm. $N_d$ represents a refractive index for a ray of 587.56 nm. $v_d$ represents the Abbe number. * represents an aspheric surface.

TABLE 18-1

| Surface | c (1/radius of curvature) | K | A4 | A6 |
|---|---|---|---|---|
| 3 | 1.29990E−01 | 0.00000E+00 | 1.79733E−03 | −1.14149E−03 |
| 4 | 8.08669E−01 | −4.00000E+00 | 2.15100E−01 | −8.02378E−02 |
| 5 | −1.51355E−01 | 0.00000E+00 | −1.09624E−02 | −8.73052E−03 |
| 6 | −2.85185E−01 | 0.00000E+00 | 4.64269E−03 | 4.90763E−03 |
| 7 | −7.91052E−02 | 0.00000E+00 | 1.02155E−02 | 7.50888E−03 |
| 8 | −3.09828E−01 | 0.00000E+00 | 7.49234E−03 | 1.54584E−03 |
| 12 | −2.58792E−01 | 0.00000E+00 | −3.14257E−02 | 2.35226E−03 |
| 13 | 1.02041E+00 | −1.00000E+00 | 3.07479E−02 | −4.89661E−02 |
| 14 | −4.64857E−01 | 0.00000E+00 | 4.79842E−02 | −2.97957E−02 |

TABLE 18-2

| Surface | A8 | A10 | A12 | A14 | A16 |
|---------|-----|-----|-----|-----|-----|
| 3 | −6.11588E−05 | 1.50045E−05 | 3.90615E−08 | 0.00000E+00 | 0.00000E+00 |
| 4 | 4.96308E−02 | −1.37651E−02 | 1.87863E−04 | 0.00000E+00 | 0.00000E+00 |
| 5 | 2.50539E−03 | −1.94316E−04 | −2.18386E−04 | 0.00000E+00 | 0.00000E+00 |
| 6 | 2.37631E−03 | 4.68175E−04 | 1.19525E−03 | 0.00000E+00 | 0.00000E+00 |
| 7 | 1.14133E−02 | 6.53638E−04 | 0.00000E+00 | 0.00000E+00 | 0.00000E+00 |
| 8 | 1.36753E−02 | −1.98505E−03 | 0.00000E+00 | 0.00000E+00 | 0.00000E+00 |
| 12 | 3.38366E−03 | −2.00010E−03 | 6.86525E−04 | 0.00000E+00 | 0.00000E+00 |
| 13 | 2.79270E−02 | −5.22149E−03 | −1.20343E−04 | 0.00000E+00 | 0.00000E+00 |
| 14 | 2.26165E−02 | −7.19858E−03 | 9.87041E−04 | 0.00000E+00 | 0.00000E+00 |

In Table 18-1 and Table 18-2 above, in a case where a lens surface is a convex surface protruding toward the object side or a concave surface recessed toward the object side, its radius of curvature is set to a positive value; in a case where a lens surface is a convex surface protruding toward the image side or a concave surface recessed toward the image side, its radius of curvature is set to a negative value.

In addition, Table 18-1 and Table 18-2 above show the aspheric coefficients A4, A6, A8, A10, A12, A14 and A16 of each of the aspheric surfaces, which satisfy Expression 1 above.

Here, in the wide-angle lens 1000, the object-to-image distance d is 13.397 mm, and the entrance pupil diameter HEP is 0.506 mm. Therefore, the following condition 1 is satisfied:

$$d/HEP < 29.000 \quad (1)$$

In condition 1, if d/HEP is 29.000 or greater, it is difficult to ensure the optical performance while preventing the overall length of the lens system from becoming excessively large.

In contrast, in this embodiment, since condition 1 is satisfied, it is easy to ensure the optical performance while preventing the overall length of the lens system from becoming excessively large.

Particularly, in this embodiment, since d/HEP<27.000 is satisfied, it is relatively easy to ensure the optical performance while preventing the overall length of the lens system from becoming excessively large.

In addition, in the wide-angle lens 1000, the object-to-image distance d is 13.397 mm, and the effective focal length f of the lens system as a whole is 1.019 mm. Therefore, the following condition 2 is satisfied:

$$11.000 < d/f < 15.000 \quad (2)$$

In condition 2, if d/f is 11.000 or less, it is difficult to appropriately correct various aberrations. On the other hand, if d/f is 15.000 or greater, the overall length of the lens system becomes excessively large.

In contrast, in this embodiment, since condition 2 is satisfied, it is easy to appropriately correct various aberrations, making it easy to achieve good optical characteristics. Moreover, it is possible to prevent the lens system from becoming excessively large while avoiding an excessively large overall length of the lens system.

In addition, in the wide-angle lens 1000, the effective focal length f of the lens system as a whole is 1.019 mm, and the entrance pupil diameter HEP is 0.506 mm. Therefore, the following condition 3 is satisfied:

$$f/HEP < 2.3 \quad (3)$$

In condition 3, if f/HEP is 2.3 or greater, it is difficult to ensure the brightness.

In contrast, in this embodiment, since condition 3 is satisfied, it is possible to ensure the brightness and to enable application in a high-density imaging element.

In addition, in the wide-angle lens 1000, the combined effective focal length f1234 of the first lens 110, the second lens 120, the third lens 130, and the fourth lens 140 is 26.363 mm, and the combined effective focal length f567 of the fifth lens 150, the sixth lens 160, and the seventh lens 170 is 3.374 mm. Therefore, the following condition 4 is satisfied:

$$0.800 < f1234/f567 < 8.000 \quad (4)$$

In condition 4, if f1234/f567 is 0.800 or less, the refractive power of the front lens group composed of the first lens, the second lens, the third lens, and the fourth lens is excessively high, making it difficult to appropriately correct various aberrations. On the other hand, if f1234/f567 is 8.000 or greater, the refractive power of the front lens group composed of the first lens, the second lens, the third lens, and the fourth lens is excessively low, making it difficult to reduce the diameter of each lens of the front lens group and to miniaturize the wide-angle lens as a whole.

In contrast, in this embodiment, since condition 4 is satisfied, it is easy to appropriately correct various aberrations and to realize miniaturization.

In addition, in the wide-angle lens 1000, the combined effective focal length f567 of the fifth lens 150, the sixth lens 160, and the seventh lens 170 is 3.374 mm, and the effective focal length f of the lens system as a whole is 1.019 mm. Therefore, the following condition 5 is satisfied:

$$2.800 < f567/f < 3.850 \quad (5)$$

In condition 5, if f567/f is 2.800 or less, the refractive power of the rear lens group composed of the fifth lens, the sixth lens, and the seventh lens is excessively high, making it difficult to appropriately correct various aberrations, especially chromatic aberration. On the other hand, if f567/f is 3.850 or greater, it is difficult to reduce the diameter of each lens and the object-to-image distance, thus making it difficult to miniaturize the wide-angle lens as a whole.

In contrast, in this embodiment, since condition 5 is satisfied, it is easy to appropriately correct various aberrations, especially chromatic aberration, and to realize miniaturization.

In summary, in this embodiment, by configuring the wide-angle lens 1000 as above, as shown in FIG. 34A to FIG. 36L, it is easy to ensure the optical performance while preventing the overall length of the lens system from becoming excessively large.

The disclosure has been exemplarily described above with reference to the accompanying drawings, and it is obvious that the specific implementation of the disclosure is not limited by the foregoing embodiments.

For example, in the foregoing embodiments, the form of the first surface 1 of the first lens 110, the form of the third surface 3 of the second lens 120, the form of the fifth surface 5 of the third lens 130, the form of the seventh surface 7 of the fourth lens 140, and the form of the twelfth surface 12 of the sixth lens 160 may be appropriately changed as needed.

In addition, in the foregoing embodiments, the first lens 110 and the fifth lens 150 may be composed of plastic lenses, and the second lens 120, the third lens 130, the fourth lens 140, the sixth lens 160 and the seventh lens 170 may be composed of glass lenses.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A wide-angle lens, comprising:
a first lens, a second lens, a third lens, a fourth lens, a diaphragm, a fifth lens, a sixth lens, and a seventh lens, sequentially arranged from an object side, wherein
an object-to-image distance of the wide-angle lens is set to d, an entrance pupil diameter of the wide-angle lens is set to HEP, and d/HEP<29.000 is satisfied,
the sixth lens and the seventh lens constitute a cemented lens,
the first lens is a negative lens with a concave surface facing an image side,
the second lens is a negative lens with a concave surface facing the image side,
the third lens is a positive lens with a convex surface facing the image side,
the fourth lens is a positive lens with a convex surface facing the image side,
the fifth lens is a positive lens with a convex surface facing the object side and a convex surface facing the image side,
the sixth lens is a negative lens with a concave surface facing the image side,
the seventh lens is a positive lens with a convex surface facing the object side and a convex surface facing the image side, and
a combined effective focal length of the first lens, the second lens, the third lens, and the fourth lens is set to f1234, a combined effective focal length of the fifth lens, the sixth lens, and the seventh lens is set to f567, and 0.800<f1234/f567<8.000 is satisfied.

2. The wide-angle lens according to claim 1, wherein d/HEP<27.000 is satisfied.

3. The wide-angle lens according to claim 1, wherein an effective focal length of the wide-angle lens as a whole is set to f, and 11.000<d/f<15.000 is satisfied.

4. The wide-angle lens according to claim 1, wherein an effective focal length of the wide-angle lens as a whole is set to f, and f/HEP<2.3 is satisfied.

5. The wide-angle lens according to claim 2, wherein an effective focal length of the wide-angle lens as a whole is set to f, and f/HEP<2.3 is satisfied.

6. The wide-angle lens according to claim 3, wherein an effective focal length of the wide-angle lens as a whole is set to f, and f/HEP<2.3 is satisfied.

7. The wide-angle lens according to claim 1, wherein an effective focal length of the wide-angle lens as a whole is set to f, and 2.800<f567/f<3.850 is satisfied.

8. The wide-angle lens according to claim 1, wherein the first lens and the fifth lens are each a glass lens, and the second lens, the third lens, the fourth lens, the sixth lens, and the seventh lens are each a plastic lens.

9. A wide-angle lens, comprising:
a first lens, a second lens, a third lens, a fourth lens, a diaphragm, a fifth lens, a sixth lens, and a seventh lens, sequentially arranged from an object side, wherein
an object-to-image distance of the wide-angle lens is set to d, an entrance pupil diameter of the wide-angle lens is set to HEP, and d/HEP<29.000 is satisfied,
the sixth lens and the seventh lens constitute a cemented lens,
the first lens is a negative lens with a concave surface facing an image side,
the second lens is a negative lens with a concave surface facing the image side,
the third lens is a positive lens with a convex surface facing the image side,
the fourth lens is a positive lens with a convex surface facing the image side,
the fifth lens is a positive lens with a convex surface facing the object side and a convex surface facing the image side,
the sixth lens is a negative lens with a concave surface facing the image side,
the seventh lens is a positive lens with a convex surface facing the object side and a convex surface facing the image side, and
a combined effective focal length of the fifth lens, the sixth lens, and the seventh lens is set to f567, an effective focal length of the wide-angle lens as a whole is set to f, and 2.800<f567/f<3.850 is satisfied.

10. The wide-angle lens according to claim 9, wherein d/HEP<27.000 is satisfied.

11. The wide-angle lens according to claim 9, wherein 11.000<d/f<15.000 is satisfied.

12. The wide-angle lens according to claim 9, wherein f/HEP<2.3 is satisfied.

13. The wide-angle lens according to claim 10, wherein f/HEP<2.3 is satisfied.

14. The wide-angle lens according to claim 11, wherein f/HEP<2.3 is satisfied.

15. The wide-angle lens according to claim 9, wherein the first lens and the fifth lens are each a glass lens, and the second lens, the third lens, the fourth lens, the sixth lens, and the seventh lens are each a plastic lens.

* * * * *